US011985085B2

(12) United States Patent
Zhu et al.

(10) Patent No.: US 11,985,085 B2
(45) Date of Patent: May 14, 2024

(54) METHOD AND APPARATUS FOR COMMUNICATIONS IN A DISTRIBUTED ANTENNA SYSTEM

(71) Applicant: Samsung Electronics Co., Ltd., Suwon-si (KR)

(72) Inventors: Dalin Zhu, Richardson, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 67 days.

(21) Appl. No.: 17/582,929

(22) Filed: Jan. 24, 2022

(65) Prior Publication Data
US 2022/0239429 A1 Jul. 28, 2022

Related U.S. Application Data

(60) Provisional application No. 63/152,431, filed on Feb. 23, 2021, provisional application No. 63/141,748, filed on Jan. 26, 2021.

(51) Int. Cl.
*H04L 5/00* (2006.01)

(52) U.S. Cl.
CPC .......... *H04L 5/0048* (2013.01); *H04L 5/0005* (2013.01); *H04L 5/0032* (2013.01); *H04L 5/0057* (2013.01)

(58) Field of Classification Search
CPC ... H04L 5/0005; H04L 5/0032; H04L 5/0048; H04L 5/005; H04W 24/10
See application file for complete search history.

(56) References Cited

U.S. PATENT DOCUMENTS

2015/0304891 A1* 10/2015 Dinan ................... H04W 72/21
370/331
2016/0021695 A1 1/2016 Axmon et al.
2016/0227505 A1 8/2016 Loehr et al.
(Continued)

OTHER PUBLICATIONS

International Search Report and Written Opinion dated May 18, 2022 regarding Application No. PCT/KR2022/001383, 9 pages.
(Continued)

*Primary Examiner* — Pao Sinkantarakorn

(57) ABSTRACT

Methods and apparatuses for communications in a distributed antenna wireless communication system. A method for operating a user equipment (UE) includes receiving a first configuration for measuring a channel difference between a target cell and a reference cell in a cell group; receiving information for one or more measurement reference signals (RSs) to measure for determining the channel difference; and receiving a second configuration for reporting the channel difference between the target cell and the reference cell in the cell group. The method further includes measuring, based on the information, the measurement RSs; determining, based on the measured measurement RSs, the channel difference between the target cell and the reference cell in the cell group; and transmitting, based on the second configuration, a channel difference report associated with the determined channel difference. The measurement RSs comprise channel state information reference signals (CSI-RSs), synchronization signal blocks (SSBs), or both.

17 Claims, 25 Drawing Sheets

(56) References Cited

U.S. PATENT DOCUMENTS

| | | | |
|---|---|---|---|
| 2017/0063436 A1* | 3/2017 | Li | H04L 5/0048 |
| 2018/0270686 A1 | 9/2018 | Bergstrom et al. | |
| 2020/0029315 A1 | 1/2020 | Lin et al. | |
| 2020/0119797 A1* | 4/2020 | Wang | H04L 5/0057 |
| 2020/0228381 A1 | 7/2020 | Manolakos et al. | |
| 2021/0067288 A1* | 3/2021 | Kakishima | H04L 5/005 |
| 2021/0314046 A1* | 10/2021 | Kim | H04L 5/0053 |
| 2023/0071430 A1* | 3/2023 | Matsumura | H04L 5/0057 |
| 2023/0155760 A1* | 5/2023 | Sun | H04L 5/0048 370/329 |

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)", 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"5G; NR; Medium Access Control (MAC) protocol specification (3GPP TS 38.321 version 16.1.0 Release 16)", ETSI TS 138 321 V16.1.0, Jul. 2020, 153 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

* cited by examiner

| TA group ID #0 | Group Timing Advance for RRH group #0 |
|---|---|
| TA group ID #1 | Group Timing Advance for RRH group #1 |

Examples of group TA MAC-CE commands for RRH groups

Examples of primary/differential group TA MAC-CE commands for RRH groups

Example of MAC-CE command with primary group TA identifier

Examples of primary/differential group TA MAC-CE commands with flag indicators

For $RRH\_i$ ($i \neq 2$): $\Delta t_i = t_i - t_2$ ($\Delta t_i = t_2 - t_i$) or $\Delta t_i = |t_i - t_2|$ with a sign indicator

METHOD AND APPARATUS FOR COMMUNICATIONS IN A DISTRIBUTED ANTENNA SYSTEM

CROSS-REFERENCE TO RELATED APPLICATIONS AND CLAIM OF PRIORITY

The present application claims priority to U.S. Provisional Patent Application No. 63/141,748, filed on Jan. 26, 2021, and U.S. Provisional Patent Application No. 63/152,431, filed on Feb. 23, 2021. The content of the above-identified patent document is incorporated herein by reference.

TECHNICAL FIELD

The present disclosure relates generally to wireless communication systems and, more specifically, the present disclosure relates to communications in a distributed antenna wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to communications in a distributed antenna wireless communication system.

In one embodiment, a user equipment (UE) is provided. The UE includes a transceiver configured to receive: a first configuration for measuring a channel difference between a target cell and a reference cell in a cell group; information for one or more measurement reference signals (RSs) to measure for determining the channel difference; and a second configuration for reporting the channel difference between the target cell and the reference cell in the cell group. The UE also includes a processor operably coupled to the transceiver. The processor is configured to measure, based on the information, the measurement RSs and determine, based on the measured measurement RSs, the channel difference between the target cell and the reference cell in the cell group. The transceiver is further configured to transmit, based on the second configuration, a channel difference report associated with the determined channel difference. The measurement RSs comprise channel state information reference signals (CSI-RSs), synchronization signal blocks (SSBs), or both CSI-RSs and SSBs.

In another embodiment, a base station (BS) is provided. The BS includes a transceiver configured to transmit a first configuration to indicate measurement of a channel difference between a target cell and a reference cell in a cell group; transmit information for one or more measurement RSs for determination of the channel difference; transmit a second configuration for reporting the channel difference between the target cell and the reference cell in the cell group; and receive, based on the second configuration, a channel difference report associated with the channel difference. The measurement RSs comprise CSI-RSs, SSBs, or both CSI-RSs and SSBs.

In yet another embodiment, a method for operating a UE is provided. The method includes receiving a first configuration for measuring a channel difference between a target cell and a reference cell in a cell group; receiving information for one or more measurement RSs to measure for determining the channel difference; and receiving a second configuration for reporting the channel difference between the target cell and the reference cell in the cell group. The method further includes measuring, based on the information, the measurement RSs; determining, based on the measured measurement RSs, the channel difference between the target cell and the reference cell in the cell group; and transmitting, based on the second configuration, a channel difference report associated with the determined channel difference. The measurement RSs comprise CSI-RSs, SSBs, or both CSI-RSs and SSBs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 28, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.1.0, "NR; Physical channels and modulation"; 3GPP TS 38.212 v16.1.0, "NR; Multiplexing and Channel coding"; 3GPP TS 38.213 v16.1.0, "NR; Physical Layer Procedures for Control"; 3GPP TS 38.214 v16.1.0, "NR; Physical Layer Procedures for Data"; 3GPP TS 38.321 v16.1.0, "NR; Medium Access Control (MAC) protocol specification"; and 3GPP TS 38.331 v16.1.0, "NR; Radio Resource Control (RRC) Protocol Specification."

Figure 1:
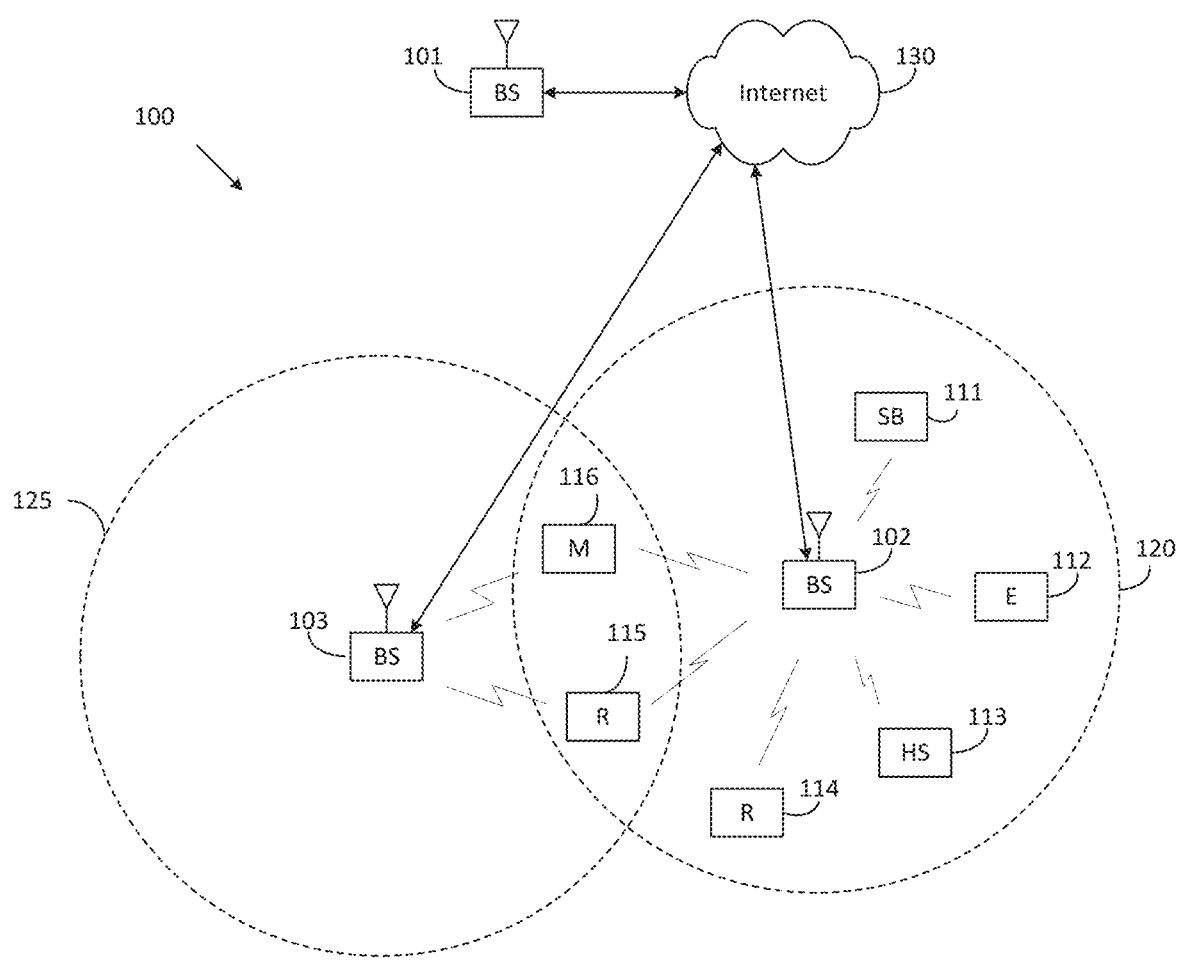
FIG. 1 illustrates an example of wireless network according to embodiments of the present disclosure.
Figure 2:
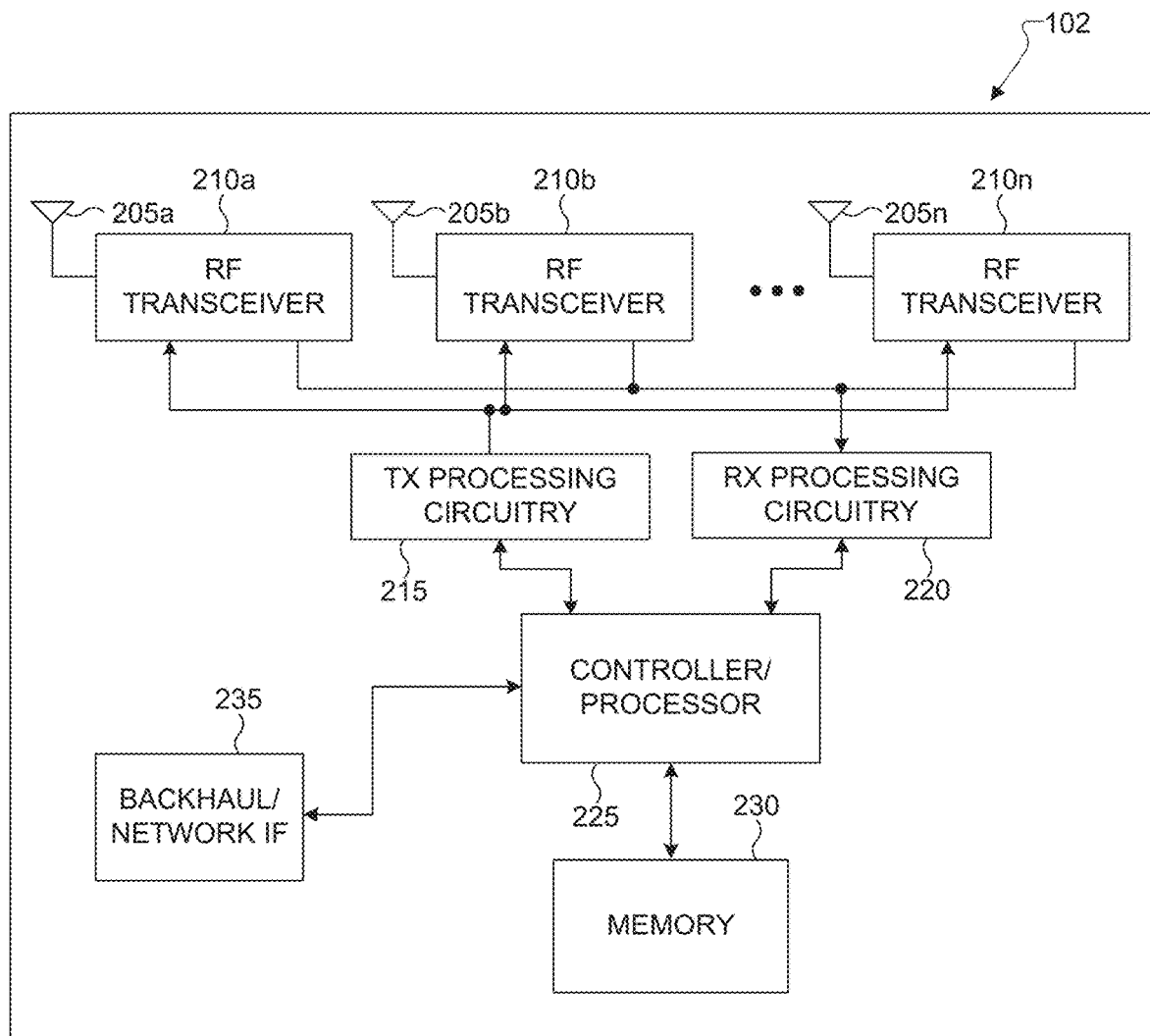
FIG. 2 illustrates an example of gNB according to embodiments of the present disclosure.
Figure 3:
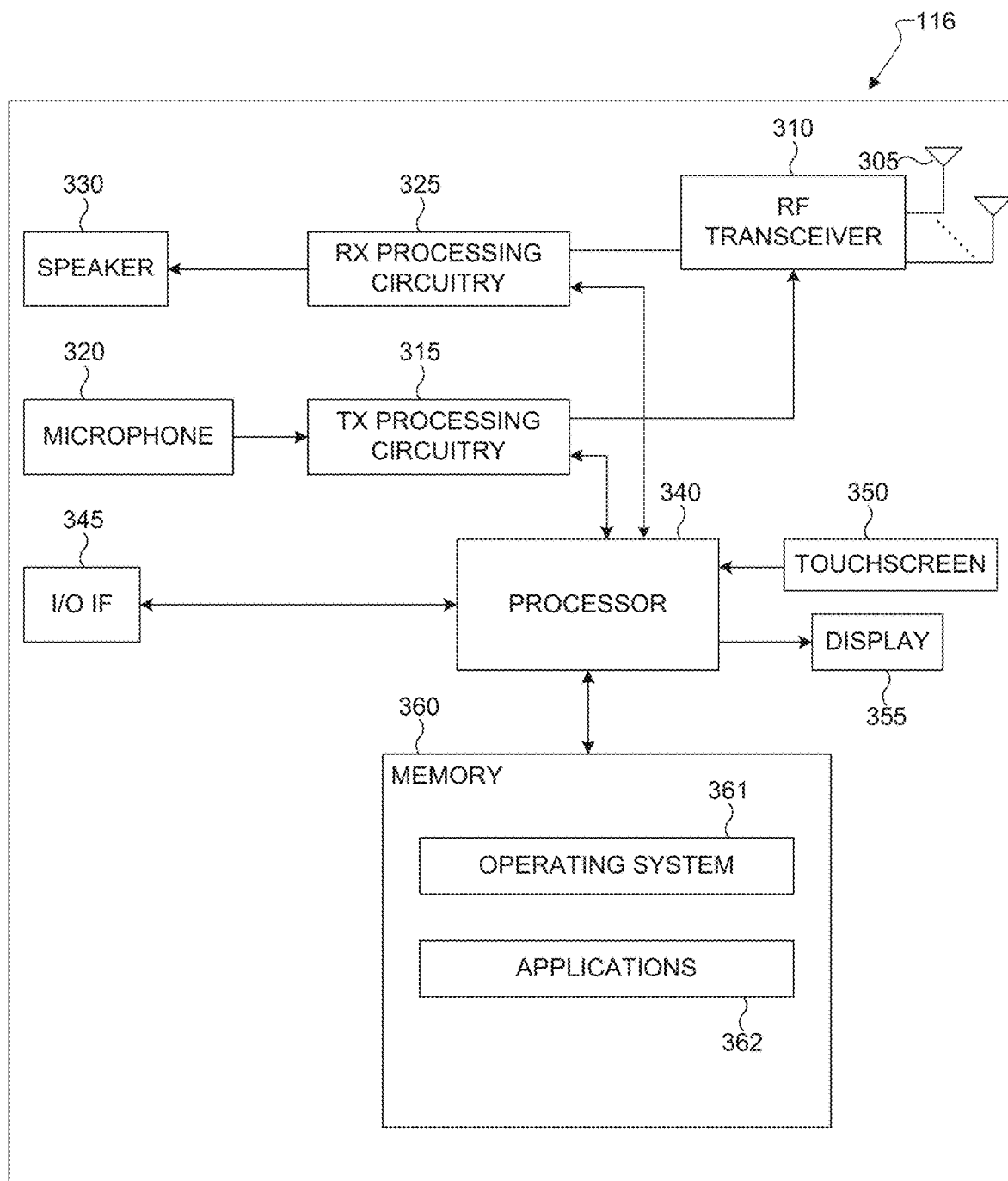
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for communications in a distributed antenna system in a wireless communication system. In certain embodiments, and one or more of the gNBs 101-103 includes circuitry, programing, or a combination thereof, for communications in a distributed antenna system in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support communications in a distributed antenna system. Another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for communications in a distributed antenna system in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6

GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
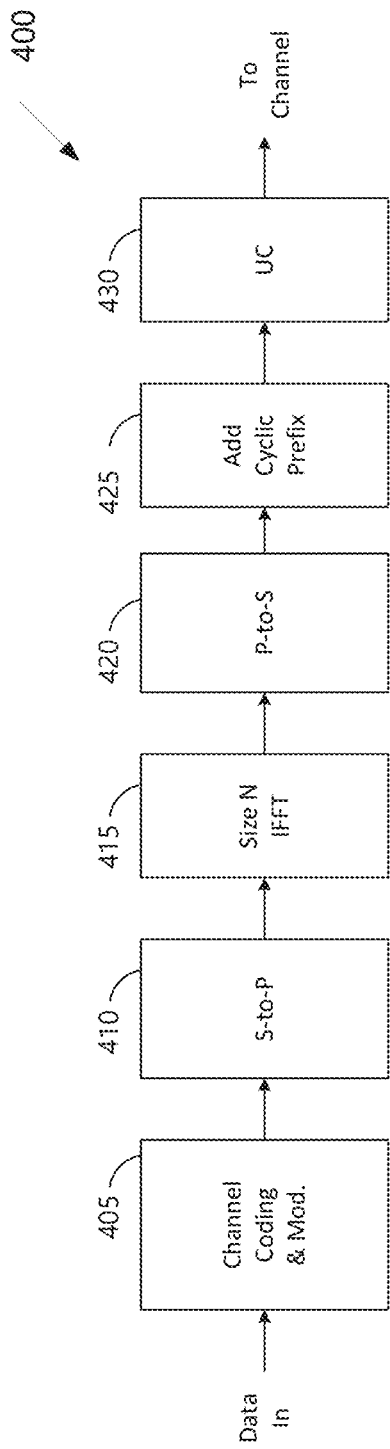
FIGS. 4 and 5 illustrate example of wireless transmit and receive paths according to this disclosure.
Figure 5:
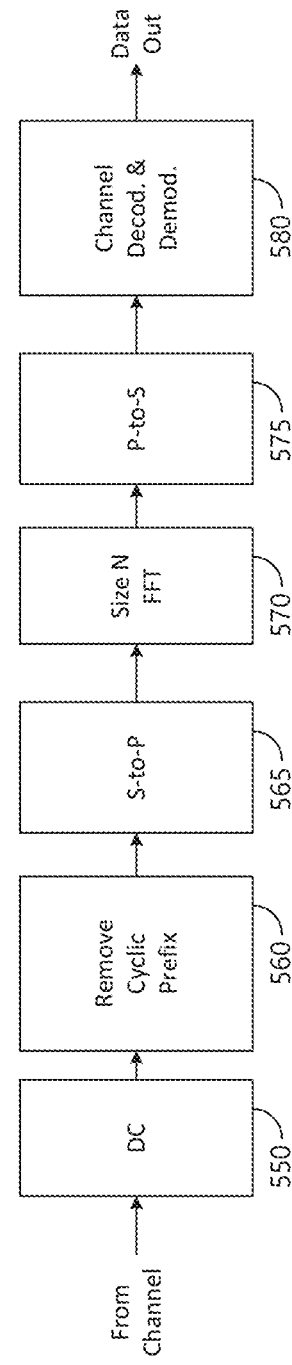

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In a wireless communications system, a UE could communicate with a large number of remote radio heads (RRHs), distributed within a certain area. Each RRH could be equipped with an antenna array having a certain number of antenna elements. One or more RRHs could be connected through a single baseband processing unit such that signals received at different RRHs could be processed in a centralized manner.

Figure 6:
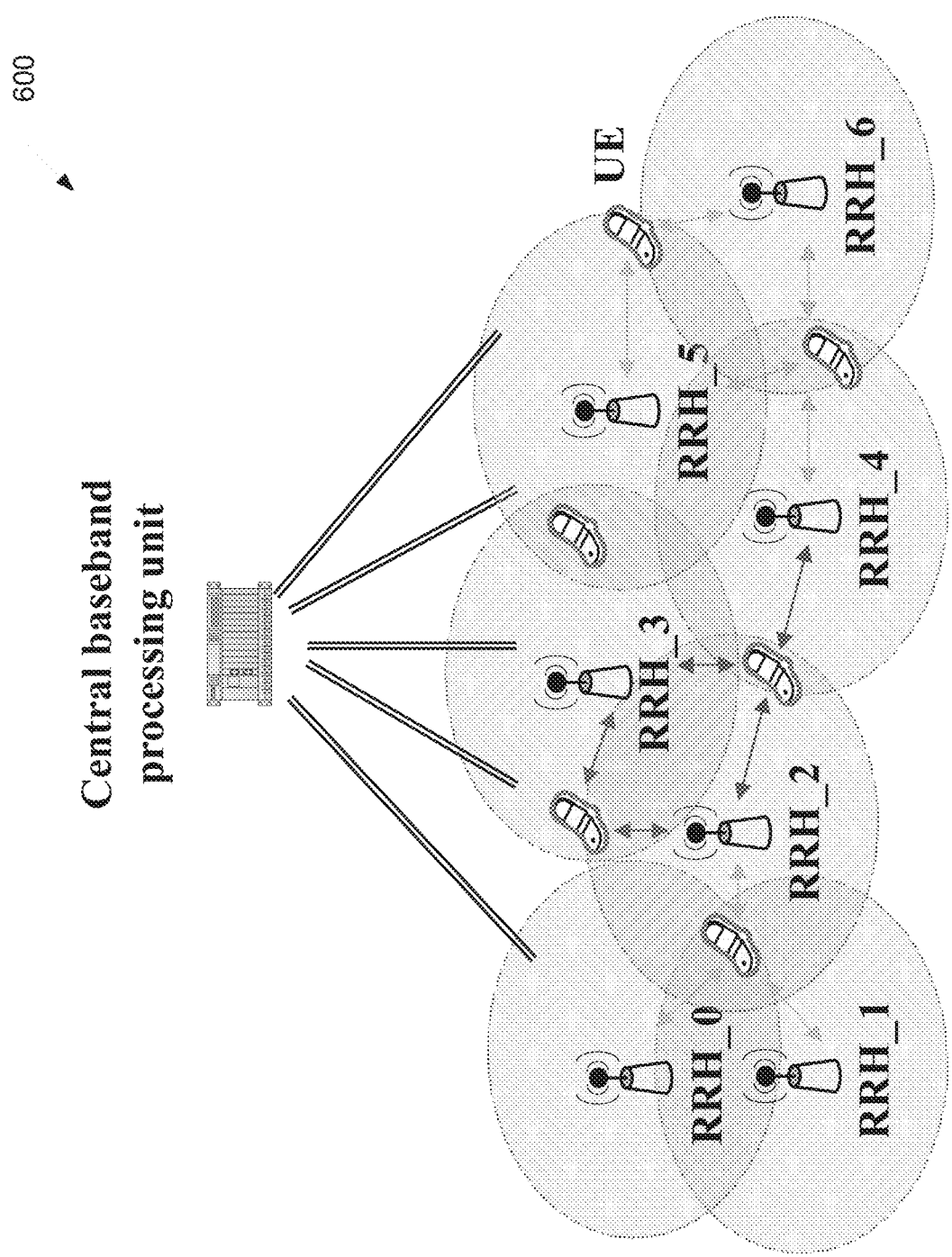
FIG. 6 illustrates an example of wireless communications system comprising distributed RRHs according to embodiments of the present disclosure.

FIG. 6 illustrates an example of wireless communications system comprising distributed RRHs 600 according to embodiments of the present disclosure. An embodiment of the wireless communications system comprising distributed RRHs 600 shown in FIG. 6 is for illustration only.

A wireless communications system comprising of 7 distributed RRHs is depicted in FIG. 6. As can be seen from FIG. 6, the seven distributed RRHs are connected through a central baseband processing unit. Furthermore, a UE could communicate with multiple RRHs in both downlink and uplink directions. For instance, the UE on the far right in FIG. 6 could transmit/receive to/from RRH_5 and RRH_6. Here, RRH_5 and RRH_6 could be regarded as a RRH cluster for the UE.

For another example, the UE on the far left in FIG. 6 could transmit/receive to/from three RRHs, RRH_0, RRH_1 and RRH_2, in both downlink and uplink directions, and RRH_0, RRH_1 and RRH_2 could be regarded as the RRH cluster for this UE. Within the same RRH cluster, one or more RRHs could be treated as a RRH group to the UE if, e.g., their propagation delay difference between the UE is below a given threshold, e.g., the CP length. For example, RRH_0 and RRH_1 could be regarded as one RRH group to the UE on the far left in FIG. 6; RRH_5 and RRH_6 could be regarded as two RRH groups to the UE on the far right in FIG. 6.

It is evident from the above discussions that a RRH cluster could contain one or more RRH groups, and the propagation delay difference between the RRH groups within the same RRH cluster and the UE could be larger than the CP length. In this case, if the UE applies a common timing advance (TA) for the UL transmissions to all their RRHs (these RRHs could be in different RRH groups), significant interference between the UL transmissions from different UEs could occur. Hence, for the distributed RRH system, there is a need to accommodate different propagation delay differences between the RRH groups and the UE in configuring/determining the UL TA(s). As the UL TA design for the distributed RRH system relies on how the RRHs are clustered/grouped for a given UE, effective RRHs clustering/grouping strategies along with the corresponding signaling support also need to be specified.

The present disclosure provides several design issues for the distributed RRH system, wherein a UE could communicate with multiple RRHs in both DL and UL directions. A variety of RRH clustering/grouping mechanisms are developed, and their associated configuration/indication methods are also specified. The provided RRH clustering/grouping strategies take into account various factors such as the propagation delay difference between the RRHs and the UE, different DL and UL transmission modes (e.g., codebook based distributed MIMO for the DL, while multi-TRP like operation for the UL), and/or different UL transmission modes (e.g., both UL MIMO and UL multi-TRP). Furthermore, in the present disclosure, various UL TA configuration methods are also customized for the distributed RRH system under different RRH clustering/grouping configurations.

There are various means to configure a RRH cluster for a given UE in a distributed RRH system.

In one embodiment of Option-1, the UE could be configured by the network to measure one or more reference signals (RSs) for RRH clustering from one or more RRHs. The UE could then report to the network the corresponding measurement results, upon which the network could determine the RRH cluster for the UE of interest. The measurement results could be based on layer 1 reference signal receive power (L1-RSRP), a layer 1 signal to interference plus noise ratio (L1-SINR), and/or other L1 metrics. The UE could be configured/indicated by the network the RRH clustering results, which could comprise of the corresponding RRH IDs/indices, a primary RRH ID/index, and etc. Under certain settings, the RRH clustering results are transparent to the UE, i.e., the RRH clustering results are not indicated to the UE from the network.

In such embodiment, to facilitate measuring the RSs for RRH clustering from different RRHs and reporting the measurement results, the RSs for RRH clustering from different RRHs could be multiplexed in time, frequency, spatial and/or code domains. For instance, the UE could be configured by the network to measure the RSs for RRH clustering from different RRHs in different symbols/slots/ etc. For another example, the UE could be configured by the network to measure the RSs for RRH clustering from different RRHs in different resource blocks. The UE could also be indicated by the network the association rule(s)/mapping relationship(s) between the RRH IDs/indices and the RSs for RRH clustering. In this case, the UE could know which RRH(s) the corresponding RSs for RRH clustering are transmitted from.

In such embodiment, to facilitate measuring the RSs for RRH clustering from different RRHs and reporting the measurement results, the UE could be configured by the network to report the measurement results through certain time, frequency, spatial and/or code domain resources. For instance, the UE could be configured by the network to report the measurement results for different RRHs through different symbols/slots/etc. For another example, the UE could be configured by the network to report the measurement results for different RRHs through different resource blocks. The UE could be indicated by the network the association rule(s)/mapping relationship(s) between the RSs for RRH clustering and the reports and/or between the RRH IDs/indices and the reports. Alternatively, the UE could autonomously determine the association rule(s)/mapping relationship(s) between the RSs for RRH clustering (or the RRH IDs/indices) and the reports, and indicate to the network the association rule(s)/mapping relationship(s).

In one embodiment of Option-2, the UE could autonomously determine their RRH cluster based on the measurement results of the DL RSs for RRH clustering from different RRHs. The UE could indicate to the network the RRH clustering results, which could comprise of the corresponding RRH IDs/indices, a primary RRH ID/index, and etc. In this case, the UE needs to be indicated by the network the association rule(s)/mapping relationship(s) between the RRH IDs/indices and the RSs for RRH clustering.

Alternatively, if the UE anyways needs to report to the network the measurement results, the UE could indicate to the network the association(s) between different reports such that the RRHs corresponding to the associated reports are regarded as the RRH cluster for the UE. This requires the UE and the network to have a common understanding of how the RRH IDs/indices and the reports are associated/mapped. For instance, the UE could be indicated by the network the association rule(s)/mapping relationship(s) between the RRH IDs/indices and the reports. For another example, the UE could autonomously determine the association rule(s)/mapping relationship(s) between the RRH IDs/indices and the reports, and indicate to the network the association rule(s)/mapping relationship(s). The UE could be configured by the network through higher layer RRC signaling whether the UE could autonomously determine their RRH cluster and/or indicate to the network the RRH clustering results. The UE could also send a status report to the network indicating whether the UE has autonomously determined their RRH cluster.

In one embodiment of Option-3, the UE could transmit certain preambles such as sounding reference signals (SRSs) to the RRHs to assist RRH clustering. Based on the measurements of the UL preambles for RRH clustering, the network could determine the RRH cluster for the UE of interest. The UE could then be configured/indicated by the network via higher layer RRC signaling the RRH clustering results, which could comprise of the corresponding RRH IDs/indices, a primary RRH ID/index, and etc.

The UE could be indicated/configured by the network via higher layer RRC signaling which option from Option-1, Option-2 and Option-3 to follow for configuring/determining the RRH cluster.

For the distributed RRH system, different DL/UL transmission modes could be configured/implemented, and different DL/UL transmission modes could correspond to different RRH clusters. In this disclosure, four DL/UL transmission modes for the distributed RRH system could be configured: (1) Mode-1 (DL distributed MIMO): different RRHs/RRH groups/RRH clusters transmit to the UE different layers of a MIMO signal; (2) Mode-2: (DL multi-TRP): different RRHs/RRH groups/RRH clusters transmit to the UE different data channels; (3) Mode-3: (UL distributed MIMO): the UE transmits to different RRHs/RRH groups/RRH clusters different layers of a MIMO signal; and/or (4) Mode-4: (UL multi-TRP): the UE transmits to different RRHs/RRH groups/RRH clusters different data channels.

Hence, along with the RRH clustering results, the UE could also be indicated by the network the associated transmission modes. If the UE autonomously determines the RRH clusters and reports to the network the RRH clustering results, the UE could also report to the network the associated transmission modes. Under certain settings, not all of the transmission modes are active. For instance, the UE could receive a MAC CE command from the network that activates one or more of the transmission modes. In this case, the RRH clusters are configured/determined only for the active transmission modes. If multiple transmission modes are active, the UE could be indicated by the network (or report to the network if the UE autonomously determines their RRH cluster) that the RRH cluster determined for one transmission mode (e.g., Mode-4) is the same as that configured for another transmission mode (e.g., Mode-1).

Due to channel variations, the RRH cluster for a UE could vary over time. For Option-1 and Option-2, the UE could be configured by the network to periodically measure the DL RSs for RRH clustering and/or report to the network the measurement results. The UE could also be requested/triggered by the network to measure the DL RSs for RRH clustering and/or report to the network the corresponding measurement results in an aperiodic manner. For Option-3, the UE could be configured by the network to periodically transmit to the network the UL preambles for RRH clustering. Alternatively, the UE could be requested/triggered by the network to transmit the UL preambles for RRH clustering in an aperiodic manner. For Option-1, Option-2 and Option-3, the UE could indicate to the network that a new RRH cluster is needed so that the network could configure (additional) DL RSs for RRH clustering for the UE to measure and report and/or the UE to transmit (additional) UL preambles for RRH clustering. Further, the UE could be configured by the network two timers (a first timer and a second timer). The UE could reset both timers if a new RRH cluster is configured and applied for the UE. The UE would not apply another new RRH cluster before the first timer expires. If the second timer expires, the UE would indicate to the network that a new RRH cluster is needed.

Figure 7:
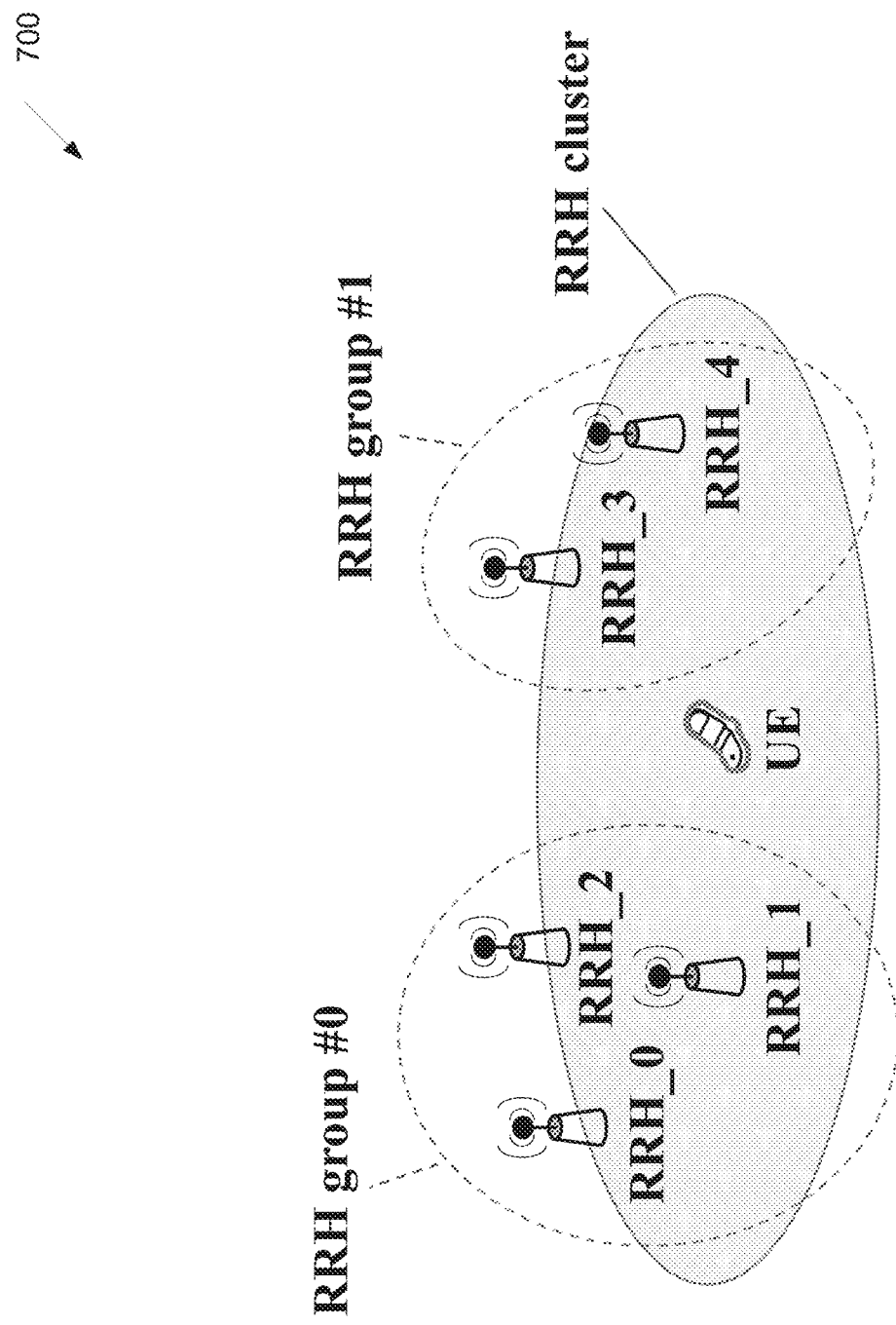
FIG. 7 illustrates an example of remote radio head (RRH) grouping according to embodiments of the present disclosure.

FIG. 7 illustrate an example of RRH grouping 700 according to embodiments of the present disclosure. An embodiment of the RRH grouping 700 shown in FIG. 7 is for illustration only.

In a distributed RRH system, the RRH cluster for a given UE could comprise of one or more RRH groups. Each RRH group could contain one or more RRHs. The RRHs in each RRH group could have similar propagation delays with the UE such that their propagation delay differences are smaller than the CP length.

As illustrated in FIG. 7, a conceptual example characterizing a RRH cluster and two RRH groups for a given UE is presented. As can be seen from FIG. 7, the RRH cluster for the UE contains RRH group #0 and RRH group #1. RRH group #0 contains RRH_0, RRH_1 and RRH_2, and RRH group #1 contains RRH_3 and RRH_4. The UE could perform Mode-1 and/or Mode-3 (i.e., distributed MIMO) with the RRHs in the same RRH group, and Mode-2 and/or Mode-3 (i.e., multi-TRP operation) among different RRH groups in the same RRH cluster. Especially for the multi-TRP operation in a distributed RRH system, performing the DL/UL transmissions on a per RRH group basis could significantly simplify the system design and reduce the signaling overhead.

Similar to the configuration of a RRH cluster, there are various means to configure a RRH group within a given RRH cluster in a distributed RRH system. The configuration/determination of the RRH group could be after the configuration/determination of the RRH cluster.

In one embodiment of Option-I, the UE could be configured by the network to measure one or more RSs for RRH grouping from one or more RRHs. The UE could then report to the network the corresponding measurement results, upon which the network could determine the RRH groups within the RRH cluster for the UE of interest. The measurement results could be based on the propagation delays between the RRHs in the RRH cluster and the UE. The UE could be configured/indicated by the network the RRH grouping results, which could comprise of the RRH group IDs/indices, the corresponding RRH IDs/indices within each RRH group, primary RRH IDs/indices within each RRH group, and etc. Under certain settings, the RRH grouping results are transparent to the UE, i.e., the RRH grouping results are not indicated to the UE from the network.

In such embodiment, to facilitate measuring the RSs for RRH grouping from different RRHs and reporting the measurement results, the RSs for RRH grouping from different RRHs could be multiplexed in time, frequency, spatial and/or code domains. For instance, the UE could be configured by the network to measure the RSs for RRH grouping from different RRHs in different symbols/slots/etc. For another example, the UE could be configured by the network to measure the RSs for RRH grouping from different RRHs in different resource blocks. The UE could also be indicated by the network the association rule(s)/mapping relationship(s) between the RRH IDs/indices and the RSs for RRH grouping. In this case, the UE could know which RRH(s) in the RRH cluster the corresponding RSs for grouping are transmitted from.

In such embodiment, to facilitate measuring the RSs for RRH grouping from different RRHs and reporting the measurement results, the UE could be configured by the network to report the measurement results through certain time, frequency, spatial and/or code domain resources. For instance, the UE could be configured by the network to report the measurement results for different RRHs within the RRH cluster through different symbols/slots/etc. For another example, the UE could be configured by the network to report the measurement results for different RRHs within the RRH cluster on different resource blocks. The UE could be indicated by the network the association rule(s)/mapping relationship(s) between the RSs for RRH grouping and the reports and/or between the RRH IDs/indices within the RRH cluster and the reports. Alternatively, the UE could autonomously determine the association rule(s)/mapping relationship(s) between the RSs for RRH grouping (or the RRH IDs/indices) and the reports, and indicate to the network the association rule(s)/mapping relationship(s).

In such embodiment, to facilitate measuring the RSs for RRH grouping from different RRHs and reporting the measurement results, as indicated above, the measurement results/reports for RRH grouping could be based on the propagation delays between the RRHs in the RRH cluster and the UE. For instance, the UE could report to the network the propagation delay between each RRH in the RRH cluster and the UE. For another example, the UE could report to the network the differences between the propagation delay of one selected RRH and the propagation delays of the rest of the RRHs in the same RRH cluster. Examples of determining and reporting the propagation delay differences are provided below.

In one Example-1, the UE determines one RRH from the RRHs in the RRH cluster based on the propagation delay measurements. For instance, the selected reference RRH could have the largest propagation delay with the UE among all the RRHs in the RRH cluster. For another example, the UE could select the RRH that has the smallest propagation delay among all the RRHs in the RRH cluster. The UE could report to the network the propagation delay between the reference RRH and the UE. In addition, the UE could report to the network the differences between the propagation delay of the selected reference RRH and the propagation delays of the other RRHs in the RRH cluster (differential reports). The UE could also report a sign indicator associated with a differential report. The sign indicator indicates whether the propagation delay of the corresponding RRH is smaller or larger than that of the reference RRH.

In one Example-1.1, the UE incorporates an indicator in the report associated with the selected reference RRH; other reports not associated with the indicator are regarded as the differential reports.

In one Example-1.2, the UE incorporates a 1-bit indicator ("0" or "1") in all the reports associated with all the RRHs in the RRH cluster. For instance, "0" indicates that the report is a differential report, while "1" implies that the report corresponds to the propagation delay of the selected reference RRH.

In one Example-1.3, the UE reports to the network the RRH ID/index of the selected reference RRH.

In one Example-2, the UE could be indicated by the network the RRH ID/index of the reference RRH. For instance, the reference RRH could have the lowest RRH ID/index among all the RRHs in the RRH cluster. Alternatively, the UE could be indicated by the network which RSs are transmitted from the reference RRH. The UE could then report to the network the propagation delay between the reference RRH and the UE through the dedicated resource(s). The UE could also send the differential reports to the network for the other RRHs in the RRH cluster. Along with each differential report, the UE could associate a sign indicator to indicate whether the propagation delay between the RRH of interest and the UE is smaller or larger than that between the reference RRH and the UE.

The UE could be configured/indicated by the network through higher layer RRC signaling whether to directly report the propagation delay for each RRH in the RRH cluster or perform the differential reporting.

In one embodiment of Option-II, the UE could autonomously determine their RRH group(s) based on the measurement results of the DL RSs for RRH grouping from different RRHs. The UE could indicate to the network the RRH grouping results, which could comprise of the RRH group IDs/indices, the corresponding RRH IDs/indices within each RRH group, primary RRH IDs/indices within each RRH group, and etc. In this case, the UE needs to be indicated by the network the association rule(s)/mapping relationship(s) between the RRH IDs/indices in the RRH cluster and the RSs for RRH grouping.

Alternatively, if the UE anyways needs to report to the network the measurement results, the UE could indicate to the network the association(s) between different reports such that the RRHs corresponding to the associated reports are regarded as one RRH group for the UE. For instance, the UE could incorporate a reporting ID in each report such that reports having the same reporting ID are associated. This requires the UE and the network to have a common understanding of how the RRH IDs/indices and the reports are associated/mapped. For instance, the UE could be indicated by the network the association rule(s)/mapping relationship(s) between the RRH IDs/indices and the reports.

For another example, the UE could autonomously determine the association rule(s)/mapping relationship(s) between the RRH IDs/indices and the reports, and indicate to the network the association rule(s)/mapping relationship(s). The UE could be configured by the network through higher layer RRC signaling whether the UE could autonomously determine their RRH group(s) and/or indicate to the network the RRH grouping results. The UE could also send a status report to the network indicating whether the UE has autonomously determined their RRH group(s).

In one embodiment of Option-III, the UE could transmit certain preambles such as SRSs to the RRHs in the RRH cluster to assist RRH grouping. Based on the measurements of the UL preambles for RRH grouping, the network could determine the RRH group(s) for the UE of interest. The UE could then be configured/indicated by the network via higher layer RRC signaling the RRH grouping results, which could comprise of the RRH group IDs/indices, the corresponding RRH IDs/indices within each RRH group, primary RRH IDs/indices within each RRH group, and etc.

The UE could be configured/indicated by the network which option from Option-I, Option-II and Option-III to follow for configuring/determining the RRH group(s).

Similar to the RRH clustering, the RRH grouping results could be different for different transmission modes (Mode-1, Mode-2, Mode-3, and Mode-4 discussed before). Hence, along with the RRH grouping results, the UE could also be indicated by the network the associated transmission modes. If the UE autonomously determines the RRH groups and reports to the network the RRH grouping results, the UE could also report to the network the associated transmission modes. Under certain settings, not all of the transmission modes are active. For instance, the UE could receive a MAC CE command from the network that activates one or more of the transmission modes. In this case, the RRH groups are configured/determined only for the active transmission modes. If multiple transmission modes are active, the UE could be indicated by the network (or report to the network if the UE autonomously determines their RRH groups) that the RRH groups determined for one transmission mode (e.g., Mode-1) is the same as that configured for another transmission mode (e.g., Mode-3).

Due to channel variations, the RRH groups in the same RRH cluster for a UE could vary over time. For Option-I and Option-II, the UE could be configured by the network to periodically measure the DL RSs for RRH grouping and/or report to the network the measurement results. The UE could also be requested/triggered by the network to measure the DL RSs for RRH grouping and/or report to the network the corresponding measurement results in an aperiodic manner. For Option-III, the UE could be configured by the network to periodically transmit to the network the UL preambles for RRH grouping.

Alternatively, the UE could be requested/triggered by the network to transmit the UL preambles for RRH grouping in an aperiodic manner. For Option-I, Option-II, and Option-III, the UE could indicate to the network that new RRH groups are needed so that the network could configure (additional) DL RSs for RRH grouping for the UE to measure and report and/or the UE to transmit (additional) UL preambles for RRH grouping. Further, the UE could be configured by the network two timers (a third timer and a fourth timer). The UE could reset both timers if new RRH groups in the RRH cluster are configured and applied for the UE. The UE would not apply new RRH grouping results before the third timer expires. If the fourth timer expires, the UE would indicate to the network that new RRH groups are needed for the RRH cluster.

The UE could be configured by the network separate sets of RSs for RRH clustering and RRH grouping. Alternatively, the UE could be configured by the network the same RSs for both RRH clustering and RRH grouping. Similarly, the UE could use either separate sets of UL preambles or a common set of UL preambles for RRH clustering and RRH grouping, which could be configured by the network through higher layer RRC signaling. Further, the configuration of the RRH clustering results to the UE could also trigger the UE to measure the DL RSs for RRH grouping, or transmit the UL preambles for RRH grouping, or autonomously determine the RRH grouping results. The UE could be indicated by the network whether the RRH clustering/grouping is enabled.

For instance, if the UE is configured by the network that the RRH clustering is "enabled," the UE could follow Option-1, Option-2, or Option-3 to determine the RRH cluster. For another example, if the UE is configured by the network that the RRH grouping is "disabled," the UE would not expect to measure any DL RSs for RRH grouping and report the measurement results, transmit any UL preambles for RRH grouping, or autonomously determine the RRH grouping results.

Furthermore, after the RRH grouping, the UE could be indicated by the network the associations between the transmission modes (Mode-1, Mode-2, Mode-3, and Mode-4) and the RRHs in the RRH groups and/or the RRH groups in the RRH cluster. For instance, the UE could be configured/indicated by the network to perform Mode-4, i.e., uplink multi-TRP, across certain RRH groups and treat one RRH group as one TRP. For another example, the UE could be configured/indicated by the network to perform Mode-3, i.e., uplink distributed MIMO, across the RRHs within certain RRH group(s). For the example shown in FIG. 7, the UE could be indicated by the network to perform Mode-3 uplink multi-TRP operation across RRH group #0 and RRH group #1, while RRH group #0 and RRH group #1 are regarded as two TRPs. The UE could also be indicated by the network to perform Mode-4 uplink MIMO transmission across RRH_0, RRH_1 and RRH_2 in RRH group #0.

Figure 8:
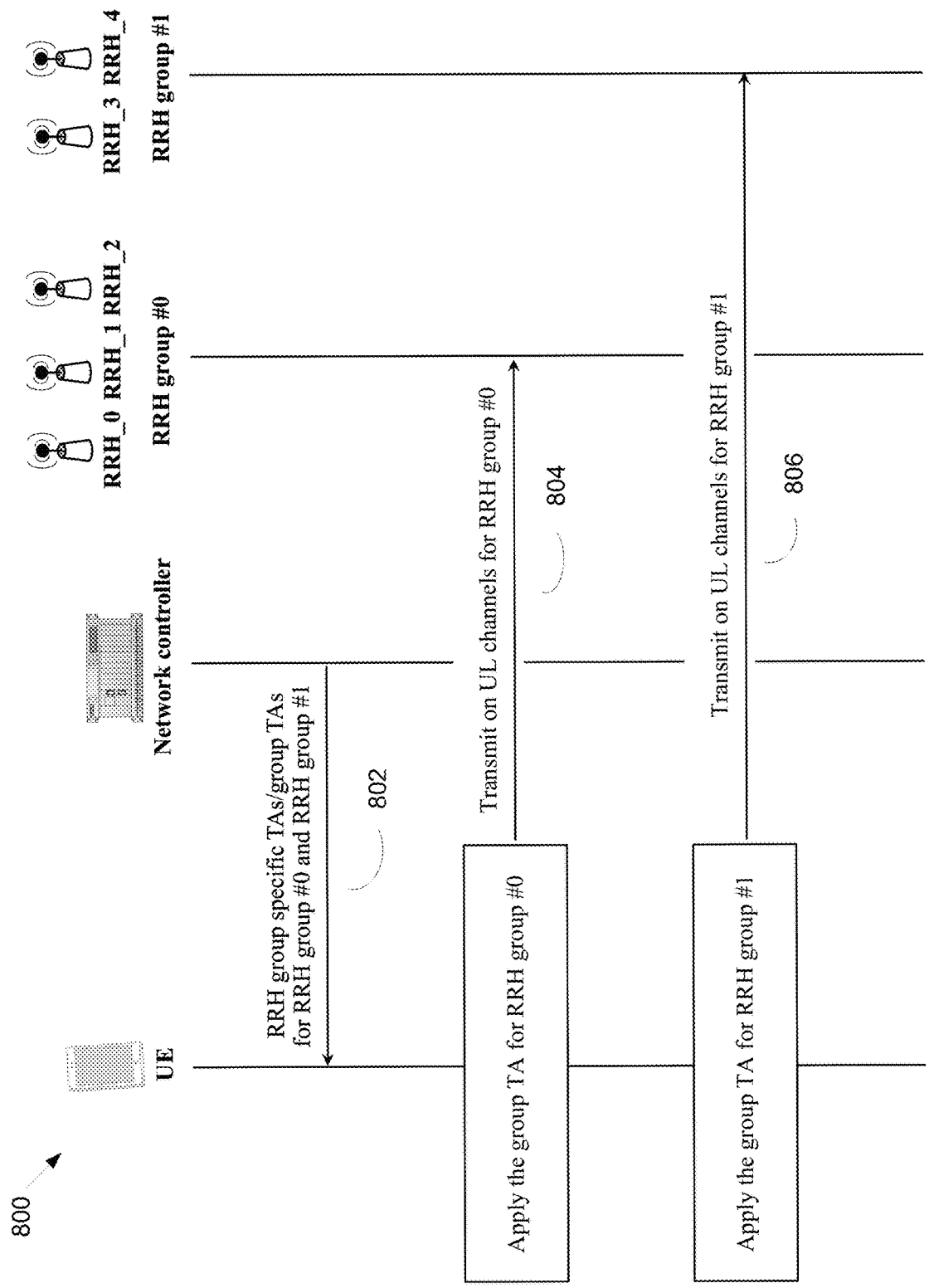
FIG. 8 illustrates a signaling flow for configuring group timing advances (Tas) for RRH groups according to embodiments of the present disclosure.

The propagation delay difference(s) between the RRHs from different RRH groups and the UE could be large, e.g., beyond the CP length, though the propagation delay difference(s) between the RRHs from the same RRH group and the UE could be smaller than the CP length. Hence, the UE could be configured/indicated by the network one or more RRH group specific TAs (or group TAs), and the UE would apply the RRH group specific TAs/group TAs to the UL transmissions to the corresponding RRH groups. In FIG. 8, an example of configuring the RRH group specific TAs/group TAs for the setting depicted in FIG. 7 is presented.

FIG. 8 illustrates a signaling flow 800 for configuring group TAs for RRH groups according to embodiments of the present disclosure. For example, the signaling flow 800 as may be performed by a UE such as 111-116 as illustrated in FIG. 1 and a base station such as 101-103 as illustrated in FIG. 1. An embodiment of the signaling flow 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

As illustrated in FIG. 8, in step 802, a UE sends, to a network controller, information including RRH group specific TAs/group TAs for RRH group #0 and RRH group #1. In step 804, the UE applies the group TA for RRH group #0 and transmits on UL channels for RRH group #0. In step 806, the UE applies the group TA for RRH group #1 and transmits on UL channels for RRH group #1.

After the configuration of the RRH group(s), the UE could be configured by the network to measure the DL RSs transmitted from one or more RRHs within each RRH group and calculate the corresponding propagation delays. The UE could then report to the network their calculated RRH group specific propagation delays. For the example shown in FIG. 7, the UE could be configured by the network to measure the DL RSs transmitted from RRH_1 in RRH group #0 and the DL RSs transmitted from RRH_4 in RRH group #1. The UE could compute the propagation delays between RRH_1, RRH_4 and the UE, and report them to the network. Alternatively, after the configuration of the RRH group(s), the UE could be configured/indicated by the network to transmit the UL preambles to one or more RRHs in each RRH group. By measuring the UL preambles, the network could then determine the (RRH group specific) propagation delays between different RRH groups and the UE. Based on the estimated RRH group specific propagation delays, the network could determine the RRH group specific TA or group TA as the round trip delay between the corresponding RRH group and the UE (twice of the RRH group specific propagation delay).

There are various means to indicate to the UE the RRH group specific TAs/group TAs.

In one embodiment of Method-1, the UE could receive one or more MAC CE commands from the network indicating one or more group TAs for the RRH groups. Furthermore, a TA group ID is incorporated in each MAC CE command indicating the group TA. A TA group ID could be associated with a RRH group ID, and the UE could be explicitly indicated by the network the association between the TA group ID and the RRH group ID.

Figure 9:
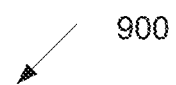
FIG. 9 illustrates an example of a medium access control (MAC) control element (CE) commands indicating absolute group TAs for RRH groups according to embodiments of the present disclosure.

FIG. 9 illustrates an example of MAC CE commands indicating absolute group TAs for RRH groups 900 according to embodiments of the present disclosure. An embodiment of the MAC CE commands indicating the absolute group TAs for the RRH groups 900 shown in FIG. 9 is for illustration only.

Alternatively, the UE could know the association in an implicit manner. For instance, the lowest TA group ID could correspond to the lowest RRH group ID, the second lowest TA group ID could correspond to second lowest RRH group ID, and so on. The highest TA group ID could correspond to the highest RRH group ID. In FIG. 9, two MAC CE commands containing the group TAs for RRH group #0 and RRH group #1 in FIG. 7 are depicted. As can be seen from FIG. 9, TA group ID #0 and TA group ID #1 are appended to the corresponding MAC CE commands. Upon receiving and decoding the MAC CE commands embedding the group TAs, the UE could apply appropriate TA values to the UL transmissions to the corresponding RRH groups (see FIG. 8).

In one embodiment of Method-2, the UE could be first indicated/configured by the network via higher layer RRC signaling a set of candidate group TA values. The UE could then be indicated by the network one or more group TA indices, each for a RRH group in the RRH cluster. Based on the indicated group TA indices, the UE could extract the exact group TAs from the set of candidate group TA values. For instance, denote the set of candidate group TA values by $\{t\_1, t\_2, t\_3, t\_4, \ldots, t\_N\}$.

For the example shown in FIG. 7, the UE could be indicated by the network two group TA indices, e.g., 1 and 3, for RRH group #0 and RRH group #1, respectively. Based on the indicated group TA indices, the UE could then derive the group TAs for RRH group #0 and RRH group #1 from the set of candidate group TA values as t_1 and t_3.

In one embodiment of Method-3, the UE could be indicated/configured by the network via higher layer RRC signaling multiple sets of candidate group TA values, each corresponding to a RRH group in the RRH cluster. For the example shown FIG. 7, two sets of candidate group TA values are defined, denoted by $T=\{t\_1, t\_2, t\_3, t\_4, \ldots, t\_N\}$ and $T'=\{t'\_1, t'\_2, t'\_3, t'\_4, \ldots, t'\_N\}$. Furthermore, the set T corresponds to RRH group #0 and the set T' is associated with RRH group #1. The UE could be explicitly indicated by the network the mapping relationship between the sets of candidate group TA values and the RRH groups. Alternatively, the UE could know the mapping relationship between the sets of candidate group TA values and the RRH groups in an implicit manner.

For example, the first indicated set of candidate TA values could correspond to the first RRH group with lowest RRH group ID, the second indicated set of candidate TA values could correspond to the second RRH group with the second lowest RRH group ID, and so on, and the last indicated set of candidate group TA values could correspond to the last RRH group with the highest RRH group ID. Again, consider the example shown in FIG. 7. If the UE is indicated by the network two group TA indices, e.g., 1 and 3, for RRH group #0 and RRH group #1, respectively, the UE could derive the group TAs for RRH group #0 and RRH group #1 from the sets of candidate group TA values T and T' as t_1 and t'_3.

For both Method-2 and Method-3, the UE could be explicitly indicated by the network the mapping relationship between the group TA indices and the RRH groups. Alternatively, the UE could know the mapping relationship between the group TA indices and the RRH groups in an implicit manner. For example, the first indicated group TA index could correspond to the first RRH group with the lowest RRH group ID, the second indicated group TA index could correspond to the second RRH group with the second lowest RRH group ID, and so on. The last indicated group TA index could correspond to the last RRH group with the highest RRH group ID.

Furthermore, the UE could be indicated by the network the group TA index(s) through various signaling mediums, which could also determine the mapping relationship between the group TA indices and the RRH groups.

In one example Example-1A, the UE could receive the group TA indices from the SRS resource or resource set configuration. For instance, the UE could receive all the group TA indices from a common SRS resource or resource set configuration for all the RRH groups. Alternatively, the UE could be configured by the network separate SRS resource or resource set configurations, each for a RRH group (e.g., associated with the RRH group ID) in the RRH cluster. In this case, the UE could receive the group TA index for a RRH group from the dedicated SRS resource or resource set configuration. For the example shown in FIG. 7, the UE could be first configured by the network two separate SRS resource or resource set configurations, SRS_config_0 and SRS_config_1, for RRH group #0 and RRH group #1, respectively. The UE could then receive the group TA index for RRH group #0 from SRS_config_0, and the group TA index for RRH group #1 from SRS_config_1. Based on the indicated group TA indices from the SRS resource or resource set configuration(s), the UE could obtain the exact group TAs for the RRH groups in the RRH cluster (following Method-2 and/or Method-3). The UE could then apply the group TAs to the SRS transmissions to the corresponding RRH groups (see FIG. 10).

Figure 10:
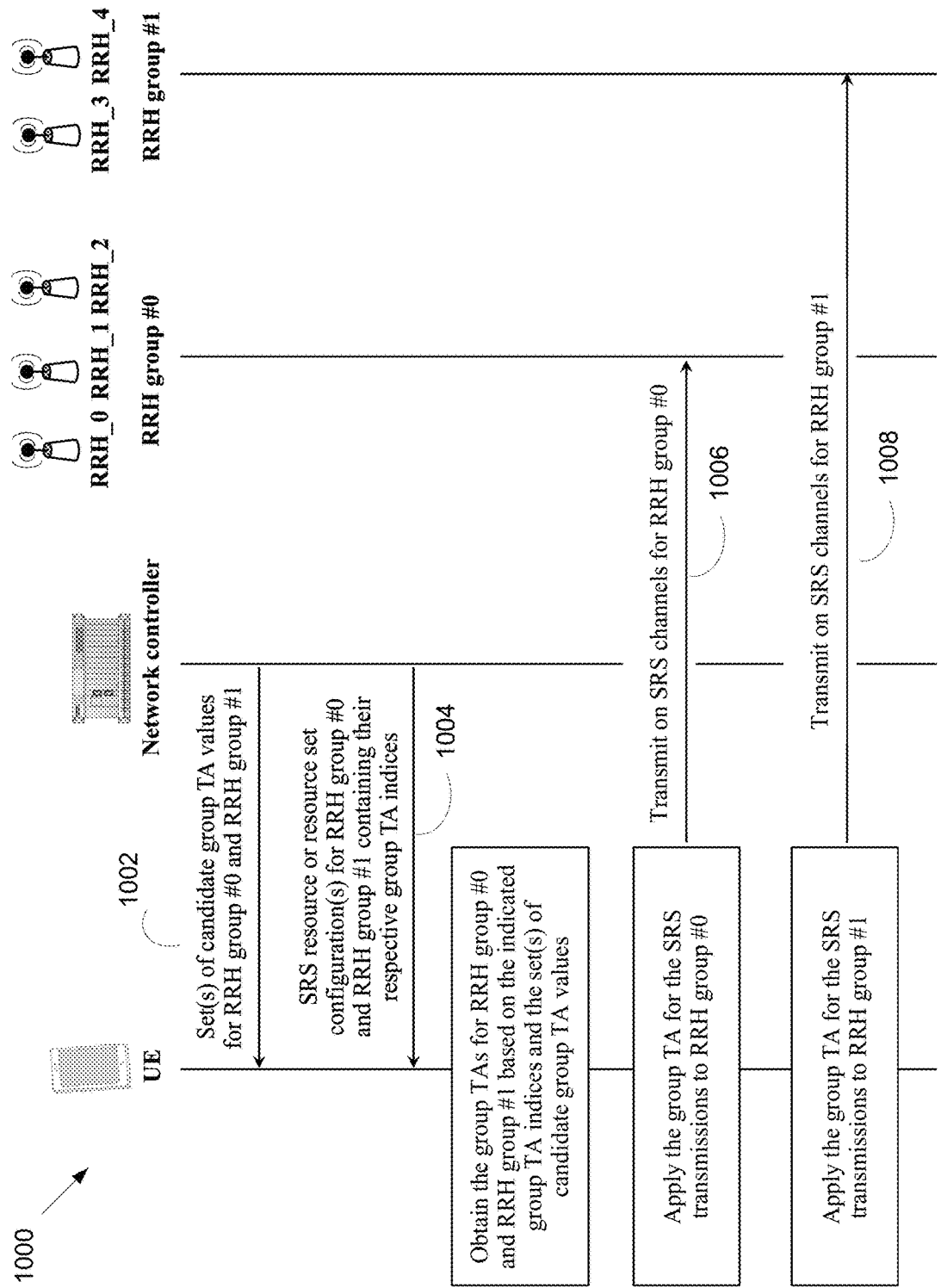
FIG. 10 illustrates a signaling flow for transmitting sounding reference signals (SRSs) based on RRH group specific TAs according to embodiments of the present disclosure.

FIG. 10 illustrates a signaling flow 1000 for transmitting SRSs based on RRH group specific TAs according to embodiments of the present disclosure. For example, the signaling flow 1000 as may be performed by a UE such as 111-116 as illustrated in FIG. 1 and a base station such as 101-103 as illustrated in FIG. 1. An embodiment of the signaling flow 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

As illustrated in FIG. 10, in step 1002, a network controller sends, to a UE, a set of candidate group TA values for RRH group #0 and RRH group #1. In step 1004, the network controller sends, to the UE, SRS resource or resource set configuration(s) for RRH group #0 and RRH group #1 containing their respective group TA indices. The UE obtains the group TAs for RRH group #0 and RRH group #1 based on the indicated group TA indices and the set(s) of candidate group TA values. After applying the group TA for the SRS transmissions to RRH group #0, in step 1006, the UE transmits the corresponding SRSs for RRH group #0. After applying the group TA for the SRS transmissions to RRH group #1, the UE transmits the corresponding SRSs for RRH group #1.

In one Example-2A, the UE could receive the group TA indices from the uplink control channel resource configuration. For instance, the UE could receive all the group TA indices from a common uplink control channel configuration for all the RRH groups. Alternatively, the UE could be configured by the network separate uplink control channel configurations, each for a RRH group (e.g., associated with the RRH group ID) in the RRH cluster. In this case, the UE could receive the group TA index for a RRH group from the dedicated uplink control channel configuration. For the example shown in FIG. 7, the UE could be first configured by the network two separate uplink control channel configurations, PUCCH_config_0 and PUCCH_config_1, for RRH group #0 and RRH group #1, respectively. The UE could then receive the group TA index for RRH group #0 from PUCCH_config_0, and the group TA index for RRH group #1 from PUCCH_config_1. Based on the indicated group TA indices from the uplink control channel configuration(s), the UE could obtain the exact group TAs for the RRH groups in the RRH cluster (following Method-2 and/or Method-3). The UE could then apply the group TAs to the PUCCH transmissions to the corresponding RRH groups (see FIG. 11).

Figure 11:
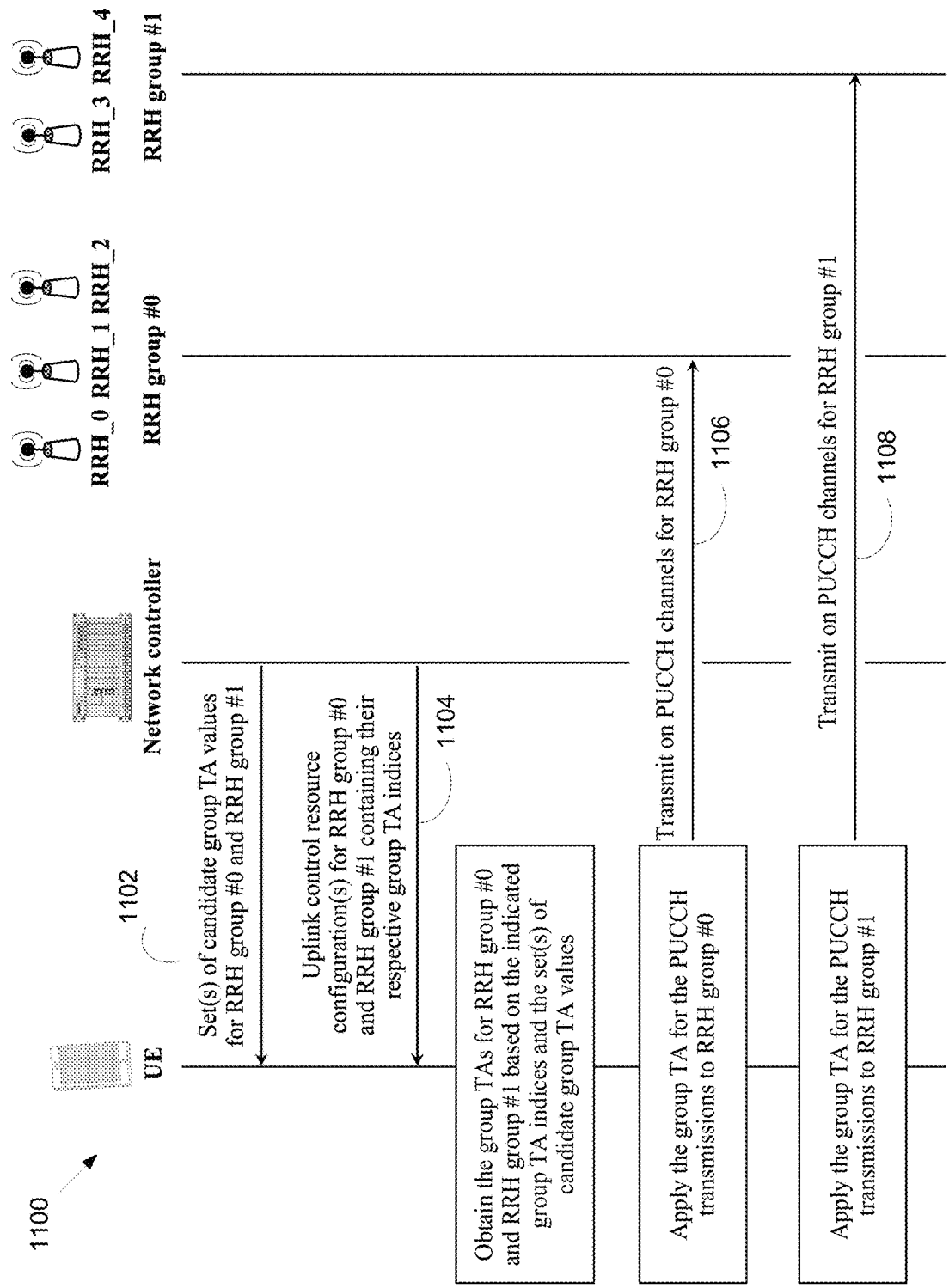
FIG. 11 illustrates a signaling flow for transmitting physical uplink control channels (PUCCHs) based on RRH group specific Tas according to embodiments of the present disclosure.

FIG. 11 illustrates a signaling flow 1100 for transmitting PUCCHs based on RRH group specific TAs according to embodiments of the present disclosure. For example, the signaling flow 1100 as may be performed by a UE such as 111-116 as illustrated in FIG. 1 and a base station such as 101-103 as illustrated in FIG. 1. An embodiment of the signaling flow 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

As illustrated in FIG. 11, in step 1102, a network controller sends, to a UE, a set of candidate group TA values for RRH group #0 and RRH group #1. In step 1104, the network controller sends, to the UE, uplink control resource configuration(s) for RRH group #0 and RRH group #1 containing their respective group TA indices. The UE obtains the group TAs for RRH group #0 and RRH group #1 based on the indicated group TA indices and the set(s) of candidate group TA values. After applying the group TA for the PUCCH transmissions to RRH group #0, in step 1106, the UE transmits on PUCCH channels for RRH group #0. After applying the group TA for the PUCCH transmissions to RRH group #0, in step 1108, the UE transmits on PUCCH channels for RRH group #1.

In one example of Example-3A, the group TA indices could be associated with separate SRS resource indicators (SRIs). Each SRI could be associated with a RRH group in the RRH cluster (e.g., through the RRH group ID). The UE could be indicated by the network the group TA indices along with the SRIs through one or more DCIs. Based on the association between the SRIs and the RRH groups, the UE could know the mapping relationships between the RRH groups and the group TA indices. For the example shown in FIG. 7, the UE could be first configured by the network two separate SRIs, SRI_0 and SRI_1, for RRH group #0 and RRH group #1, respectively. The UE could also receive two group TA indices associated with SRI_0 and SRI_1, respectively. The UE could then derive the group TA index for RRH group #0 (associated with SRI_0), and the group TA index for RRH group #1 (associated with SRI_1). Based on the indicated group TA indices associated with the SRIs, the UE could obtain the exact group TAs for the RRH groups in the RRH cluster (following Method-2 and/or Method-3). The UE could then apply the group TAs to the corresponding PUSCH transmissions to the corresponding RRH groups (see FIG. 12) because the SRI and the PUSCH could be linked/mapped.

Figure 12:
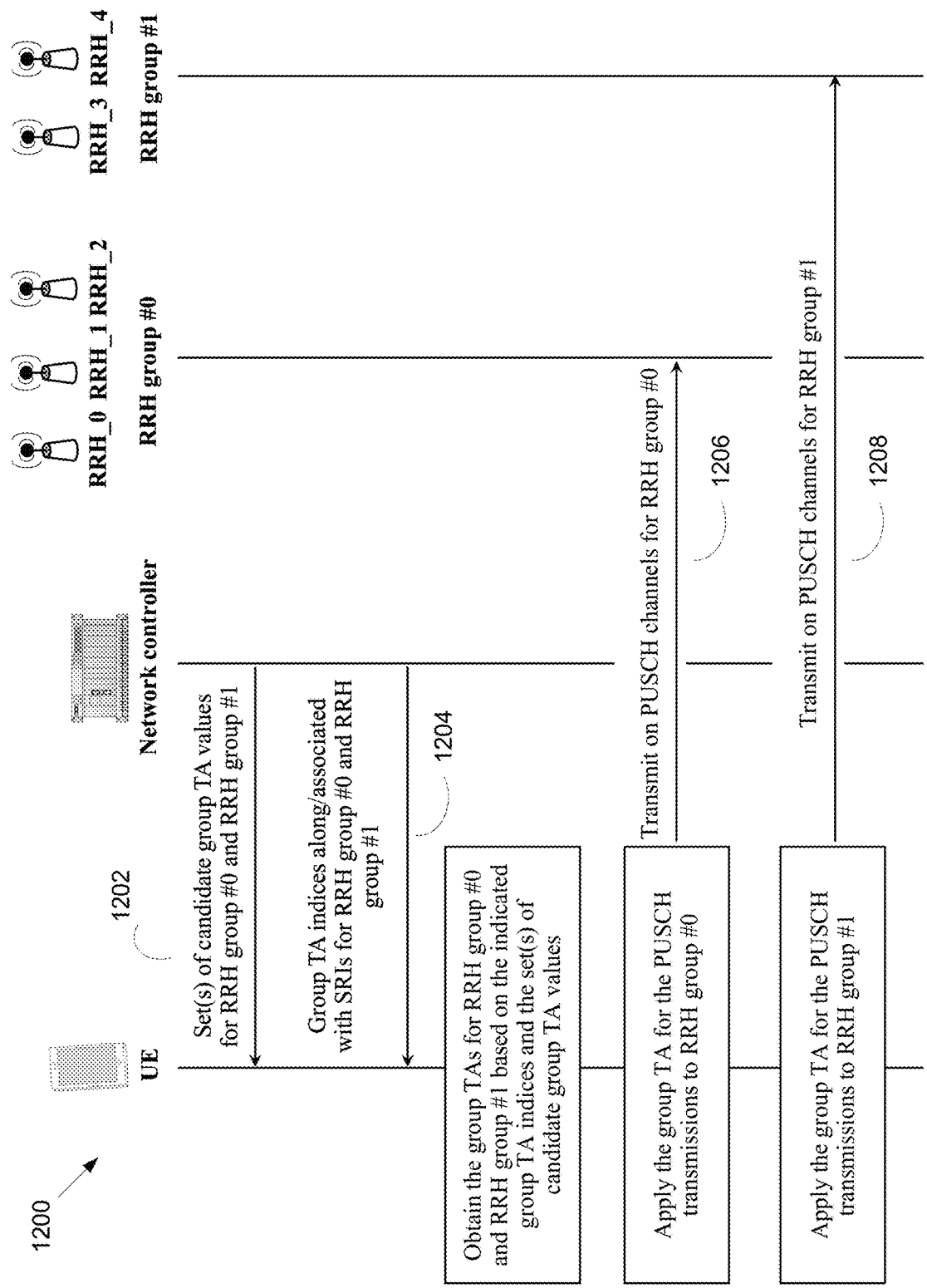
FIG. 12 illustrates a signaling flow for transmitting PUSCHs based on RRH group specific Tas according to embodiments of the present disclosure.

FIG. 12 illustrates a signaling flow 1200 for transmitting PUSCHs based on RRH group specific TAs according to embodiments of the present disclosure. For example, the signaling flow 1200 as may be performed by a UE such as 111-116 as illustrated in FIG. 1 and a base station such as 101-103 as illustrated in FIG. 1. An embodiment of the signaling flow 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

As illustrated in FIG. 12, in step 1202, a network controller sends, to a UE, a set of candidate group TA values for RRH group #0 and RRH group #1. In step 1204, the network controller sends, to the UE, group TA indices along/associated with SRIs for RRH group #0 and RRH group #1. The UE obtains the group TAs for RRH group #0 and RRH group #1 based on the indicated group TA indices and the set(s) of candidate group TA values. After applying the group TA for the PUSCH transmissions to RRH group #0, in step 1206, the UE transmits on PUSCH channels for RRH group #0. In step 1208, after applying the group TA for the PUSCH transmissions to RRH group #1, the UE transmits on PUSCH channels for RRH group #1.

Alternative to the indication of the exact group TAs, the UE could also be indicated by the network differential group TAs, or differential group TA indices. In the following, several differential group TAs/group TA indices indication methods are discussed.

Figure 13:
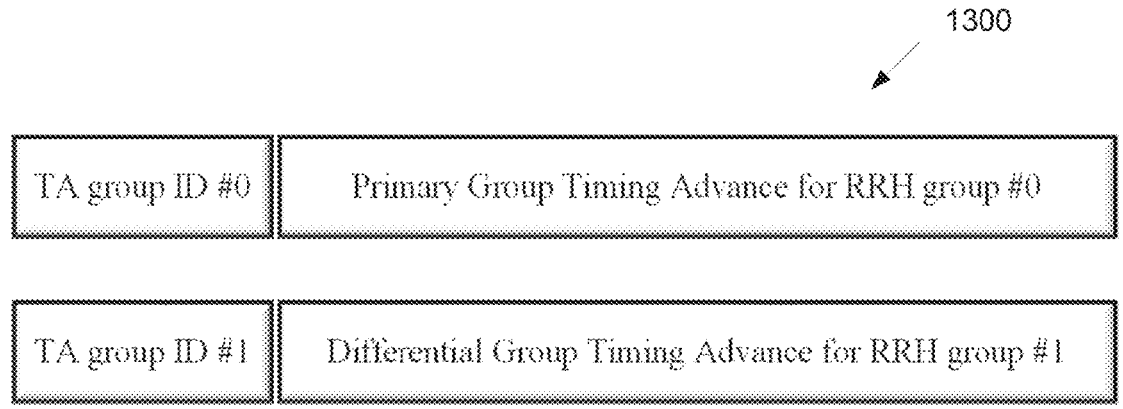
FIG. 13 illustrates an example of MAC CE commands indicating absolute and differential group Tas for RRH groups according to embodiments of the present disclosure.

In one embodiment of Method-I, the UE could receive one or more MAC CE commands from the network indicating one or more primary group TAs and one or more differential group TAs for the RRH groups. For example, the UE could receive one primary group TA for one primary RRH group, and differential group TAs (with respect to the primary group TA) for the other RRH groups in the RRH cluster. Based on the primary group TA and the differential group TAs, the UE could derive the exact group TAs for the other RRH groups (other than the primary RRH group) in the RRH cluster. For the example shown in FIG. 7, the UE could be indicated by the network the (primary) group TA for (primary) RRH group #0, and a differential group TA for RRH group #1. The TA group IDs are attached to both the MAC CE commands for indicating the primary group TA and the differential group TA as shown in FIG. 13. Furthermore, there could be various ways to indicate to the UE whether the configured group TA is a primary group TA or a differential group TA.

FIG. 13 illustrates an example of MAC CE commands indicating absolute and differential group TAs for RRH groups 1300 according to embodiments of the present disclosure. An embodiment of the MAC CE commands indicating the absolute and differential group TAs for the RRH groups 1300 shown in FIG. 13 is for illustration only.

Figure 14A:
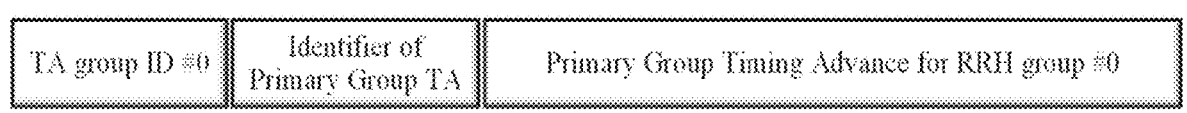
FIG. 14A illustrates an example of MAC CE command for group TA indication including a RRH group identifier (ID) according to embodiments of the present disclosure.

FIG. 14A illustrates an example of MAC CE command for group TA indication including a RRH group ID 1400 according to embodiments of the present disclosure. An embodiment of the MAC CE command for group TA indication including the RRH group ID 1400 shown in FIG. 14A is for illustration only.

Figure 14B:
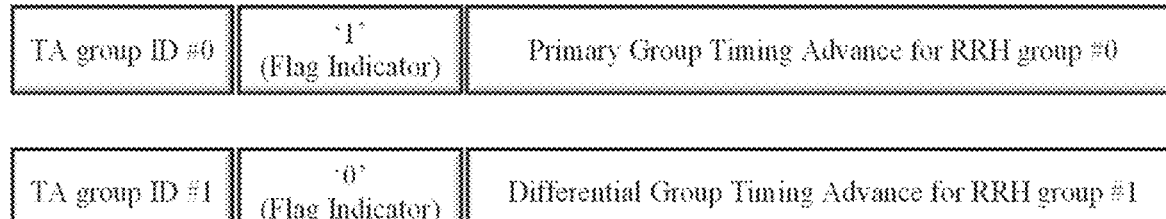
FIG. 14B illustrates an example of MAC CE commands for group TA indication including one-bit flag indicators according to embodiments of the present disclosure.

FIG. 14B illustrates an example of MAC CE commands for group TA indication including one-bit flag indicators 1450 according to embodiments of the present disclosure. An embodiment of the MAC CE commands for group TA indication including the one-bit flag indicators 1450 shown in FIG. 14B is for illustration only.

In the following, several design examples are listed: (1) Example-A: the UE could be explicitly indicated by the network the RRH group ID (or the associated TA group ID) of the primary RRH group, with which the primary group TA is associated; (2) Example-B: a primary group TA identifier is incorporated in the corresponding MAC CE command as shown in FIG. 14A. The UE could identify the primary group TA by detecting the primary group TA identifier; and (3) Example-C, a flag indicator is incorporated in the MAC CE commands for both primary group TA and differential group TA indications. For instance, the flag indicator could be set to "1" if the primary group TA is indicated, and '0' if the differential group TA is indicated (see FIG. 14B).

In one embodiment of Method-II, the UE could be first indicated/configured by the network via higher layer RRC signaling a set of candidate primary group TA values. Furthermore, the UE could be indicated/configured by the network via higher layer RRC signaling a set of candidate differential group TA values. The UE could then be indicated by the network one primary group TA index along with one or more differential group TA indices. The UE could be indicated by the network the RRH group ID of the primary RRH group associated with the primary group TA. For instance, denote the set of candidate primary group TA values by {pt_1, pt_2, pt_3, pt_4, . . . , pt_N} and the set of candidate differential group TA values by {dt_1, dt_2, dt_3, dt_4, . . . , dt_M}.

For the example shown in FIG. 7, the UE could be indicated by the network one primary group TA index, e.g., 1, for RRH group #0, and one differential group TA index, e.g., 3, for RRH group #1. The UE could first derive the group TA for RRH group #0 as pt_1. The UE could then determine the group TA for RRH group #1 based on pt_1 and dt_3 as, e.g., pt_1+dt_3.

In one embodiment of Method-III, the UE could be indicated/configured by the network via higher layer RRC signaling multiple sets of candidate primary group TA values, each corresponding to a RRH group in the RRH cluster. Further, the UE could be indicated/configured by the network via higher layer RRC signaling multiple sets of candidate differential group TA values, each corresponding to a RRH group in the RRH cluster.

For the example shown FIG. 7, two sets of candidate primary group TA values are defined, denoted by pT={pt_1, pt_2, pt_3, pt_4, . . . , pt_N} and pT'={pt'_1, pt'_2, pt'_3, pt'_4, . . . , pt'_N}. The set pT corresponds to RRH group #0 and the set pT' is associated with RRH group #1. Further, two sets of candidate differential group TA values are defined, denoted by dT={dt_1, dt_2, dt_3, dt_4, . . . , dt_N} and dT'={dt'_1, dt'_2, dt'_3, dt'_4, . . . , dt'_N}. The set dT corresponds to RRH group #0 and the set dT' is associated with RRH group #1. The UE could be explicitly indicated by the network the mapping relationship between the sets of candidate primary/differential group TA values and the RRH groups.

Alternatively, the UE could know the mapping relationship between the sets of candidate primary/differential group TA values and the RRH groups in an implicit manner. For example, the first indicated set of candidate primary/differential TA values could correspond to the first RRH group with lowest RRH group ID, the second indicated set of candidate primary/differential TA values could correspond to the second RRH group with the second lowest RRH group ID, and so on. The last indicated set of candidate primary/differential group TA values could correspond to the last RRH group with the highest RRH group ID. Again, consider the example shown in FIG. 7. If the UE is indicated by the network one primary group TA index, e.g., 1, for RRH group #0 and one differential group TA index, e.g., 3, for RRH group #1, the UE could derive the group TA for RRH group #0 as pt_1, and the group TA for RRH group #1 as, e.g., pt_1+dt'_3.

The signaling mediums to carry the primary/differential group TA indices could be the SRS resource or resource set configuration(s), uplink control resource configuration(s) and SRIs, same as those discussed in Example-1A, Example-2A, and Example-3A in the present disclosure. For Method-I, Method-II, and Method-III, the UE could be indicated by the network the formula(s)/rule(s) to determine the differential group TA. For instance, given two group TAs denoted by pt_1 and pt_2 with pt_1 as the primary group TA, the differential group TA for pt_2 can be calculated as dt_2=pt_2−pt_1 (Rule-1) or dt_2=|pt_2−pt_1| (Rule-2). For both Rule-1 and Rule-2, the UE could be indicated by the network a sign indicator (e.g., "0" indicates negative and "1" indicates positive) associated with each differential group TA or differential group TA index indication. Under certain settings for Rule-1, the sign indicator may not be needed. For example, in Method-II and Method-III, the set(s) of candidate differential group TA values could contain both positive and negative values.

Alternative to the network configuration/indication of the group TA, the UE could autonomously determine and apply the RRH group specific TAs/group TAs to the UL transmissions to the corresponding RRH groups. The UE could indicate to the network whether the UE has autonomously determined/applied the group TAs to the UL transmissions (e.g., SRS, PUCCH and/or PUSCH) to the corresponding RRH groups. Furthermore, the UE could also report to the network which RRH group(s) (e.g., in terms of RRH group ID(s)) the UE has autonomously determined/applied the group TAs for. The UE could also be indicated/configured by the network which RRH group(s) (e.g., in terms of RRH group ID(s)) the UE could autonomously determine/apply the group TA for. For the RRH group(s) that the UE could not autonomously determine and apply the group TA(s) for, the UE would follow the network configuration/indication to determine the corresponding group TA(s) as discussed in FIG. 8-FIG. 14B.

Figure 15:
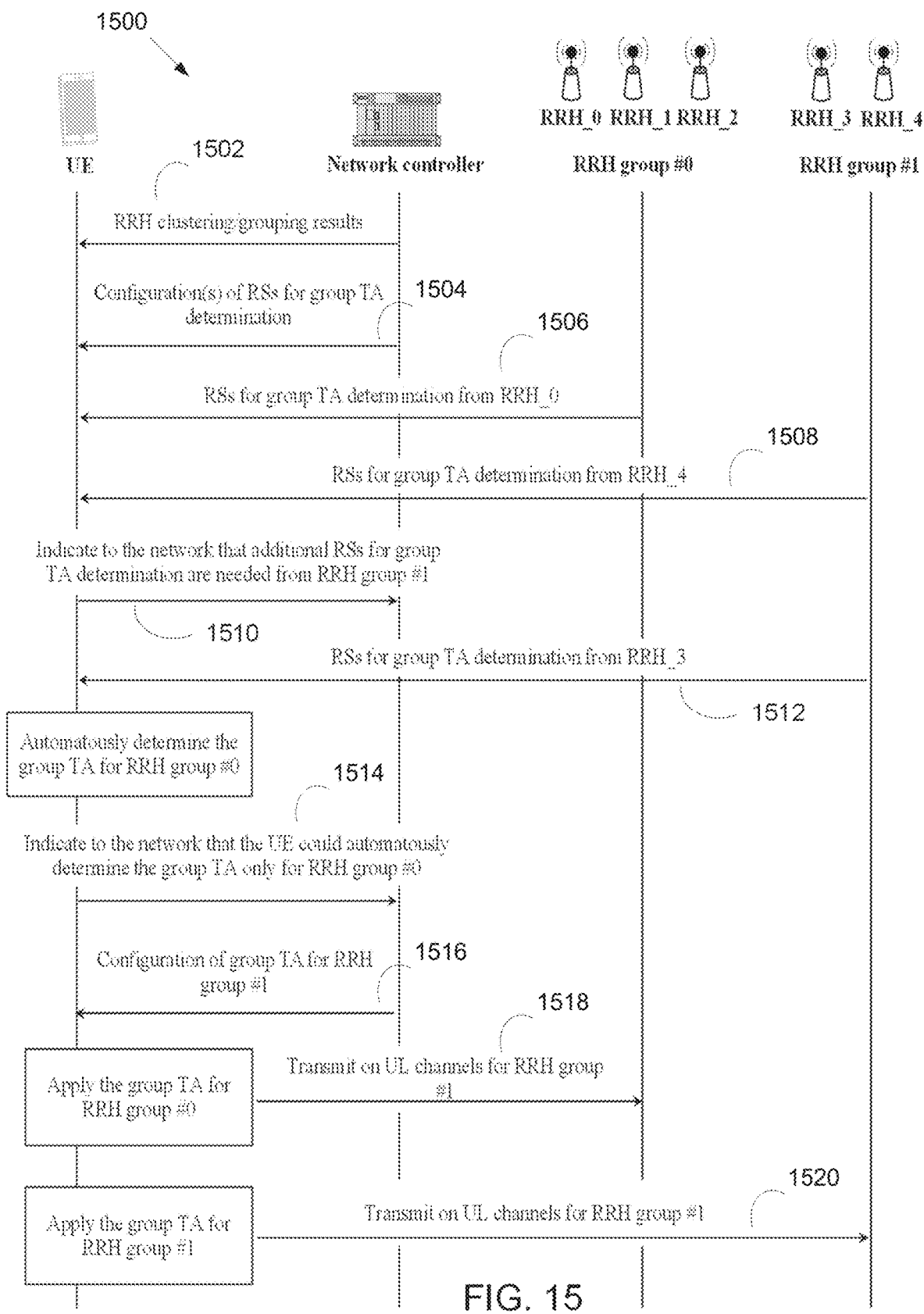
FIG. 15 illustrates a signaling flow for determining and configuring group TAs for RRH groups according to embodiments of the present disclosure.

FIG. 15 illustrates a signaling flow 1500 for determining and configuring group TAs for RRH groups according to embodiments of the present disclosure. For example, the signaling flow 1500 as may be performed by a UE such as 111-116 as illustrated in FIG. 1 and a base station such as 101-103 as illustrated in FIG. 1. An embodiment of the signaling flow 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

In FIG. 15, a conceptual example characterizing the signaling procedure of how the UE could autonomously determine the group TAs for the RRH groups is presented. As indicated in FIG. 15, after the RRH clustering/grouping, the UE could be indicated by the network to measure one or more DL RSs for group TA determination transmitted from one or more RRHs within each RRH group (e.g., RRH_0 in RRH group #0 and RRH_4 in RRH group #1). Here, the DL RSs for group TA determination are associated with the RRH group(s), e.g., through the RRH group ID(s).

As illustrated in FIG. 15, in step 1502, a network controller transmits, to a UE, RRH clustering/grouping results. In step 1504, the network controller transmits, to the UE, configuration(s) of RSs for group TA determination. In step 1506, the RRH group #0 transmits, to the UE, RSs for group TA determination from RRH_0. In step 1508, the RRH group #1 transmits, to the UE, RSs for group TA determination from RRH_4. In step 1510, the UE indicates to the network that additional RSs for group TA determination are needed from RRH group #1. In step 1512, the RRH group #1 transmits, to the UE, RSs for group TA determination from RRH_3. The UE autonomously determines the group TA for RRH group #0. In step 1514, the UE indicates to the network controller that the UE could autonomously determine the group TA only for RRH group #0. In step 1516, the network controller transmits, to the UE, a configuration of group TA for RRH group #1. After applying the group TA for RRH group #0, in step 1518, the UE transmits, to the RRH group #0, on UL channels for RRH group #0. After applying the group TA for RRH group #1, in step 1520, the UE transmits, to the RRH group #1, on UL channels for RRH group #1.

The UE could be explicitly indicated by the network the association rule(s)/mapping relationship(s) between the RSs for group TA determination and the RRH groups so that the UE could know from which RRH group(s) the RSs for group TA determination are transmitted. Furthermore, the UE could indicate to the network to transmit additional RSs for group TA determination from one or more RRHs in one or more particular RRH groups, wherein the RRH group ID could be included (e.g., RRH group #1 shown in FIG. 15). For example, in various embodiments the UE is indicated one or more of a number of cells in the cell group, an entity identifier (ID) of the target cell (or RRH) in the cell (or RRH) group; an entity ID of a reference cell (or RRH) in the cell (or RRH) group; and a cell (or RRH) group ID associated with the cell group, Here, the entity ID corresponds to one or more of: a physical cell ID (PCI), a CORESET-PoolIndex value, a PCI index pointing to a PCI in a list of PCIs that are higher layer configured to the UE, and a cell index pointing to a cell in the cell group.

After determining the group TAs, the UE could apply them to the UL transmissions to the corresponding RRH groups (e.g., RRH group #0). In the example shown in FIG. 15, the UE indicates to the network that the UE has autonomously determined and applied the group TA for RRH group #0. For RRH group #1, the UE could follow the network configuration/indication to determine the corresponding group TA.

The UE could be indicated by the network via higher layer RRC signaling that the UE may follow the network indication/configuration to determine the RRH group specific TA(s)/group TA(s), i.e., the UE is not allowed to autonomously determine and apply the RRH group specific TA(s)/group TA(s) for any of the RRH group(s). Meanwhile, the UE could be indicated by the network that the UE could autonomously determine and apply the RRH specific TAs for the RRHs within each RRH group. The UE could be further indicated by the network within which RRH group(s) the UE could autonomously determine and apply the RRH specific TA(s) for the corresponding RRHs. Without relying on the network configuration/indication, the UE could autonomously determine and apply the RRH specific TAs for the RRHs within one or more RRH groups. In this case, the UE could indicate to the network within which RRH group(s) the UE has autonomously determined and applied the RRH specific TAs for the corresponding RRHs.

The present disclosure also considers several UE reporting assisted distributed arrays/RRHs calibration/synchronization methods for the distributed RRH system. In the present disclosure, the reporting metrics/quantities are related to the Doppler spreads/shifts, propagation delays, relative timing alignment errors (TAEs) and/or average delays/delay spreads of the multi-paths for different RRHs. The associated configuration/indication methods are also discussed.

There are various means to configure a RRH cluster for a given UE in a distributed RRH system.

In one embodiment of Option-1B, the UE could be configured by the network to measure one or more reference signals (RSs) for RRH clustering from one or more RRHs. The UE could then report to the network the corresponding measurement results, upon which the network could determine the RRH cluster for the UE of interest. The measurement results could be based on L1-RSRP, L1-SINR and/or other L1 metrics. The UE could be configured/indicated by the network the RRH clustering results, which could comprise of the corresponding RRH IDs/indices, a primary RRH ID/index, and etc. Under certain settings, the RRH clustering results are transparent to the UE, i.e., the RRH clustering results are not indicated to the UE from the network.

In such embodiment, to facilitate measuring the RSs for RRH clustering from different RRHs and reporting the measurement results, the RSs for RRH clustering from different RRHs could be multiplexed in time, frequency, spatial and/or code domains. For instance, the UE could be configured by the network to measure the RSs for RRH clustering from different RRHs in different symbols/slots/ etc. For another example, the UE could be configured by the network to measure the RSs for RRH clustering from different RRHs in different resource blocks. The UE could also be indicated by the network the association rule(s)/ mapping relationship(s) between the RRH IDs/indices and the RSs for RRH clustering. In this case, the UE could know which RRH(s) the corresponding RSs for RRH clustering are transmitted from.

In such embodiment, to facilitate measuring the RSs for RRH clustering from different RRHs and reporting the measurement results, the UE could be configured by the network to report the measurement results through certain time, frequency, spatial and/or code domain resources. For instance, the UE could be configured by the network to report the measurement results for different RRHs through different symbols/slots/etc. For another example, the UE could be configured by the network to report the measurement results for different RRHs through different resource blocks. The UE could be indicated by the network the association rule(s)/mapping relationship(s) between the RSs for RRH clustering and the reports and/or between the RRH IDs/indices and the reports. Alternatively, the UE could autonomously determine the association rule(s)/mapping relationship(s) between the RSs for RRH clustering (or the RRH IDs/indices) and the reports, and indicate to the network the association rule(s)/mapping relationship(s).

In one embodiment of Option-2B, the UE could autonomously determine their RRH cluster based on the measurement results of the DL RSs for RRH clustering from different RRHs. The UE could indicate to the network the RRH clustering results, which could comprise of the corresponding RRH IDs/indices, a primary RRH ID/index, and etc. In this case, the UE needs to be indicated by the network the association rule(s)/mapping relationship(s) between the RRH IDs/indices and the RSs for RRH clustering.

Alternatively, if the UE anyways needs to report to the network the measurement results, the UE could indicate to the network the association(s) between different reports such that the RRHs corresponding to the associated reports are regarded as the RRH cluster for the UE. This requires the UE and the network to have a common understanding of how the RRH IDs/indices and the reports are associated/mapped. For instance, the UE could be indicated by the network the association rule(s)/mapping relationship(s) between the RRH IDs/indices and the reports. For another example, the UE could autonomously determine the association rule(s)/ mapping relationship(s) between the RRH IDs/indices and the reports, and indicate to the network the association rule(s)/mapping relationship(s). The UE could be configured by the network through higher layer RRC signaling whether the UE could autonomously determine their RRH cluster and/or indicate to the network the RRH clustering results.

The UE could also send a status report to the network indicating whether the UE has autonomously determined their RRH cluster.

In one embodiment of Option-3B, the UE could transmit certain preambles such as sounding reference signals (SRSs) to the RRHs to assist RRH clustering. Based on the measurements of the UL preambles for RRH clustering, the network could determine the RRH cluster for the UE of interest. The UE could then be configured/indicated by the network via higher layer RRC signaling the RRH clustering results, which could comprise of the corresponding RRH IDs/indices, a primary RRH ID/index, and etc.

The UE could be indicated/configured by the network via higher layer RRC signaling which option from Option-1B, Option-2B, and Option-3B to follow for configuring/determining the RRH cluster.

Due to channel variations, the RRH cluster for a UE could vary over time. For Option-1B and Option-2B, the UE could be configured by the network to periodically measure the DL RSs for RRH clustering and/or report to the network the measurement results. The UE could also be requested/ triggered by the network to measure the DL RSs for RRH clustering and/or report to the network the corresponding measurement results in an aperiodic manner. For Option-3B, the UE could be configured by the network to periodically transmit to the network the UL preambles for RRH clustering.

Alternatively, the UE could be requested/triggered by the network to transmit the UL preambles for RRH clustering in an aperiodic manner. For Option-1B, Option-2B, and Option-3B, the UE could indicate to the network that a new RRH cluster is needed so that the network could configure (additional) DL RSs for RRH clustering for the UE to measure and report and/or the UE to transmit (additional) UL preambles for RRH clustering. Furthermore, the UE could be configured by the network two timers (a first timer and a second timer). The UE could reset both timers if a new RRH cluster is configured and applied for the UE. The UE would not apply another new RRH cluster before the first timer expires. If the second timer expires, the UE would indicate to the network that a new RRH cluster is needed.

Figure 16:
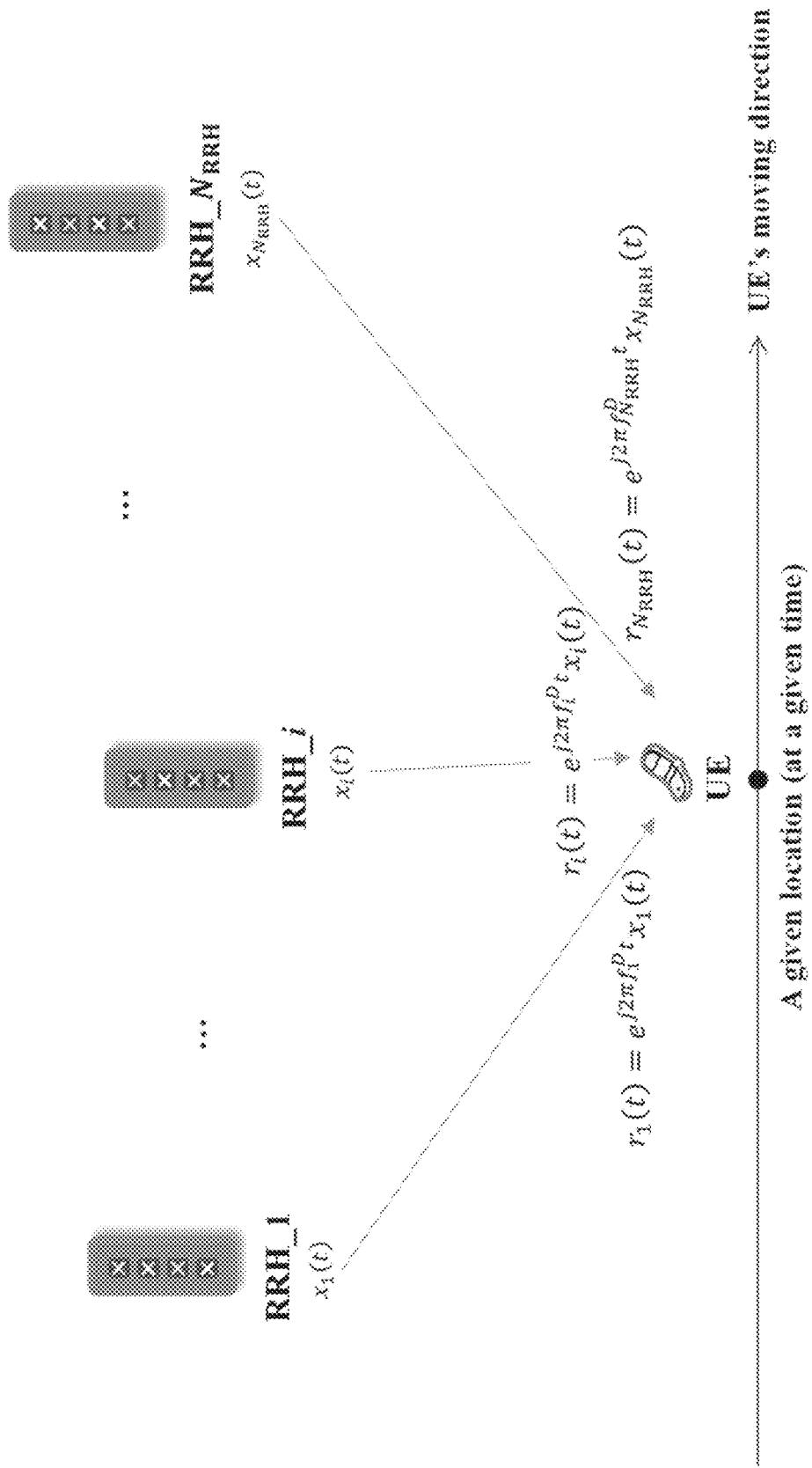
FIG. 16 illustrates an example of UE experiencing different Doppler effects from different distributed RRHs according to embodiments of the present disclosure.

FIG. 16 illustrates an example of UE experiencing different Doppler effects from different distributed RRHs 1600 according to embodiments of the present disclosure. An embodiment of the UE experiencing the different Doppler effects from the different distributed RRHs 1600 shown in FIG. 16 is for illustration only.

As different RRHs could be geographically separated/ non-co-located, a UE that moves among different RRHs could experience different Doppler effects such that the signals that the UE receives from different RRHs could have different Doppler shift components.

In FIG. 16, a conceptual example characterizing a UE experiencing different Doppler effects when moving among different RRHs in the RRH cluster is depicted. As can be seen from FIG. 16, for a given location (time), the signal that the UE receives from the i-th RRH in the RRH cluster for the UE can be expressed as (for illustrative purpose, the wireless propagation channel and the noise effects are omitted here): $r_i(t) = e^{j2\pi f_i^D t} x_i(t)$, $i=1, 2, \ldots, N_{RRH}$ where $f_i^D$ represents the undergoing Doppler shift with respect to the i-th RRH, $N_{RRH}$ denotes the total number of RRHs in the RRH cluster for the UE, and $x_i(t)$ is the time-domain signal transmitted from the i-th RRH. Further, $f_i^D$ can be expressed as: $f_i^D = v \cdot f_0 / c \cos \beta_i$ where v is the moving speed of the UE, c is the speed of light in vacuum, $f_0$ denotes the carrier frequency, and $\beta_i$ is the angle between the UE and the i-th RRH in the RRH cluster.

The UE could estimate the Doppler shift(s) by measuring certain DL RSs (such as CSI-RSs, TRSs, synchronization signal blocks (SSBs), etc.) transmitted from one or more RRHs in the RRH cluster and report to the network their estimated Doppler shift(s). Alternatively, the UE could transmit uplink sounding signals to one or more RRHs in the RRH cluster for the purpose of Doppler shift calibration/compensation. In the following, several design options of UE reporting assisted Doppler shift calibration/compensation at the network side are presented.

The UE could be first configured/indicated by the network to measure one or more RSs (such as CSI-RSs, TRSs, SSBs, etc.) for Doppler shift estimation/tracking for each RRH (RRH-specific RSs for Doppler shift estimation/tracking). The UE could then be configured/indicated by the network to report to the network the corresponding measurement results from measuring the RRH-specific RSs for Doppler shift estimation/tracking. Here, the measurement results could correspond to the estimated Doppler shift for each RRH in the RRH cluster for the UE.

In one example, the RRH-specific RSs for Doppler shift estimation/tracking for different RRHs could be multiplexed in time, frequency, spatial and/or code domains. For instance, the UE could be configured by the network to measure the RRH-specific RSs for Doppler shift estimation/tracking for different RRHs in different symbols/slots/etc. For another example, the UE could be configured by the network to measure the RRH-specific RSs for Doppler shift estimation/tracking for different RRHs in different resource blocks. The UE could also be indicated by the network the association rule(s)/mapping relationship(s) between the RRH IDs/indices and the RRH-specific RSs for Doppler shift estimation/tracking. In this case, the UE could know which RRH(s) the corresponding RSs for Doppler shift estimation/tracking are transmitted from.

In another example, the UE could be configured by the network to report the measurement results through certain time, frequency, spatial and/or code domain resources. For instance, the UE could be configured by the network to report the measurement results for different RRHs through different symbols/slots/etc. For another example, the UE could be configured by the network to report the measurement results for different RRHs through different resource blocks. The UE could be indicated by the network the association rule(s)/mapping relationship(s) between the RRH-specific RSs for Doppler shift estimation/tracking and the reports and/or between the RRH IDs/indices and the reports. Alternatively, the UE could autonomously determine the association rule(s)/mapping relationship(s) between the RRH-specific RSs for Doppler shift estimation/tracking (or the RRH IDs/indices) and the reports, and indicate to the network the association rule(s)/mapping relationship(s).

Denote the exact value of the estimated Doppler shift for RRH_i by $\hat{f}_i^D$. Note that the notion of $\hat{f}_i^D$ is for illustrative purpose. Furthermore, the estimated Doppler shift could be scaled by a known factor, such as the maximum Doppler shift, prior to reported to the network. Upon receiving the Doppler shift estimates from the UE, the network could compensate the Doppler shift for each RRH in the RRH cluster for the UE (see FIG. 17).

Figure 17:
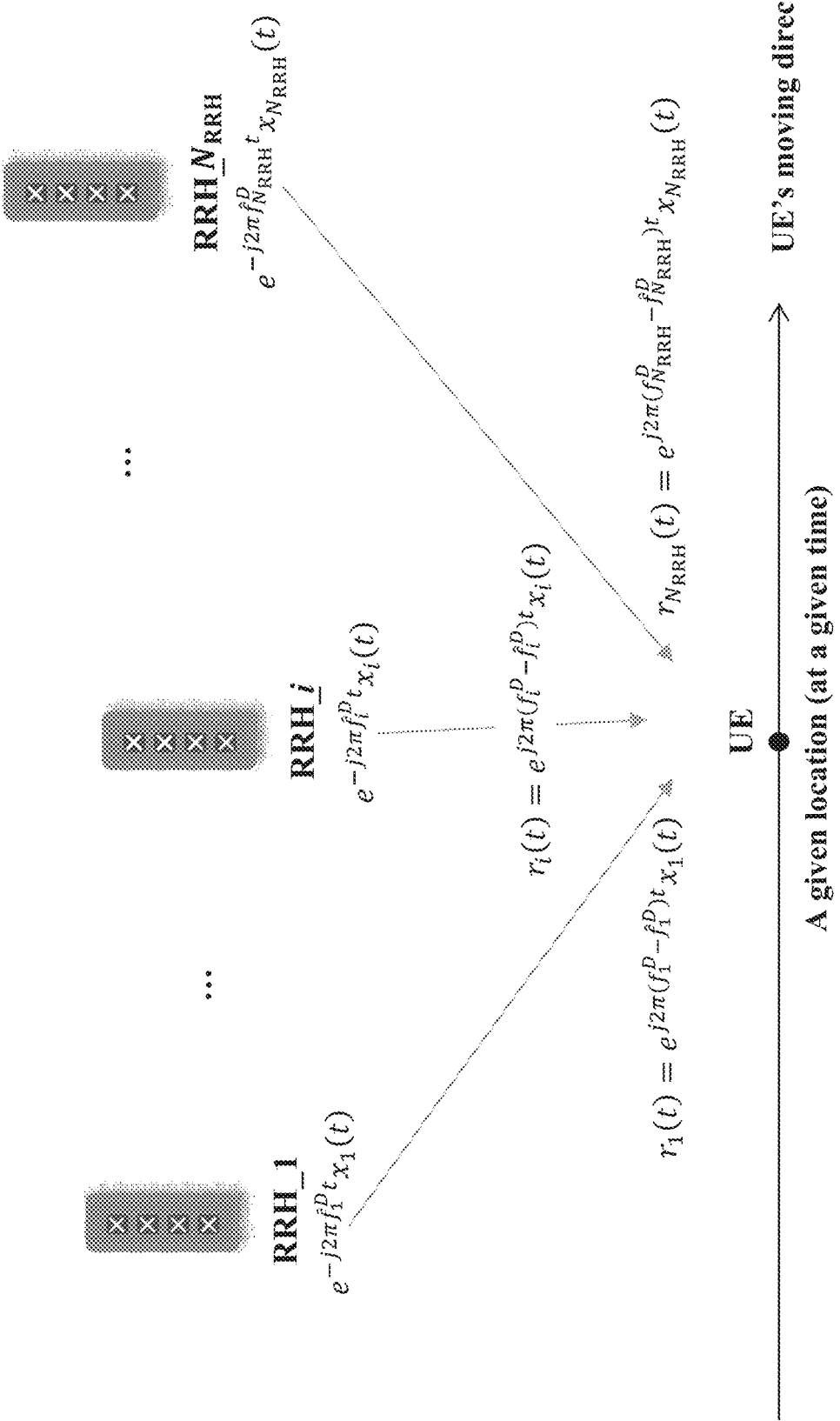
FIG. 17 illustrates an example of compensating Doppler shifts for different distributed RRHs according to embodiments of the present disclosure.

FIG. 17 illustrates an example of compensating Doppler shifts for different distributed RRHs 1700 according to embodiments of the present disclosure. An embodiment of compensating the Doppler shifts for the different distributed RRHs 1700 shown in FIG. 17 is for illustration only.

In one example of Option-1.1B, the UE could report to the network the exact values of their estimated Doppler shift for each RRH in the RRH cluster through the designated resource(s) for the corresponding RRH. The UE could also report to the network the RRH ID along with the report of the estimated Doppler shift for the RRH.

Figure 18:
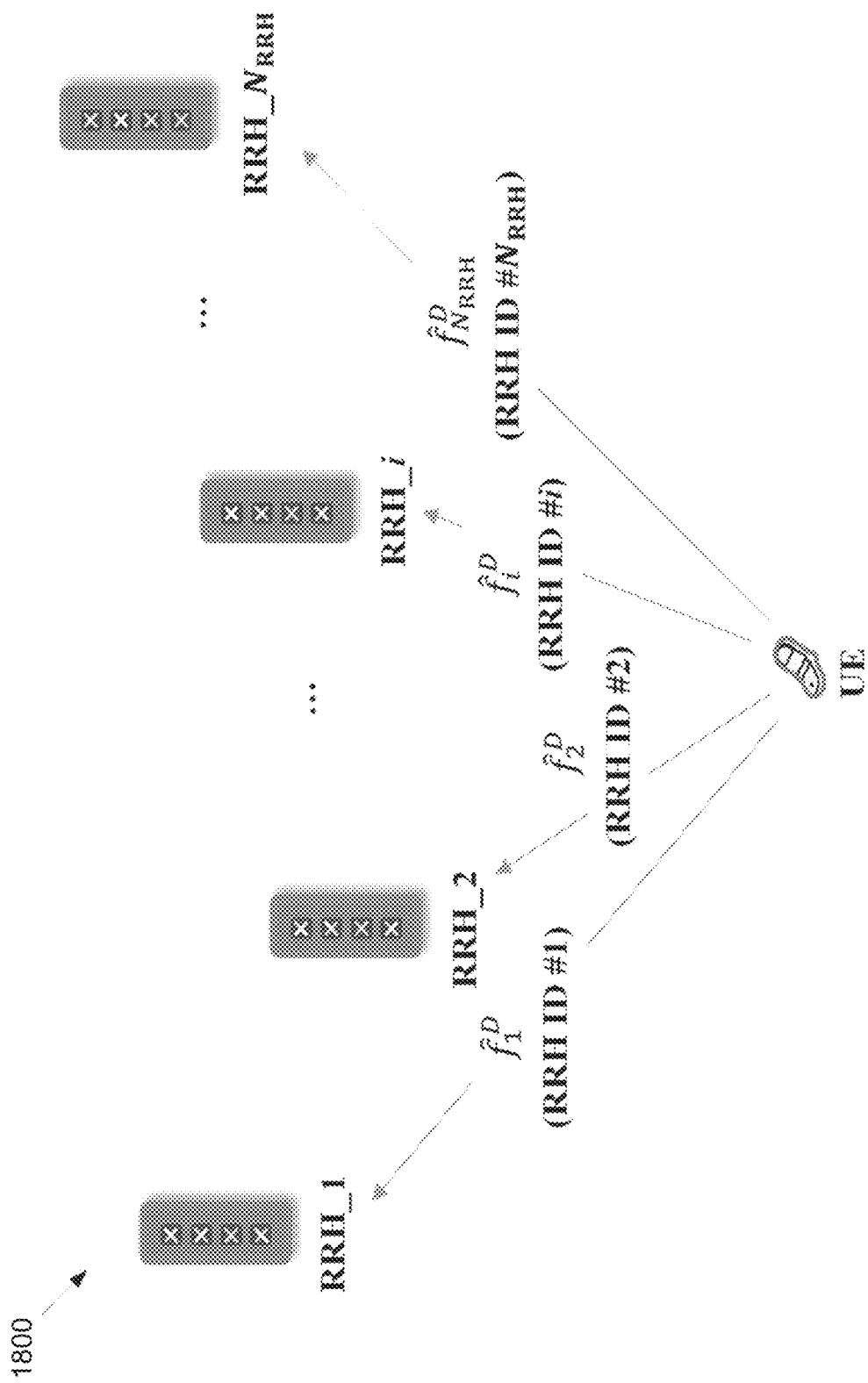
FIG. 18 illustrates an example of separately reporting Doppler shift estimates according to embodiments of the present disclosure.

FIG. 18 illustrates an example of separately reporting Doppler shift estimates 1800 according to embodiments of the present disclosure. An embodiment of separately reporting the Doppler shift estimates 1800 shown in FIG. 18 is for illustration only.

In FIG. 18, a conceptual example charactering separately reporting the estimated Doppler shift value for each RRH in the RRH cluster is presented. Upon receiving the estimated Doppler shift(s) reported from the UE, the network could calibrate the carrier frequency value(s) for each RRH in the RRH cluster for the UE by compensating for the corresponding estimated Doppler shift(s).

In one example of Option-1.2B, the UE could first scale the estimated Doppler shift(s) by a known factor. For instance, the UE could normalize the estimated Doppler shift for RRH_i by the maximum Doppler shift $f_{max}^D$, and obtain the scaled version as $\hat{f}_i^D/f_{max}^D$. The UE could then report to the network the scaled version of their estimated Doppler shift for each RRH in the RRH cluster through the designated resource(s) for the corresponding RRH. Similar to Option-1.1B, the UE could report to the network the RRH ID along with the report of the scaled estimated Doppler shift for the RRH. The UE may also need to indicate to the network the applied scaling factor. Whether to report the exact or scaled Doppler shift estimate(s) could be predefined/preconfigured, and known to both the network and the UE.

Alternatively, the UE could be configured/indicated by the network whether to report the exact or scaled values of the estimated Doppler shift(s). Furthermore, the UE could indicate to the network whether the reported Doppler shift estimates are the exact values or scaled by the known scaling factor.

In one example of Option-1.3B, the UE could be configured by the network a set of candidate values of Doppler shift (codebook for Doppler shift), denoted by $S=\{s_1, s_2, \ldots, s_Q\}$. For a given estimated Doppler shift for RRH_i ($\hat{f}_i^D$), the UE could select one candidate Doppler shift value from the set/codebook of all candidate Doppler shift values that best characterizes the estimated Doppler shift. For instance, the selected candidate Doppler shift value for RRH_i (denoted by $\hat{g}_i^D$) could have the smallest/least Euclidean distance with the actual estimated Doppler shift for RRH_i ($\hat{f}_i^D$) than the other candidate Doppler shift values in the set/codebook of all candidate Doppler shift values. The UE could report to the network the selected candidate Doppler shift values for each RRH in the RRH cluster.

Figure 19:
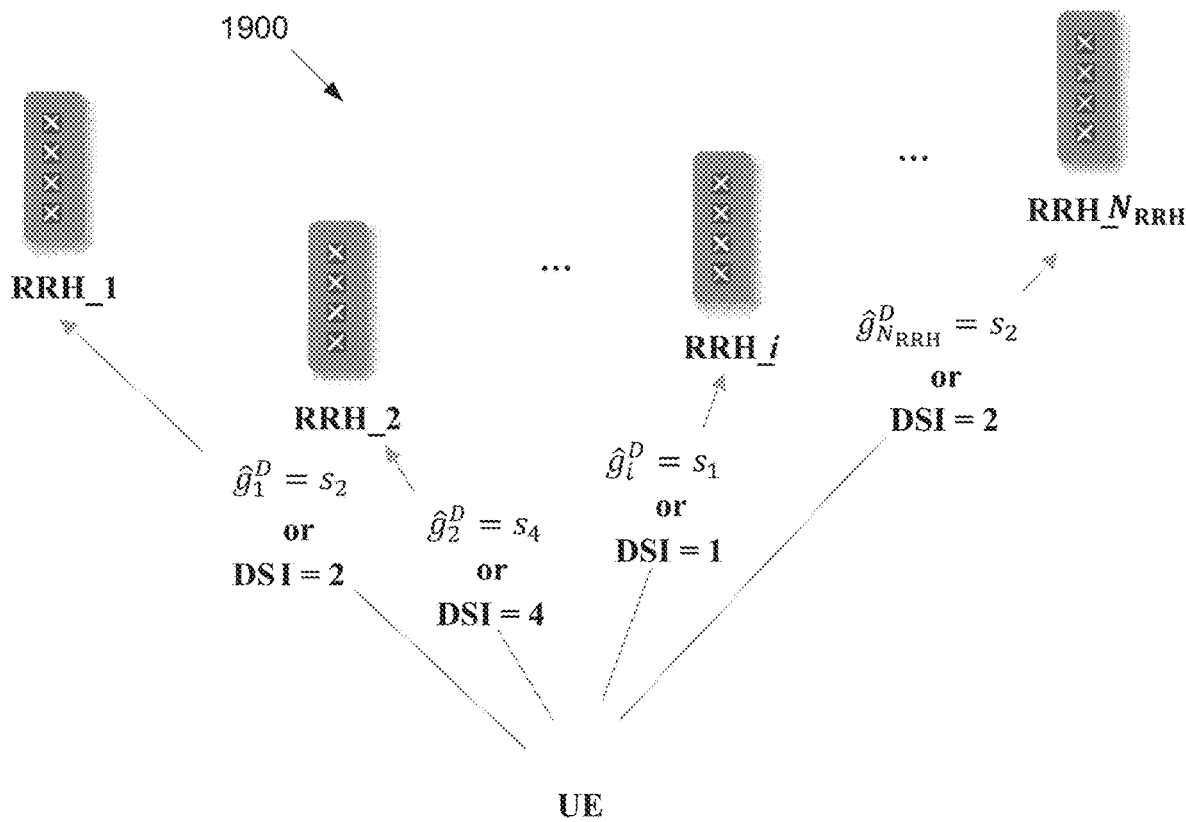
FIG. 19 illustrates an example of separately reporting quantized Doppler shift estimates according to embodiments of the present disclosure.

FIG. 19 illustrates an example of separately reporting quantized Doppler shift estimates 1900 according to embodiments of the present disclosure. An embodiment of separately reporting the quantized Doppler shift estimates 1900 shown in FIG. 19 is for illustration only.

Alternatively, the UE could report to the network the indices of the selected candidate Doppler shifts for each RRH in the RRH cluster in the set/codebook of all candidate Doppler shift values (denoted by Doppler shift indices (DSIs)). One conceptual example describing reporting the selected candidate Doppler shift values or their indices in the codebook for Doppler shift is presented in FIG. 19 for a RRH cluster comprising of $N_{RRH}$ RRHs. The UE could report to the network the selected candidate Doppler shift value or an index of the selected candidate Doppler shift value in the codebook for Doppler shift through the designated resource(s) for the corresponding RRH. The UE could also report to the network the RRH ID along with the report of the selected candidate Doppler shift value or an index of the selected candidate Doppler shift value in the codebook for Doppler shift for the corresponding RRH.

In one example of Option-1.4B, the UE could first scale the estimated Doppler shift(s) by a known factor. For instance, the UE could normalize the estimated Doppler shift for RRH_i by the maximum Doppler shift $f_{max}^D$, and obtain the scaled version as $\hat{f}_i^D/f_{max}^D$. The UE could be configured by the network a set of candidate values of scaled Doppler shift (codebook for scaled Doppler shift). For a given scaled Doppler shift estimate, the UE could select one candidate scaled Doppler shift value from the set/codebook of all candidate scaled Doppler shift values that best characterizes the scaled Doppler shift estimate.

For instance, the selected candidate scaled Doppler shift value could have the smallest/least Euclidean distance with the actual scaled Doppler shift estimate than the other candidate scaled Doppler shift values in the set/codebook of all candidate scaled Doppler shift values. The UE could report to the network the selected candidate scaled Doppler shift values for each RRH in the RRH cluster.

Alternatively, the UE could report to the network the indices of the selected candidate scaled Doppler shifts for each RRH in the RRH cluster in the set/codebook of all candidate scaled Doppler shift values. Under certain settings, the UE may also need to indicate to the network the applied scaling factor. The UE could report to the network the selected candidate scaled Doppler shift value or an index of the selected candidate scaled Doppler shift value in the codebook for scaled Doppler shift through the designated resource(s) for the corresponding RRH. The UE could also report to the network the RRH ID along with the report of the selected candidate scaled Doppler shift value or an index of the selected candidate scaled Doppler shift value in the codebook for scaled Doppler shift for the corresponding RRH.

In one example of Option-1.5B, the UE could report to the network a vector of estimated Doppler shifts, with each entry in the vector corresponding to a RRH in the RRH cluster. For instance, for a RRH cluster comprising of $N_{RRH}$ RRHs, the UE could form the vector of Doppler shift estimates as $f_D = [\hat{f}_1^D, \hat{f}_2^D, \ldots, \hat{f}_i^D, \ldots, \hat{f}_{N_{RRH}}^D]$, where $\hat{f}_i^D$ corresponds to the i-th RRH in the RRH cluster (RRH_i). The association rule(s)/mapping relationship(s) between the entries in the vector of Doppler shift estimates and the RRHs in the RRH cluster could be predefined, and known to both the network and the UE.

For example, the first entry in the vector corresponds to the RRH with the lowest RRH ID (or the first RRH in the list of RRHs configured to the UE), the second entry in the vector corresponds to the RRH with the second lowest RRH ID (or the second RRH in the list of RRHs configured to the UE), and so on, and the last entry in the vector corresponds to the RRH with the highest RRH ID (or the last RRH in the list of RRHs configured to the UE). Note that other association rule(s)/mapping relationship(s) between the entries in the vector of Doppler shift estimates and the RRHs in the RRH cluster are also possible.

Alternatively, the UE could be indicated by the network the explicit association rule(s)/mapping relationship(s) between the entries in the vector of Doppler shift estimates and the RRHs in the RRH cluster. Furthermore, the UE could autonomously determine how the entries in the vector of Doppler shift estimates would map to the RRHs in the RRH cluster, and indicate to the network their determined association rule(s)/mapping relationship(s) between the entries in the vector of Doppler shift estimates and the RRHs in the RRH cluster.

The vector of Doppler shift estimates could be in other forms as well such as: (1) a vector of scaled Doppler shift estimates (e.g., scaled by $1/f_{max}^D$) (similar to those obtained under Option-1.2B), with each entry in the vector corresponding to a RRH in the RRH cluster; (2) a vector of selected candidate Doppler shift estimates from a codebook for Doppler shift (similar to those obtained under Option-1.3B), with each entry in the vector corresponding to a RRH in the RRH cluster; (3) a vector of indices of the selected candidate Doppler shift estimates in the codebook for Doppler shift (similar to those obtained under Option-1.3B), with each entry in the vector corresponding to a RRH in the RRH cluster; (4) a vector of selected candidate scaled Doppler shift estimates from a codebook for scaled Doppler shift (similar to those obtained under Option-1.4B), with each entry in the vector corresponding to a RRH in the RRH cluster; and (5) a vector of indices of the selected candidate scaled Doppler shift estimates in the codebook for scaled Doppler shift (similar to those obtained under Option-1.4B), with each entry in the vector corresponding to a RRH in the RRH cluster.

Figure 20:
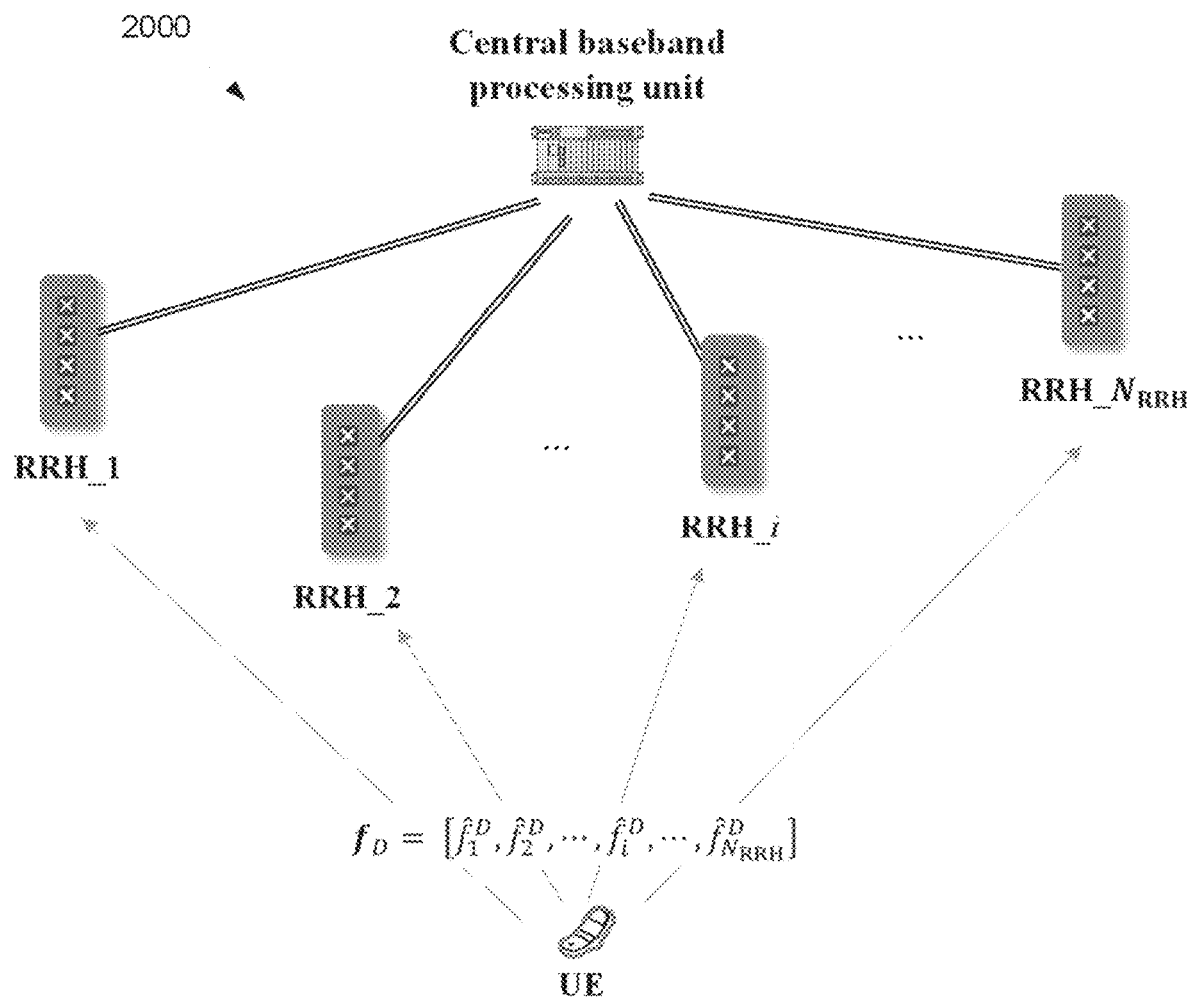
FIG. 20 illustrates an example of jointly reporting Doppler shift estimates according to embodiments of the present disclosure.

FIG. 20 illustrates an example of jointly reporting Doppler shift estimates 2000 according to embodiments of the present disclosure. An embodiment of jointly reporting the Doppler shift estimates 2000 shown in FIG. 20 is for illustration only.

The UE could report to the network the vector of Doppler shift estimates to one or more RRHs in the RRH cluster through their designated resource(s) configured/indicated to the UE. In the example shown in FIG. 20, the UE transmits to the network the vector of Doppler shift estimates for all RRHs in the RRH cluster, and the network could perform frequency calibration for all RRHs by compensating the Doppler shift estimates for all RRHs in the RRH cluster.

In addition to the above discussed design options, the UE could report to the network one or more differential Doppler shift estimates for one or more RRHs in the RRH cluster. The UE could determine the differential Doppler shift estimate(s) based on one or more reference Doppler shift estimates for one or more RRHs in the RRH cluster. For instance, denote two Doppler shift estimates for RRH_1 and RRH_2 by $\hat{f}_1^D$ and $\hat{f}_2^D$. Consider $\hat{f}_2^D$ as the reference Doppler shift estimate. The differential Doppler shift estimate for RRH_1 could be computed as $d\hat{f}_1^D = \hat{f}_1^D - \hat{f}_2^D$ (or $d\hat{f}_1^D = \hat{f}_2^D - \hat{f}_1^D$) (relative difference) or $d\hat{f}_1^D = |\hat{f}_1^D - \hat{f}_2^D|$ (absolute difference). The reference RRH(s) in the RRH cluster with which the reference Doppler shift estimate(s) are associated could be predefined, and known to both the network and the UE. For example, the reference RRH could be the RRH with the lowest RRH ID in the RRH cluster (or the first RRH in the list of RRHs configured to the UE).

Alternatively, the UE could be indicated by the network the reference RRH(s) (and/or the reference RRH ID(s)) in the RRH cluster. The UE could also autonomously determine the reference RRH(s) in the RRH cluster with which the reference Doppler shift estimate(s) is associated. The UE could report to the network their determined reference RRH(s) in form of RRH ID(s)/index(s).

Figure 21:
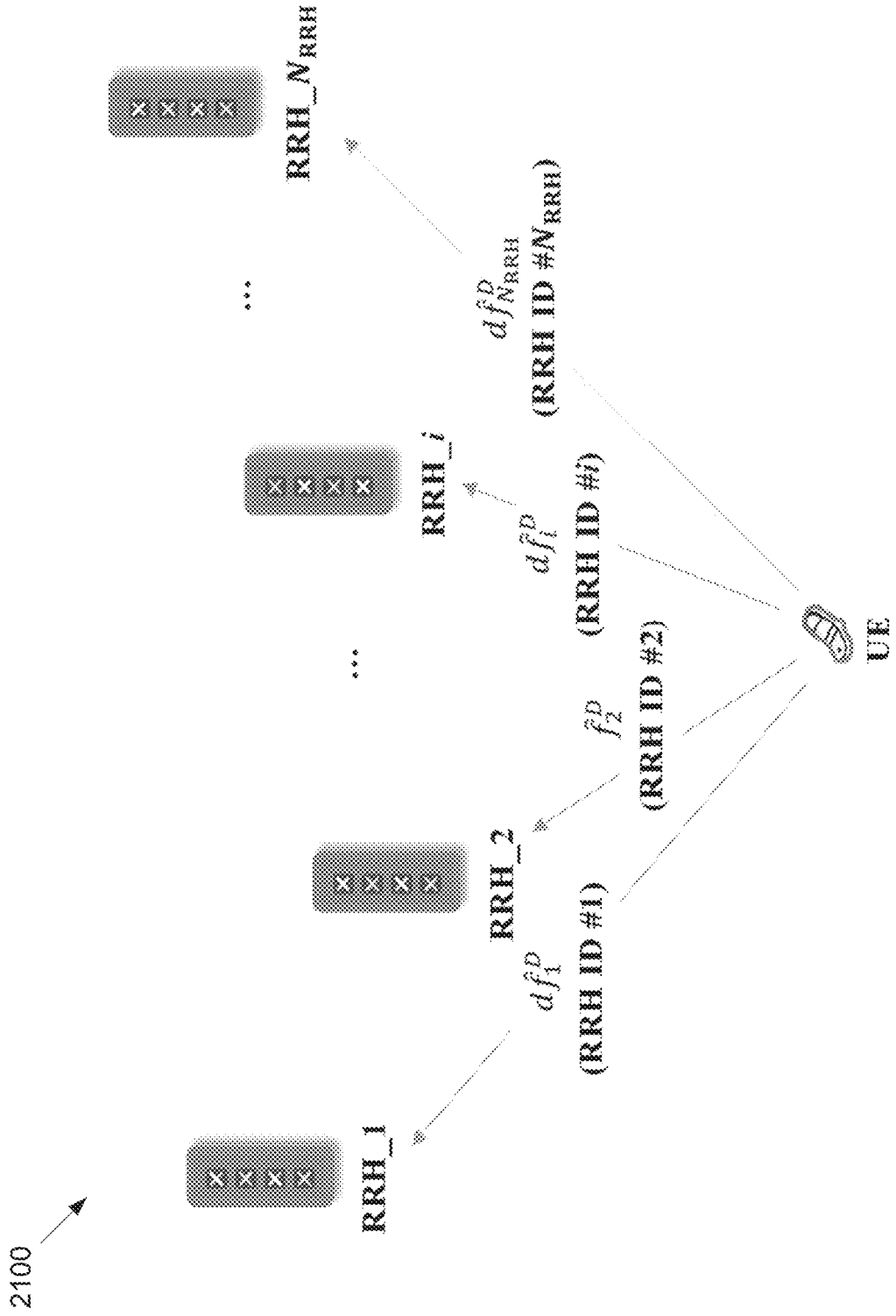
FIG. 21 illustrates an example of reporting Doppler shift differences or differential Doppler shift estimates according to embodiments of the present disclosure.

FIG. 21 illustrates an example of reporting Doppler shift differences or differential Doppler shift estimates 2100 according to embodiments of the present disclosure. An embodiment of reporting the Doppler shift differences or the differential Doppler shift estimates 2100 shown in FIG. 21 is for illustration only.

In one example of Option-1.AB, the UE could report to the network the exact values of the differential Doppler shift estimate(s) for one or more RRHs in the RRH cluster through the designated resource(s) for the corresponding RRH(s). The UE could also report to the network the RRH ID along with the report of the differential Doppler shift estimate for the RRH. In FIG. 21, a conceptual example charactering differential Doppler shift estimate reporting is depicted. As can be seen from FIG. 21, RRH_2 is regarded as the reference RRH, and the UE could report to the network the Doppler shift estimate $\hat{f}_2^D$ for RRH_2.

For other RRHs in the RRH cluster such as RRH_i (i≠2), the UE could report to the network the differential Doppler shift estimates for them such as $d\hat{f}_i^D = \hat{f}_i^D - \hat{f}_2^D$ ($d\hat{f}_i^D = \hat{f}_2^D - \hat{f}_i^D$) or $d\hat{f}_i^D = |\hat{f}_i^D + \hat{f}_2^D|$ with a sign indicator for RRH_i. As discussed above, the UE could be indicated by the network the reference RRH(s) in the RRH cluster such as RRH_2 in FIG. 21. The UE could also autonomously determine the reference Doppler shift estimate(s), and therefore the corresponding reference RRH(s) such as RRH_2 in FIG. 21. In this case, the UE would need to report to the network that RRH_2 is regarded as the reference RRH. Upon receiving the differential Doppler shift estimate(s) reported from the UE, the network could recover the exact Doppler shift estimate(s) for the corresponding RRH(s) from the differential Doppler shift estimate(s), and calibrate the carrier frequency value(s) for each RRH in the RRH cluster for the UE by compensating for the corresponding estimated Doppler shift value(s).

In one example of Option-1.BB, the UE could first scale the differential Doppler shift estimate(s) by a known factor. For instance, the UE could normalize the differential Doppler shift estimate for RRH_j by the maximum Doppler shift $f_{max}^D$, and obtain the scaled version as $d\hat{f}_j^D/f_{max}^D$. The UE could then report to the network the scaled version(s) of the differential Doppler shift estimate(s) for one or more RRHs in the RRH cluster through the designated resource(s) for the corresponding RRH(s). Similar to Option-1.AB, the UE could report to the network the RRH ID along with the report of the scaled differential Doppler shift estimate for the RRH.

As discussed above, the UE could be indicated by the network the reference RRH(s) in the RRH cluster. The UE could also autonomously determine the reference Doppler shift estimate(s), and therefore the corresponding reference RRH(s). In this case, the UE would need to report to the network which RRH(s) (e.g., in form of the RRH ID(s)) is regarded as the reference RRH(s). Under certain settings, the UE may also need to indicate to the network the applied scaling factor. Whether to report the exact or scaled differential Doppler shift estimate(s) could be predefined/preconfigured, and known to both the network and the UE.

Alternatively, the UE could be configured/indicated by the network whether to report the exact or scaled values of the differential Doppler shift estimate(s). Furthermore, the UE could indicate to the network whether the reported differential Doppler shift estimates are the exact values or scaled by the known scaling factor.

In one example of Option-1.CB, the UE could be configured by the network one set of candidate values of differential Doppler shift (codebook for differential Doppler shift), denoted by W={$w_1, w_2, \ldots, w_P$}. For a given differential Doppler shift estimate $d\hat{f}_j^D$ for RRH_j (e.g., $d\hat{f}_i^D = \hat{f}_j^D - \hat{f}_i^D$ ($d\hat{f}_j^D = \hat{f}_i^D - \hat{f}_j^D$) or $d\hat{f}_j^D = |\hat{f}_j^D - \hat{f}_i^D|$ with a sign indicator assuming RRH_i as the reference RRH), the UE could select one candidate differential Doppler shift value from the set/codebook of all candidate differential Doppler shift values that best characterizes the differential Doppler shift estimate.

For instance, the selected candidate differential Doppler shift value for RRH_j (denoted by $d\hat{g}_j^D$) could have the smallest/least Euclidean distance with the actual differential Doppler shift estimate for RRH_j ($d\hat{f}_j^D$) than the other candidate differential Doppler shift values in the set/codebook of all candidate differential Doppler shift values. The UE could report to the network the selected candidate differential Doppler shift value(s) for one or more RRHs in the RRH cluster.

Alternatively, the UE could report to the network the index(es) of the selected candidate differential Doppler shift value(s) for one or more RRHs in the RRH cluster in the set/codebook of all candidate differential Doppler shift values (denoted by differential DSI(s)–dDSI(s)). If the codebook for differential Doppler shift W contains only absolute-valued codewords/entries, the UE could also report a sign indicator along with the report of the selected candidate differential Doppler shift value or the dDSI. The UE could also report to the network the RRH ID along with the report of the selected candidate differential Doppler shift value (or the dDSI) for the RRH.

As discussed above, the UE could be indicated by the network the reference RRH(s) in the RRH cluster. The UE could also autonomously determine the reference Doppler shift estimate(s), and therefore the corresponding reference RRH(s). In this case, the UE would need to report to the network which RRH(s) (e.g., in form of the RRH ID(s)) is regarded as the reference RRH(s).

In one example of Option-1.DB, the UE could first scale the differential Doppler shift estimate(s) by a known factor. For instance, the UE could normalize the differential Doppler shift estimate for RRH_j by the maximum Doppler shift $f_{max}^D$, and obtain the scaled version as $d\hat{f}_j^D/f_{max}^D$. The UE could be configured by the network a set of candidate values of scaled differential Doppler shift (codebook for scaled differential Doppler shift). For a scaled differential Doppler shift estimate, the UE could select one candidate scaled differential Doppler shift value from the set/codebook of all candidate scaled differential Doppler shift values that best characterizes the scaled differential Doppler shift estimate.

For instance, the selected candidate scaled differential Doppler shift value could have the smallest/least Euclidean distance with the actual scaled differential Doppler shift estimate than the other candidate scaled differential Doppler shift values in the set/codebook of all candidate scaled differential Doppler shift values. The UE could report to the network the selected candidate scaled differential Doppler shift value(s) for one or more RRHs in the RRH cluster.

Alternatively, the UE could report to the network the index(es) of the selected candidate scaled differential Doppler shift(s) for one or more RRHs in the RRH cluster in the set/codebook of all candidate scaled differential Doppler shift values. If the codebook for scaled differential Doppler shift contains only absolute-valued codewords/entries, the UE could also report a sign indicator along with the report of the selected candidate scaled differential Doppler shift value or the index of the selected candidate scaled differential Doppler shift value in the set/codebook of all candidate scaled differential Doppler shift values. Under certain settings, the UE may need to indicate to the network the applied scaling factor.

The UE could report to the network the selected candidate scaled differential Doppler shift value or an index of the selected candidate scaled differential Doppler shift value in the codebook for scaled differential Doppler shift through the designated resource(s) for the corresponding RRH. The UE could also report to the network the RRH ID along with the report of the selected candidate scaled differential Doppler shift value or an index of the selected candidate scaled differential Doppler shift value in the codebook for scaled differential Doppler shift for the corresponding RRH. As discussed above, the UE could be indicated by the network the reference RRH(s) in the RRH cluster. The UE could also autonomously determine the reference Doppler shift estimate(s), and therefore the corresponding reference RRH(s). In this case, the UE would need to report to the network which RRH(s) (e.g., in form of the RRH ID(s)) is regarded as the reference RRH(s).

In one example of Option-1.EB, the UE could report to the network a vector of differential Doppler shift estimates, with each entry in the vector corresponding to a RRH in the RRH cluster. For instance, assuming that $M_{RRH}$ RRHs in the RRH cluster are associated with the differential Doppler shift estimates ("differential" RRHs), the UE could form the vector of differential Doppler shift estimates as $df_D = [d\hat{f}_1^D, d\hat{f}_2^D, \ldots, d\hat{f}_i^D, \ldots, d\hat{f}_{M_{RRH}}^D]$. The association rule(s)/mapping relationship(s) between the entries in the vector of differential Doppler shift estimates and the "differential" RRHs could be predefined, and known to both the network and the UE.

For example, the first entry in the vector corresponds to the RRH with the lowest RRH ID among the "differential" RRHs (or the first RRH in the list of "differential" RRHs configured to the UE), the second entry in the vector corresponds to the RRH with the second lowest RRH ID among the "differential" RRHs (or the second RRH in the list of "differential" RRHs configured to the UE), and so on, and the last entry in the vector corresponds to the RRH with the highest RRH ID among the "differential" RRHs (or the last RRH in the list of "differential" RRHs configured to the UE). Note that other association rule(s)/mapping relationship(s) between the entries in the vector of differential Doppler shift estimates and the "differential" RRHs in the RRH cluster are also possible.

Alternatively, the UE could be indicated by the network the explicit association rule(s)/mapping relationship(s) between the entries in the vector of differential Doppler shift estimates and the "differential" RRHs in the RRH cluster. Furthermore, the UE could autonomously determine how the entries in the vector of differential Doppler shift estimates would map to the "differential" RRHs in the RRH cluster, and indicate to the network their determined association rule(s)/mapping relationship(s) between the entries in the vector of differential Doppler shift estimates and the "differential" RRHs in the RRH cluster.

The vector of differential Doppler shift estimates could be in other forms as well such as: (1) a vector of scaled differential Doppler shift estimates (e.g., scaled by $1/f_{max}^D$) (similar to those obtained under Option-1.BB), with each entry in the vector corresponding to a RRH in the RRH cluster; (2) a vector of selected candidate differential Doppler shift estimates from a codebook for differential Doppler shift (similar to those obtained under Option-1.CB), with each entry in the vector corresponding to a RRH in the RRH cluster; (3) a vector of indices of the selected candidate differential Doppler shift estimates in the codebook for differential Doppler shift (similar to those obtained under Option-1.CB), with each entry in the vector corresponding to a RRH in the RRH cluster; (4) a vector of selected candidate scaled differential Doppler shift estimates from a codebook for scaled differential Doppler shift (similar to those obtained under Option-1.DB), with each entry in the vector corresponding to a RRH in the RRH cluster; and (5) a vector of indices of the selected candidate scaled differential Doppler shift estimates in the codebook for scaled differential Doppler shift (similar to those obtained under Option-1.DB), with each entry in the vector corresponding to a RRH in the RRH cluster.

The UE could report to the network the vector of differential Doppler shift estimates to one or more RRHs in the RRH cluster through their designated resource(s) configured/indicated to the UE. As discussed above, the UE could be indicated by the network the reference RRH(s) in the RRH cluster. The UE could also autonomously determine the reference Doppler shift estimate(s), and therefore the corresponding reference RRH(s). In this case, the UE would need to report to the network which RRH(s) (e.g., in form of the RRH ID(s)) is regarded as the reference RRH(s).

The UE could report to the network the differential Doppler shift estimate(s) for one or more RRHs in the RRH cluster following the strategies provided under Option-1.AB, Option-1.BB, Option-1.CB, Option-1.DB, and/or Option-1.EB. Furthermore, the UE could report to the network the Doppler shift estimate(s) for one or more reference RRHs in the RRH cluster following the strategies discussed in Option-1.1B, Option-1.2B, Option-1.3B, Option-1.4B, and/or Option-1.5B. Hence, there are many combinations of different reporting methods to report the exact/differential Doppler shift estimates. For instance, the UE could report to the network the exact Doppler shift estimate(s) for the reference RRH(s) in the RRH cluster following Option-1.2B, while report to the network the differential Doppler shift estimate(s) for the "differential" RRH(s) in the RRH cluster following Option-1.AB. The UE could be indicated by the network to follow one or more combinations of the reporting methods to report to the network the exact/differential Doppler shift estimates.

In the above described design options, the UE would report to the network the (exact/differential) Doppler shift estimates for all the RRHs in the RRH cluster for the UE. The UE could report to the network the (exact/differential) Doppler shift estimates for a subset of RRHs in the RRH cluster for the UE. The UE could be indicated by the network the subset of RRHs through higher layer RRC signaling, MAC CE activation command (e.g., by activating the subset of RRHs from a list/pool of all RRHs in the RRH cluster) or DCI signaling. Alternatively, the UE could autonomously determine the subset of RRHs in the RRH cluster, and indicate to the network the selected RRHs (e.g., in form of their RRH IDs).

The UE could be configured by the network one or more thresholds for determining (exact/differential) Doppler shift estimate report(s).

For Option-1.1B, Option-1.3B, and Option-1.5B, the UE could be configured by the network a threshold (denoted by Th_1) for comparing with the (exact) Doppler shift estimate. For instance, if a Doppler shift estimate is below the threshold, the UE would not report to the network the Doppler shift estimate for the corresponding RRH or report to the network a zero Doppler shift estimate for the corresponding RRH.

For Option-1.2B, Option-1.4B, and Option-1.5B, the UE could be configured by the network a threshold (denoted by Th_2) for comparing with the scaled Doppler shift estimate. For instance, if a scaled Doppler shift estimate is below the threshold, the UE would not report to the network the scaled Doppler shift estimate for the corresponding RRH or report to the network a zero scaled Doppler shift estimate for the corresponding RRH.

For Option-1.AB, Option-1.CB, and Option-1.EB, the UE could be configured by the network a threshold (denoted by Th_A) for comparing with the differential Doppler shift estimate. For instance, if a differential Doppler shift estimate is below the threshold, the UE would not report to the network the differential Doppler shift estimate for the corresponding RRH or report to the network a zero differential Doppler shift estimate for the corresponding RRH.

For Option-1.BB, Option-1.DB, and Option-1.EB, the UE could be configured by the network a threshold (denoted by Th_B) for comparing with the scaled differential Doppler shift estimate. For instance, if a scaled differential Doppler shift estimate is below the threshold, the UE would not report to the network the scaled differential Doppler shift estimate for the corresponding RRH or report to the network a zero scaled differential Doppler shift estimate for the corresponding RRH.

Alternatively, the UE could autonomously determine/select the thresholds such as Th_1, Th_2, Th_A and/or Th_B discussed above for determining the (exact/differential) Doppler shift estimate report(s). The UE could send to the network their determined threshold(s).

The UE could transmit at least one SRS resource to the network, and the network could use the at least one SRS resource to estimate the Doppler shift for each RRH in the RRH cluster for the UE. The RS configuration could include at least one downlink RS resource for Doppler shift estimation/tracking and at least one SRS resource, wherein the RS configuration can be joint (via one configuration) or separate (via two separate configurations). The Doppler shift values for all RRHs in the RRH cluster for the UE could be acquired at the network based on both SRS measurements and the Doppler shift estimate reporting from the UE.

In the above descried design options, the UE could be configured/indicated by the network to measure the RRH-specific RSs for Doppler shift estimation/tracking. Alternatively, the UE could be configured/indicated by the network to measure a common RS transmitted from one or more RRHs in the RRH cluster for Doppler shift estimation/tracking. If the UE could be indicated by the network the association rule(s)/mapping relationship(s) between different time/frequency components of the common RS and the RRHs, the UE could still generate different Doppler shift estimates (or different differential Doppler shift estimates) for different RRHs, and report them to the network following Option-1.1B, Option-1.2B, Option-1.3B, Option-1.4B, and/or Option-1.5B (or following Option-1.AB, Option-1.BB, Option-1.CB, Option-1.DB, and/or Option-1.EB).

If the UE is not indicated by the network any association rule(s)/mapping relationship(s) between the common RS and the RRHs, the UE could only report to the network all Doppler shift estimates obtained from measuring the common RS for Doppler shift estimation/tracking. The UE could be configured by the network to measure the RRH-specific RSs or the common RS for Doppler shift estimation/tracking in a periodic/semi-persistent manner, and report to the network the corresponding measurement results.

Alternatively, the UE could be triggered by the network to measure the RRH-specific RSs or the common RS for Doppler shift estimation/tracking in an aperiodic manner. The UE could also trigger the network to send the RRH-specific RSs or the common RS for Doppler shift estimation/tracking.

In addition to the Doppler shift estimation and reporting, the UE could also measure the phase shift for each RRH in the RRH cluster and report to the network their estimated phase shifts. Detailed measurement and reporting methods of the RRH-specific phase shift are described in U.S. provisional patent application 63/150,391, which is incorporated by reference herein.

In one embodiment of Method-1B, as both the Doppler shift and phase shift would result in frequency offset, the UE could estimate the composite of the Doppler shift and the phase shift, and report to the network the composite of the Doppler shift and the phase shift for each RRH in the RRH cluster following one or more design options described above (e.g., Option-1.1B, Option-1.2B, Option-1.3B, Option-1.4B, Option-1.5B, Option-1.AB, Option-1.BB, Option-1.CB, Option-1.DB, and/or Option-1.EB)

In one embodiment of Method-2B, at state-1, the UE could be first configured by the network to measure/estimate the phase shift for each RRH in the RRH cluster and report to the network the estimated phase shifts for all RRHs in the RRH cluster; at stage-2, the UE could then be configured by the network to measure/estimate the Doppler shift for each RRH in the RRH cluster and report to the network the estimated Doppler shifts for all RRHs in the RRH cluster following one or more design options described above (e.g., Option-1.1B, Option-1.2B, Option-1.3B, Option-1.4B, Option-1.5B, Option-1.AB, Option-1.BB, Option-1.CB, Option-1.DB, and/or Option-1.EB).

In one embodiment of Method-3B, at stage-1, the UE could be first configured by the network to measure/estimate the Doppler shift for each RRH in the RRH cluster and report to the network the estimated Doppler shifts for all RRHs in the RRH cluster following one or more design options described above (e.g., Option-1.1B, Option-1.2B, Option-1.3B, Option-1.4B, Option-1.5B, Option-1.AB, Option-1.BB, Option-1.CB, Option-1.DB, and/or Option-1.EB); at stage-2, the UE could then be configured by the network to measure/estimate the phase shift for each RRH in the RRH cluster and report to the network the estimated phase shifts for all RRHs in the RRH cluster.

In one embodiment of Method-4B, the UE could autonomously determine to estimate the Doppler shift, phase shift and/or the composite of the Doppler shift and the phase shift. In this case, the UE may need to indicate to the network whether the reported metric/estimate is for Doppler shift only, phase shift only or a composite of both the Doppler shift and the phase shift.

In the present disclosure, a frequency shift reporting is defined, which could correspond to: (1) Doppler shift reporting only; (2) phase shift reporting only; and/or (3) a composite of both Doppler shift and phase shift reporting.

For instance, if the frequency shift reporting corresponds to the Doppler shift reporting only, the frequency shift reporting could include at least one of the following cases.

In one example of Case-A, one or more Doppler shift estimates for one or more RRHs in the RRH cluster.

In one example of Case-B, one or more scaled Doppler shift estimates for one or more RRHs in the RRH cluster.

In one example of Case-C, one or more selected candidate Doppler shift estimates from a codebook for Doppler shift for one or more RRHs in the RRH cluster.

In one example of Case-D, one or more indices of the selected candidate Doppler shift estimates in the codebook for Doppler shift for one or more RRHs in the RRH cluster.

In one example of Case-E, one or more selected candidate scaled Doppler shift estimates from a codebook for scaled Doppler shift for one or more RRHs in the RRH cluster.

In one example of Case-F, one or more indices of the selected candidate scaled Doppler shift estimates in the codebook for scaled Doppler shift for one or more RRHs in the RRH cluster.

In one example of Case-G, one or more differential Doppler shift estimates for one or more RRHs in the RRH cluster.

In one example of Case-H, one or more scaled differential Doppler shift estimates for one or more RRHs in the RRH cluster.

In one example of Case-I, one or more selected candidate differential Doppler shift estimates from a codebook for differential Doppler shift for one or more RRHs in the RRH cluster.

In one example of Case-J, one or more indices of the selected candidate differential Doppler shift estimates in the codebook for differential Doppler shift for one or more RRHs in the RRH cluster.

In one example of Case-K, one or more selected candidate scaled differential Doppler shift estimates from a codebook for scaled differential Doppler shift for one or more RRHs in the RRH cluster.

In one example of Case-L, one or more indices of the selected candidate scaled differential Doppler shift estimates in the codebook for scaled differential Doppler shift for one or more RRHs in the RRH cluster.

Case-A to Case-L can be extended to: (i) the frequency shift reporting corresponds to the phase shift reporting only, and (ii) the frequency shift reporting corresponds to the composite of both Doppler shift and phase shift reporting.

Furthermore, the frequency shift reporting can be multiplexed only with a WB CSI report, where the CSI report is periodic or semi-persistent. The frequency shift reporting can be reported only via PUCCH. Alternatively, the frequency shift reporting can be reported only when rank 1 is reported via RI, but the max allowed rank value can be more than 1. In another example, the reporting can be multiplexed with an aperiodic (AP) narrowband (NB) two-part CSI report. For example, the report is multiplexed with CQI or RI in part 1 and/or with CQI, PMI, and LI in part 2 of the CSI report.

A UE is configured with the frequency shift reporting that can be transmitted, for example, as part of the CSI report (hence multiplexed with other CSI parameters), and/or by multiplexing the frequency shift reporting with hybrid automatic repeat request acknowledgement (HARQ-ACK) transmission and/or scheduling request (SR). In one example, the frequency shift reporting can be transmitted via SR if it's payload (number of bits) is less or equal to B1 (e.g., B1=1).

In one example, the frequency shift reporting can be transmitted via HARQ-ACK if it's payload (number of bits) is less or equal to B1 (e.g., B1=1). In one example, the frequency shift reporting can be transmitted via SR or HARQ-ACK if the number of RRHs=2 (i.e., number of frequency shift reporting is 1).

When multiplexed with other CSI parameters, at least one of the following examples can be used.

In one example, the frequency shift reporting is via a separate (new) CSI parameter, e.g., frequency shift indicator (FSI).

In one example, the frequency shift reporting is joint with an existing CSI parameter (p), and the parameter (p) when reported indicates both a value for the CSI existing parameter and the frequency shift reporting. At least one of the following sub-examples can be used for the existing CSI parameter (p).

In one sub-example, the parameter (p) is a rank indicator (RI). When reported, RI indicates both a value for the rank and the frequency shift reporting.

In one sub-example, the parameter (p) is a CSI-RS resource indicator (CRI). When reported, CRI indicates both a CSI-RS resource and the frequency shift reporting.

In one sub-example, the parameter (p) is a layer indicator (LI). When reported, LI indicates both a layer and the frequency shift reporting.

In one sub-example, the parameter (p) is a precoding matrix indicator (PMI) for a 2 port CSI-RS resource. When reported, PMI indicates both a precoding matrix and the frequency shift reporting.

In one sub-example, the parameter (p) is a first precoding matrix indicator (PMI1) for a X>2 port CSI-RS resource. When reported, PMI1 indicates both first components of a precoding matrix and the frequency shift reporting.

In one sub-example, the parameter (p) is a second precoding matrix indicator (PMI2) for a X>2 port CSI-RS resource. When reported, PMI2 indicates both second components of a precoding matrix and the frequency shift reporting.

In one sub-example, the parameter (p) is a channel quality indicator (CQI). When reported, CQI indicates both a CQI value and frequency shift reporting.

In one sub-example, the parameter (p) is a layer 1 RSRP (L1-RSRP). When reported, L1-RSRP indicates both a RSRP value and the frequency shift reporting.

In one sub-example, the parameter (p) is a layer 1 SINR (L1-SINR). When reported, L1-SINR indicates both a SINR value and the frequency shift reporting.

In one example, the frequency shift reporting is using reserved or unused code points of an existing CSI parameter (p) to indicate the frequency shift reporting. At least one of the following sub-examples can be used for the existing CSI parameter (p).

In one sub-example, the parameter (p) is a rank indicator (RI).

In one sub-example, the parameter (p) is a CSI-RS resource indicator (CRI).

In one sub-example, the parameter (p) is a layer indicator (LI).

In one sub-example, the parameter (p) is a precoding matrix indicator (PMI) for a 2 port CSI-RS resource.

In one sub-example, the parameter (p) is a first precoding matrix indicator (PMI1) for a X>2 port CSI-RS resource.

In one sub-example, the parameter (p) is a second precoding matrix indicator (PMI2) for a X>2 port CSI-RS resource.

In one sub-example, the parameter (p) is a channel quality indicator (CQI).

In one sub-example, the parameter (p) is a layer 1 RSRP (L1-RSRP).

In one sub-example, the parameter (p) is a layer 1 SINR (L1-SINR).

In one example, the usage of an existing CSI parameter (p) can be configured (e.g., RRC) as either as a CSI parameter or as a parameter for the frequency shift reporting. A code point of the parameter (p) indicates the CSI parameter of the frequency shift reporting depending on the configured usage.

Figure 22:
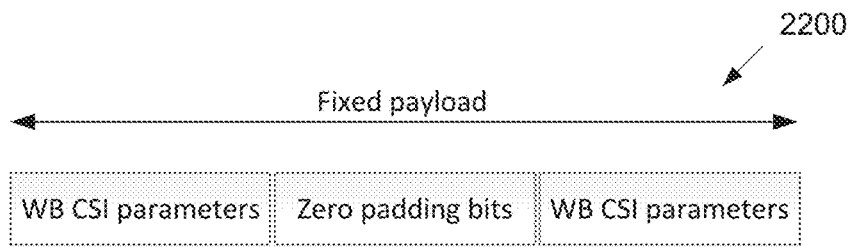
FIG. 22 illustrates an example of CSI payload according to embodiments of the present disclosure.

FIG. 22 illustrates an example of CSI payload 2200 according to embodiments of the present disclosure. An embodiment of the CSI payload 2200 shown in FIG. 22 is for illustration only.

The frequency shift reporting can be multiplexed with a periodic or semi-persistent (P/SP) CSI with wideband (WB)

reporting. For such WB CSI reporting, the CSI payload (number of bits) can be fixed regardless of the value of the reported CSI parameters such as RI (although the CSI payload can vary for different rank values). In order to ensure fixed CSI payload, a number of zero-padding bits can be appended with the CSI bits (see FIG. 22).

At least one of the following examples can be used for multiplexing the frequency shift reporting with the WB CSI.

In one example, a portion or all of the zero padding bits appended in the WB CSI report is used to report the frequency shift reporting. The least significant bits (LSBs) of the zero padding bits can be used for the frequency shift reporting. Or the most significant bits (MSBs) of the zero padding bits can be used for the frequency shift reporting.

In one example, the frequency shift reporting is multiplexed with the WB CSI parameters, wherein the multiplexing method is according to one of the examples described above.

Figure 23:
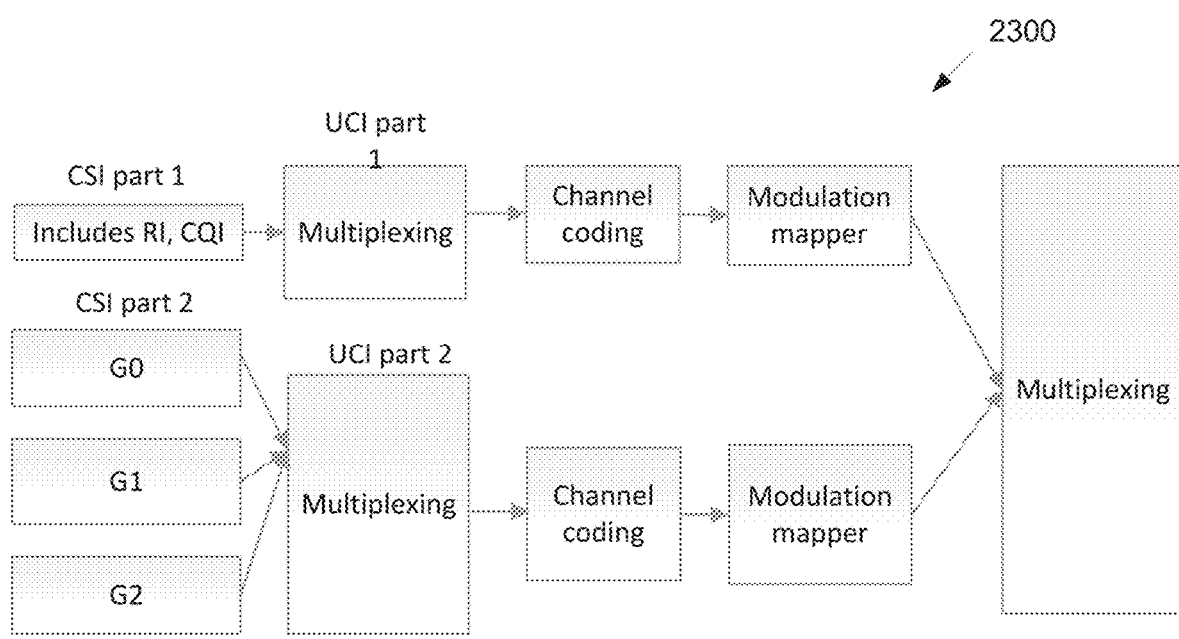
FIG. 23 illustrates an example of two part uplink control information (UCI) according to embodiments of the present disclosure.

FIG. 23 illustrates an example of two part UCI 2300 according to embodiments of the present disclosure. An embodiment of the two part UCI 2300 shown in FIG. 23 is for illustration only.

The frequency shift reporting can be multiplexed with an aperiodic (AP) CSI with subband (SB) reporting. For such SB reporting, the CSI can be partitioned into two parts, CSI part 1 and CSI part 2. The CSI part 1 includes RI and CQI (for the first codeword), and is multiplexed with UCI part 1. The CSI report includes LI, PMI, and CQI (for the second codeword when rank>4 is reported), and is multiplexed with UCI part 2. Here, UCI part 1 and UCI part 2 are parts of a two-part UCI (see FIG. 23).

At least one of the following examples can be used for multiplexing the frequency shift reporting with the SB CSI.

In one example, the frequency shift reporting is multiplexed with a CSI parameter in CSI part 1. For example, the frequency shift reporting is multiplexed with CQI (for the first code word) or RI, wherein the multiplexing method is according to one of the examples described above.

In one example, the frequency shift reporting is multiplexed with a CSI parameter in CSI part 2. For example, the frequency shift reporting is multiplexed with CQI (for the second code word when rank>4 is reported) or PMI or LI, wherein the multiplexing method is according to one of the examples described above.

In one example, the CSI part 2 is partitioned into three groups G0, G1, and G2 (as in Rel. 15/16 SB CSI reporting) and the UE reports either G1 or (G0, G1) or (G0, G1, G2) depending on the resource allocation for the CSI reporting and the total CSI part 2 payload (as described in UCI omission in Rel. 15/16 NR specification).

In one sub-example, the frequency shift reporting is multiplexed with a CSI parameter in G0, wherein the multiplexing method is according to one of the examples described above.

In one sub-example, the frequency shift reporting is multiplexed with a CSI parameter in G0 if only G0 is transmitted (reported) in UCI part 2 (i.e. G1 and G2 are omitted or not reported); the frequency shift reporting is multiplexed with a CSI parameter in G1 if only (G0, G1) is transmitted (reported) in UCI part 2 (i.e. G2 is omitted or not reported); and the frequency shift reporting is multiplexed with a CSI parameter in G2 if (G0, G1, G2) is transmitted (reported) in UCI part 2.

In addition to the above described frequency shift reporting assisted network side frequency synchronization/calibration (referred to as Alt. 1 in the present disclosure), there could be other design alternatives to align the frequencies between different RRHs and/or between the network and the UE: (1) Alt. 2: the UE could estimate frequency shifts (e.g., Doppler shifts discussed in this disclosure) for all RRHs in the RRH cluster. The UE would not report to the network any form of the frequency shift estimates. Instead, the UE would autonomously compensate the frequency shifts for the downlink receptions such as PDCCHs/PDSCHs from the RRHs in the RRH cluster; and (3) Alt. 3: the UE could be configured/indicated by the network to measure the frequency of one of the RRHs in the RRH cluster (e.g., by measuring certain DL RS(s) such as TRS(s) from the RRH). The UE could then transmit SRS(s)/PUCCH(s) to the RRHs in the RRH cluster using the estimated frequency. In this case, the UE would not report to the network any form of the frequency shift estimates.

The UE could be indicated/configured by the network to follow one or more of the design alternatives (e.g., Alt. 1, Alt. 2, and Alt. 3 discussed above) for frequency shift estimation and/or reporting. Alternatively, the UE could autonomously decide which design alternative(s) to follow for frequency shift estimation and/or reporting. In this case, the UE may need to indicate to the network their selected design alternative(s).

Figure 24:
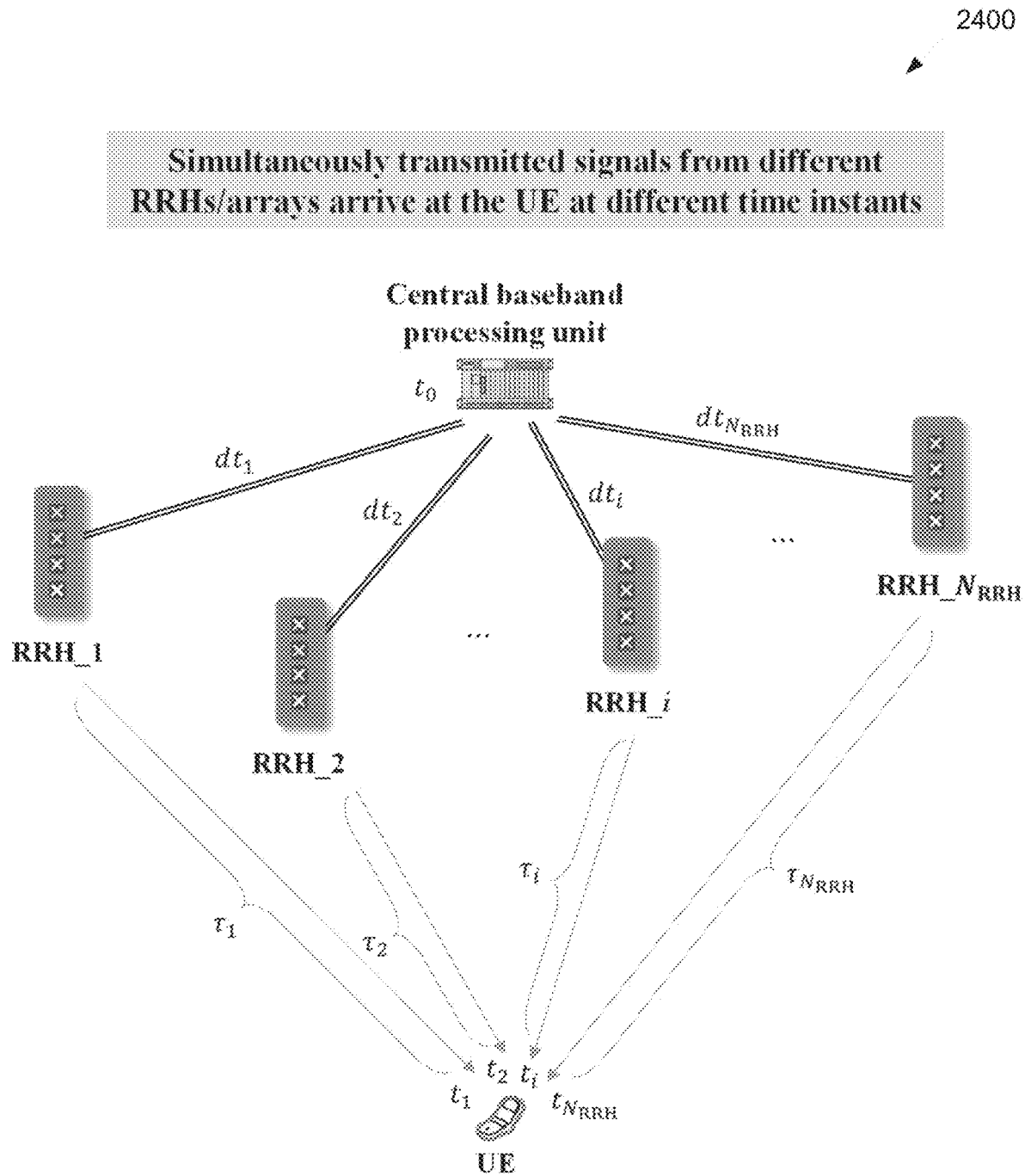
FIG. 24 illustrates an example of UE experiencing different downlink (DL) receive timings from different distributed RRHs according to embodiments of the present disclosure.

FIG. 24 illustrates an example of UE experiencing different DL receive timings from different distributed RRHs 2400 according to embodiments of the present disclosure. An embodiment of the UE experiencing the different DL receive timings from the different distributed RRHs 2400 shown in FIG. 24 is for illustration only.

In a distributed RRH/antenna system, in which different RRHs could be physically separated or non-co-located, the UE could receive the simultaneously transmitted signals from different RRHs in the RRH cluster at different time instants (receive timing differences). The receive timing differences could be due to (1) relative time alignment errors (TAEs) between different RRHs and the central network controller and/or (2) propagation delay differences between the RRHs and the UE. In FIG. 24, a conceptual example illustrating the receive timing differences in a RRH cluster comprising of $N_{RRH}$ RRHs is depicted. As shown in FIG. 24, the central network controller schedules all RRHs in the RRH cluster to transmit to the UE at time $t_0$.

The UE receives the signal transmitted from the i-th RRH in the RRH cluster at time $t_i$. Denote the TAE between RRH_i and the central network controller by $dt_i$ and the propagation delay between RRH_i and the UE by $\tau_i$. Hence, $t_i = t_0 + dt_i + \tau_i$. Note that the reference time $t_0$ could be configured with respect to one or more reference RRHs in the RRH cluster rather than the central network controller.

The UE could obtain the receive timings by measuring certain DL RSs (such as CSI-RSs, TRSs, SSBs, etc.) transmitted from one or more RRHs in the RRH cluster and report to the network their receive timings (or receive timing differences). The UE could be first configured/indicated by the network to measure one or more RSs (such as CSI-RSs, TRSs, SSBs, etc.) for receive timing estimation/tracking from each RRH (RRH-specific RSs for receive timing estimation/tracking). The UE could then be configured/indicated by the network to report to the network the corresponding measurement results from measuring the RRH-specific RSs for receive timing estimation/tracking. Here, the measurement results could correspond to the receive timing computed for each RRH in the RRH cluster for the UE.

In one example, the RRH-specific RSs for receive timing estimation/tracking from different RRHs could be multiplexed in time, frequency, spatial and/or code domains. For instance, the UE could be configured by the network to measure the RRH-specific RSs for receive timing estimation/tracking from different RRHs in different symbols/slots/etc. For another example, the UE could be configured by the network to measure the RRH-specific RSs for receiving timing estimation/tracking from different RRHs in different resource blocks. The UE could also be indicated by the network the association rule(s)/mapping relationship(s) between the RRH IDs/indices and the RRH-specific RSs for receive timing estimation/tracking. In this case, the UE could know which RRH(s) the corresponding RSs for receiving timing estimation/tracking are transmitted from.

In another example, the UE could be configured by the network to report the measurement results through certain time, frequency, spatial and/or code domain resources. For instance, the UE could be configured by the network to report the measurement results for different RRHs through different symbols/slots/etc. For another example, the UE could be configured by the network to report the measurement results for different RRHs through different resource blocks. The UE could be indicated by the network the association rule(s)/mapping relationship(s) between the RRH-specific RSs for receiving timing estimation/tracking and the reports and/or between the RRH IDs/indices and the reports. Alternatively, the UE could autonomously determine the association rule(s)/mapping relationship(s) between the RRH-specific RSs for receiving timing estimation/tracking (or the RRH IDs/indices) and the reports, and indicate to the network the association rule(s)/mapping relationship(s).

Figure 25:
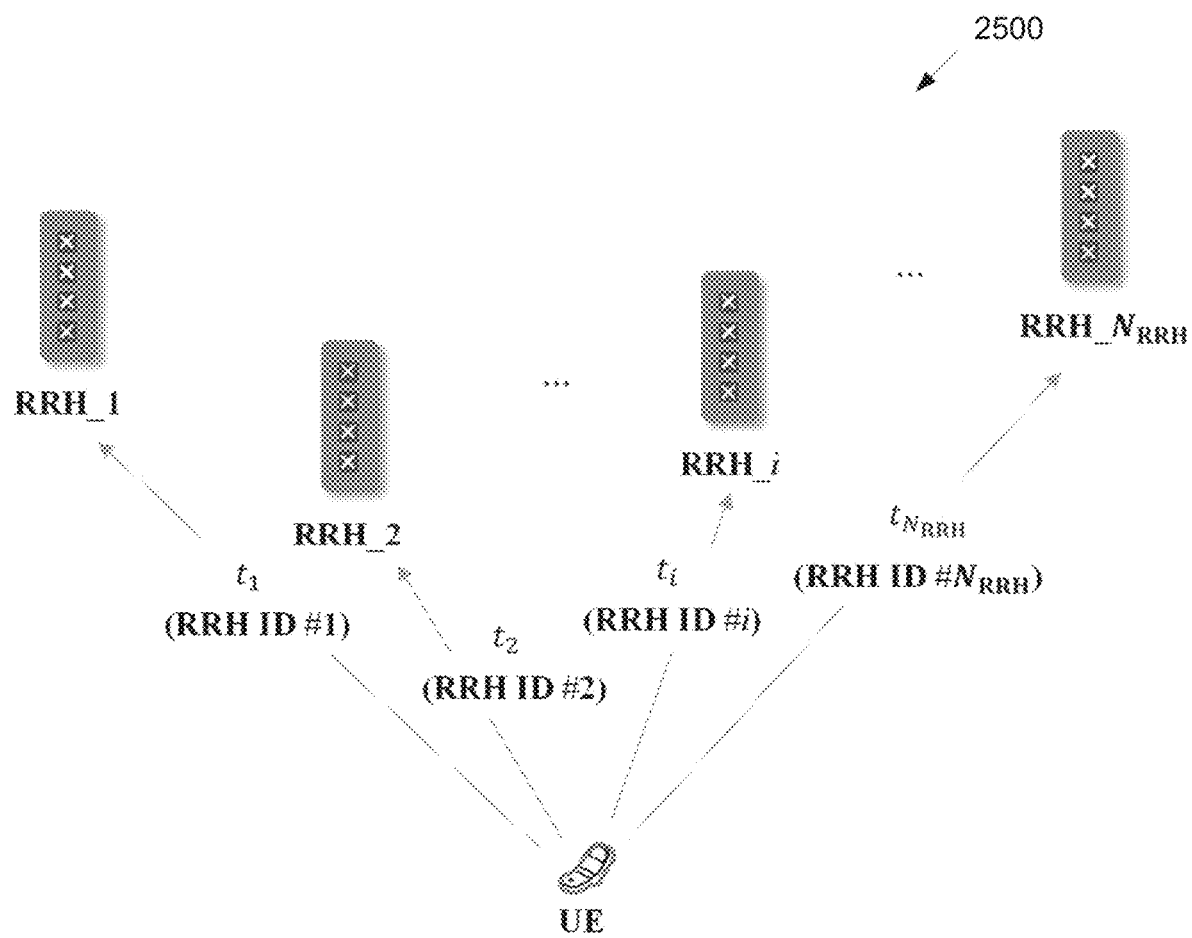
FIG. 25 illustrates an example of separately reporting DL receive timing estimates according to embodiments of the present disclosure.

FIG. 25 illustrates an example of separately reporting DL receive timing estimates 2500 according to embodiments of the present disclosure. An embodiment of separately reporting the DL receive timing estimates 2500 shown in FIG. 25 is for illustration only.

In one example of Option-2.1B, the UE could report to the network the exact values of their calculated receive timings for each RRH in the RRH cluster through the designated resource(s) for the corresponding RRH. The UE could also report to the network the RRH ID along with the report of the receiving timing for the RRH. In FIG. 25, a conceptual example characterizing separately reporting the receive timings for each RRH in the RRH cluster is presented. Upon receiving the receive timings for each RRH reported from the UE, the network could perform timing synchronization by compensating the timing differences between different RRHs in the RRH cluster. If the UE is configured/indicated by the network the reference time $t_0$, the UE could also report to the network the difference between the receive timing and the reference time $t_0$ (i.e., relative receive timing). For instance, the UE could report $t_i - t_0$ for RRH_i. In this disclosure, unless otherwise specified, the receive timing can also refer to the relative receive timing assuming that the UE can be configured/indicated by the network the reference time $t_0$.

In one example of Option-2.2B, the UE could first scale the receive timing(s) by a known factor. For instance, the UE could normalize the receiving timing for RRH_i by the CP length T, and obtain the scaled version as $t_i/T$. The UE could then report to the network the scaled versions of their calculated receive timings for each RRH in the RRH cluster through the designated resource(s) for the corresponding RRH. Similar to Option-2.1B, the UE could report to the network the RRH ID along with the report of the scaled receive timing for the RRH. Under certain settings, the UE may also need to indicate to the network the applied scaling factor. Whether to report the exact or scaled receiving timing(s) could be predefined/preconfigured, and known to both the network and the UE.

Alternatively, the UE could be configured/indicated by the network whether to report the exact or scaled values of the receiving timing(s). Further, the UE could indicate to the network whether the reported receiving timings are the exact values or scaled by the known scaling factor. If the UE is configured/indicated by the network the reference time $t_0$, the UE could also report to the network the scaled difference between the receive timing and the reference time $t_0$. For instance, the UE could report $(t_i - t_0)/T$ for RRH_i.

In one example of Option-2.3B, the UE could be configured by the network a set of candidate values of receive timing (codebook for receive timing), denoted by $U = \{u_1, u_2, \ldots, u_K\}$. For the receive timing computed for RRH_i ($t_i$), the UE could select one candidate receive timing value from the set/codebook of all candidate receive timing values that best characterizes the actual receive timing. For instance, the selected candidate receive timing value for RRH_i (denoted by $\hat{t}_i$) could have the smallest/least Euclidean distance with the actual receive timing for RRH_i ($t_i$) than the other candidate receive timing values in the set/codebook of all candidate receive timing values. The UE could report to the network the selected candidate receive timing values for each RRH in the RRH cluster.

Figure 26:
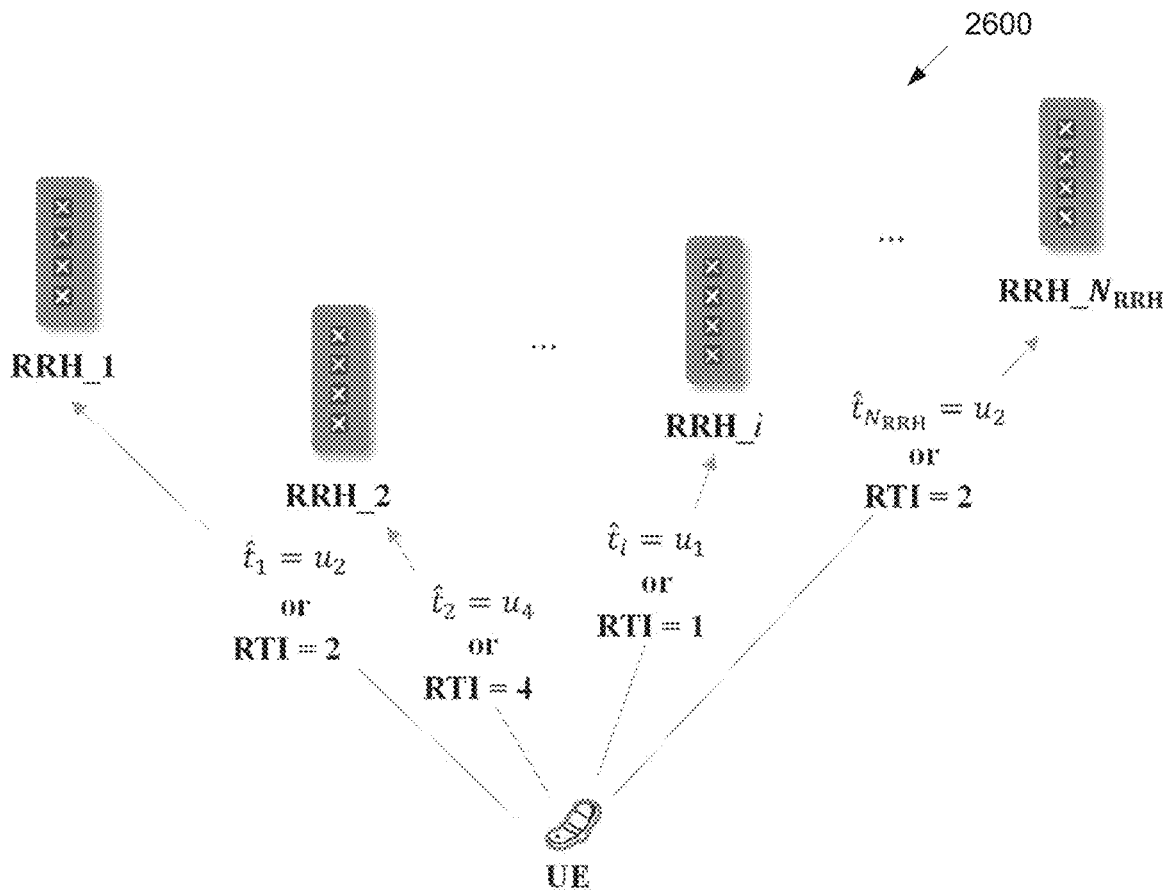
FIG. 26 illustrates an example of separately reporting quantized DL receive timing estimates according to embodiments of the present disclosure.

FIG. 26 illustrates an example of separately reporting quantized DL receive timing estimates 2600 according to embodiments of the present disclosure. An embodiment of separately reporting the quantized DL receive timing estimates 2600 shown in FIG. 26 is for illustration only.

Alternatively, the UE could report to the network the indices of the selected candidate receive timings for each RRH in the RRH cluster in the set/codebook of all candidate receive timing values (denoted by receive timing indices (RTIs)). One conceptual example describing reporting the selected candidate receive timing values or their indices in the codebook for receive timing is presented in FIG. 26 for a RRH cluster comprising of $N_{RRH}$ RRHs.

The UE could report to the network the selected candidate receive timing value or an index of the selected candidate receive timing value in the codebook for receive timing through the designated resource(s) for the corresponding RRH. The UE could also report to the network the RRH ID along with the report of the selected candidate receive timing value or an index of the selected candidate receive timing value in the codebook for receive timing for the corresponding RRH. If the UE is configured/indicated by the network the reference time $t_0$, the UE could first calculate the relative receive timings for all RRHs in the RRH cluster. For instance, the UE could compute the relative receive timing for RRH_i as $t_i - t_0$.

Following the above described procedures, the UE could then report to the network the selected candidate relative receive timing values or their indices in the codebook constructed for relative receive timing for each RRH in the RRH cluster.

In one example of Option-2.4B, the UE could first scale the receive timing(s) by a known factor. For instance, the UE could normalize the receive timing for RRH_i by the CP length T, and obtain the scaled version as $t_i/T$. The UE could be configured by the network a set of candidate values of scaled receive timing (codebook for scaled receive timing). For a given scaled receive timing, the UE could select one candidate scaled receive timing value from the set/codebook of all candidate scaled receive timing values that best characterizes the actual scaled receive timing. For instance, the selected candidate scaled receive timing value could have the smallest/least Euclidean distance with the actual scaled receive timing than the other candidate scaled receive timing values in the set/codebook of all candidate scaled receive timing values. The UE could report to the network the selected candidate scaled receive timing values for each RRH in the RRH cluster.

Alternatively, the UE could report to the network the indices of the selected candidate scaled receive timings for each RRH in the RRH cluster in the set/codebook of all candidate scaled receive timing values. The UE could report to the network the selected candidate scaled receive timing value or an index of the selected candidate scaled receive timing value in the codebook for scaled receive timing through the designated resource(s) for the corresponding RRH. The UE could also report to the network the RRH ID along with the report of the selected candidate scaled receive timing value or an index of the selected candidate scaled receive timing value in the codebook for scaled receive timing for the corresponding RRH. If the UE is configured/indicated by the network the reference time $t_0$, the UE could first calculate the scaled relative receive timings for all RRHs in the RRH cluster. For instance, the UE could compute the scaled relative receive timing for RRH_i as $(t_i-t_0)/T$.

Following the above described procedures, the UE could then report to the network the selected candidate scaled relative receive timing values or their indices in the codebook constructed for scaled relative receive timing for each RRH in the RRH cluster. Under certain settings, the UE may also need to indicate to the network the applied scaling factor.

In one example of Option-2.5B, the UE could report to the network a vector of receive timings, with each entry in the vector corresponding to a RRH in the RRH cluster. For instance, for a RRH cluster comprising of $N_{RRH}$ RRHs, the UE could form the vector of receive timings as $t=[t_1, t_2, \ldots, t_i, \ldots, t_{N_{RRH}}]$, where $t_i$ corresponds to the i-th RRH in the RRH cluster (RRH_i). If the UE is configured/indicated by the network the reference time $t_0$, the UE could report to the network a vector of relative receive timings $[t_1-t_0, t_2-t_0, \ldots, t_i-t_0, \ldots, t_{N_{RRH}}-t_0]$. The association rule(s)/mapping relationship(s) between the entries in the vector of (relative) receive timings and the RRHs in the RRH cluster could be predefined, and known to both the network and the UE.

For example, the first entry in the vector corresponds to the RRH with the lowest RRH ID (or the first RRH in the list of RRHs configured to the UE), the second entry in the vector corresponds to the RRH with the second lowest RRH ID (or the second RRH in the list of RRHs configured to the UE), and so on, and the last entry in the vector corresponds to the RRH with the highest RRH ID (or the last RRH in the list of RRHs configured to the UE). Note that other association rule(s)/mapping relationship(s) between the entries in the vector of receive timings and the RRHs in the RRH cluster are also possible.

Alternatively, the UE could be indicated by the network the explicit association rule(s)/mapping relationship(s) between the entries in the vector of receive timings and the RRHs in the RRH cluster. Furthermore, the UE could autonomously determine how the entries in the vector of receive timings would map to the RRHs in the RRH cluster, and indicate to the network their determined association rule(s)/mapping relationship(s) between the entries in the vector of receive timings and the RRHs in the RRH cluster.

The vector of receive timings could be in other forms as well such as: (1) a vector of scaled receive timings (e.g., scaled by 1/T) (similar to those obtained under Option-2.2B), with each entry in the vector corresponding to a RRH in the RRH cluster; (2) a vector of selected candidate receive timings from a codebook for receive timing (similar to those obtained under Option-2.3B), with each entry in the vector corresponding to a RRH in the RRH cluster; (3) a vector of indices of the selected candidate receive timings in the codebook for receive timing (similar to those obtained under Option-2.3B), with each entry in the vector corresponding to a RRH in the RRH cluster; (4) a vector of selected candidate scaled receive timings from a codebook for scaled receive timing (similar to those obtained under Option-2.4B), with each entry in the vector corresponding to a RRH in the RRH cluster; and/or (5) a vector of indices of the selected candidate scaled receive timings in the codebook for scaled receive timing (similar to those obtained under Option-2.4B), with each entry in the vector corresponding to a RRH in the RRH cluster.

Figure 27:
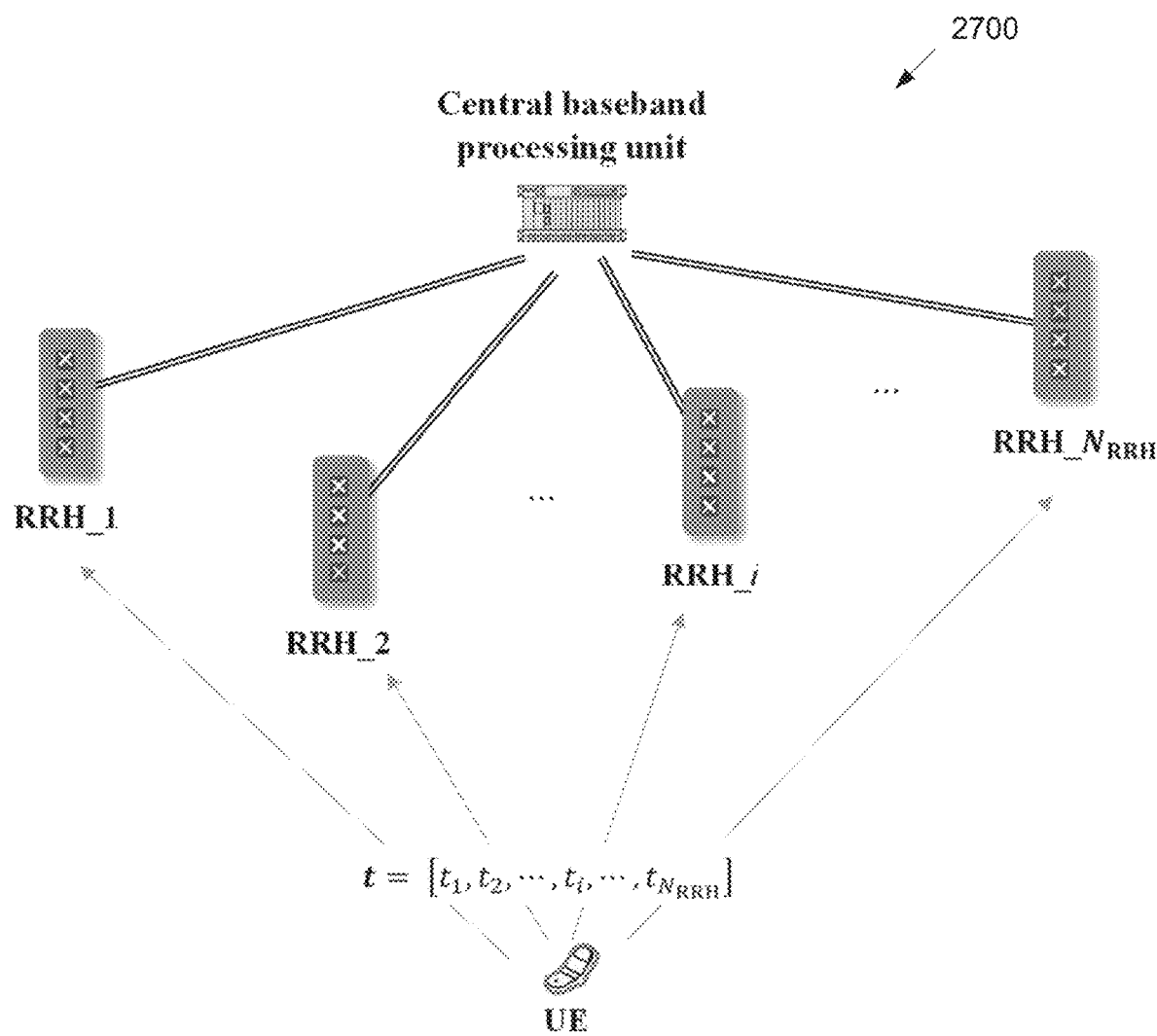
FIG. 27 illustrates an example of jointly reporting DL receive timing estimates according to embodiments of the present disclosure.

FIG. 27 illustrates an example of jointly reporting DL receive timing estimates 2700 according to embodiments of the present disclosure. An embodiment of jointly reporting DL receive timing estimates 2700 shown in FIG. 27 is for illustration only.

The UE could report to the network the vector of receive timings to one or more RRHs in the RRH cluster through their designated resource(s) configured/indicated to the UE. In the example shown in FIG. 27, the UE transmits to the network the vector of receive timings for all RRHs in the RRH cluster, and the network would perform timing synchronization between all RRHs in the RRH cluster. The receive timing in all of the above examples can also refer to the relative receive timing assuming that the UE could be indicated/configured by the network the reference time $t_0$.

In addition to the above discussed design options, the UE could report to the network one or more receive timing differences for one or more RRHs in the RRH cluster. The UE could determine the receive timing difference(s) based on one or more reference receive timings for one or more RRHs in the RRH cluster. For instance, denote two receive timings for RRH_1 and RRH_2 by $t_1$ and $t_2$. Consider $t_2$ as the reference receive timing. The receive timing difference between RRH_1 and RRH_2 could be computed as $\Delta t_1 = t_1 - t_2$ (or $\Delta t_1 = t_2 - t_1$) (relative difference) or $\Delta t_1 = |t_1 - t_2|$ (absolute difference). The reference RRH(s) in the RRH cluster with which the reference receive timing(s) is associated could be predefined, and known to both the network and the UE. For example, the reference RRH could be the RRH with the lowest RRH ID in the RRH cluster (or the first RRH in the list of RRHs configured to the UE).

Alternatively, the UE could be indicated by the network the reference RRHs (and/or the reference RRH IDs) in the RRH cluster. The UE could also autonomously determine the reference RRH(s) in the RRH cluster with which the reference receive timing(s) is associated. The UE could report to the network their determined reference RRH(s) in form of RRH ID(s)/index(s). As discussed above, the reference time $t_0$ could also be configured with respect to the reference RRH(s) in the RRH cluster rather than the central network controller.

Figure 28:
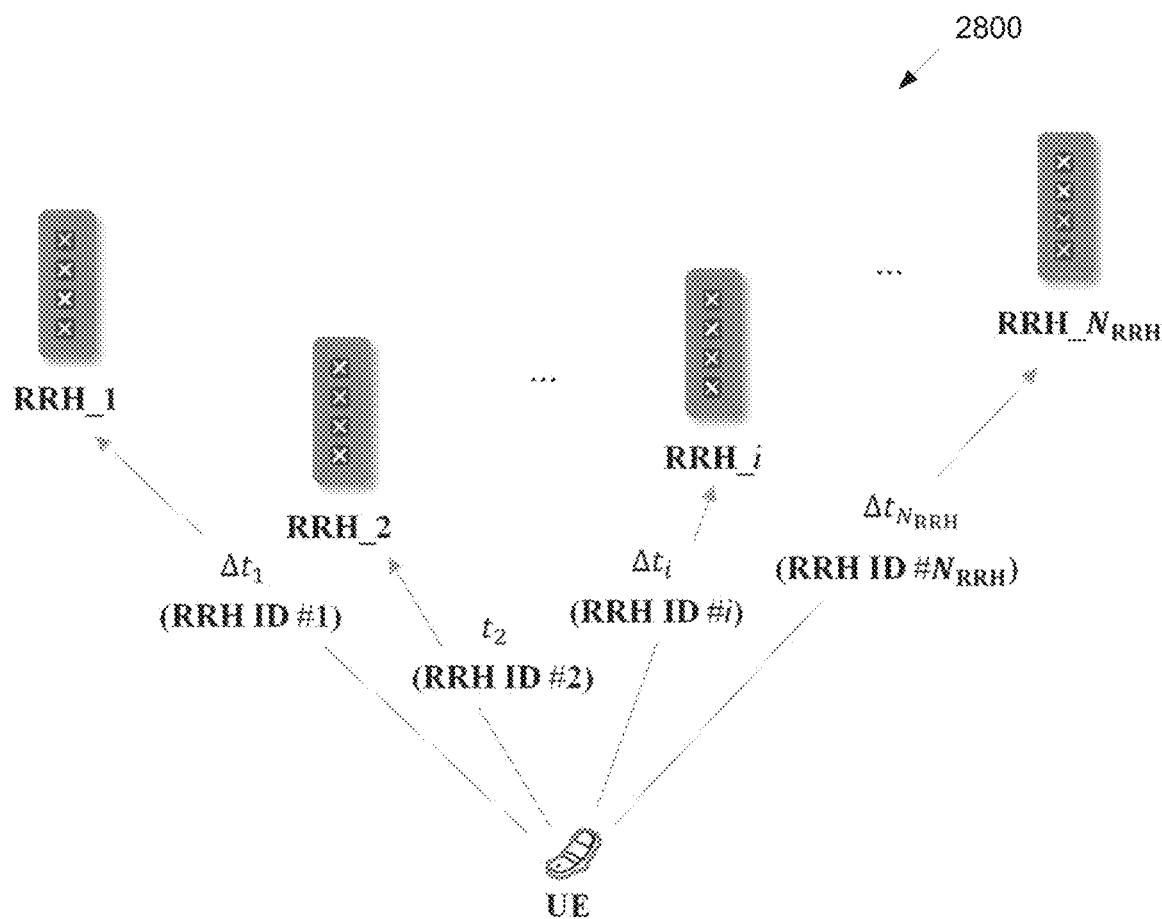
FIG. 28 illustrates an example of reporting DL receive timing differences or differential DL receive timing estimates according to embodiments of the present disclosure.

FIG. 28 illustrates an example of reporting DL receive timing differences or differential DL receive timing estimates 2800 according to embodiments of the present disclosure. An embodiment of reporting the DL receive timing differences or the differential DL receive timing estimates 2800 shown in FIG. 28 is for illustration only.

In one example of Option-2.AB, the UE could report to the network the exact values of the receive timing difference(s) between one or more RRHs and one or more reference RRHs in the RRH cluster through the designated resource(s) for the corresponding RRH(s). The UE could also report to the network the RRH ID along with the report of the receive timing difference for the RRH. In FIG. 28, a conceptual example characterizing receive timing difference reporting is depicted.

As can be seen from FIG. 28, RRH_2 is regarded as the reference RRH, and the UE could report to the network the receive timing $t_2$ for RRH_2. For other RRHs in the RRH cluster such as RRH_i (i≠2), the UE could report to the network the receive timing differences for them (with respect to the receive timing for the reference RRH_2) such as $\Delta t_i = t_i - t_2$ ($\Delta t_i = t_2 - t_i$) or $\Delta t_i = |t_i - t_2|$ with a sign indicator for RRH_i. As discussed above, the UE could be indicated by the network the reference RRH(s) in the RRH cluster such as RRH_2 in FIG. 28.

The UE could also autonomously determine the reference receive timing(s), and therefore the corresponding reference RRH(s) such as RRH_2 in FIG. 28. In this case, the UE would need to report to the network that RRH_2 is regarded as the reference RRH. Upon receiving the receive timing difference(s) reported from the UE, the network could recover the exact receive timing(s) for the corresponding RRH(s) and perform timing synchronization between RRHs in the RRH cluster for the UE.

In one example of Option-2.BB, the UE could first scale the receive timing difference(s) by a known factor. For instance, the UE could normalize the receive timing difference for RRH_j (with respect to the receive timing of a reference RRH) by the CP length T, and obtain the scaled version as $\Delta t_j/T$. The UE could then report to the network the scaled version(s) of the receive timing difference(s) for one or more RRHs in the RRH cluster through the designated resource(s) for the corresponding RRH(s).

Similar to Option-2.AB, the UE could report to the network the RRH ID along with the report of the scaled receive timing difference for the RRH. As discussed above, the UE could be indicated by the network the reference RRH(s) in the RRH cluster. The UE could also autonomously determine the reference receive timing(s), and therefore the corresponding reference RRH(s). In this case, the UE would need to report to the network which RRH(s) (e.g., in form of the RRH ID(s)) is regarded as the reference RRH(s). Under certain settings, the UE may also need to indicate to the network the applied scaling factor. Whether to report the exact or scaled receive timing difference(s) could be predefined/preconfigured, and known to both the network and the UE.

Alternatively, the UE could be configured/indicated by the network whether to report the exact or scaled values of the receive timing difference(s). Furthermore, the UE could indicate to the network whether the reported receive timing differences are the exact values or scaled by the known scaling factor.

In one example of Option-2.CB, the UE could be configured by the network one set of candidate values of receive timing difference (codebook for receive timing difference), denoted by $V=\{v_1, v_2, \ldots, v_L\}$. For the receive timing difference $\Delta t_j$ for RRH_j (e.g., $\Delta t_j = t_j - t_i$ ($\Delta t_j = t_i - t_j$) or $\Delta t_j = |t_j - t_i|$ assuming RRH_i as the reference RRH), the UE could select one candidate receive timing difference value from the set/codebook of all candidate receive timing difference values that best characterizes the actual receive timing difference.

For instance, the selected candidate receive timing difference value for RRH_j (denoted by $\hat{\Delta t}_j$) could have the smallest/least Euclidean distance with the actual receive timing difference for RRH_j ($\Delta t_j$) than the other candidate receive timing difference values in the set/codebook of all candidate receive timing difference values. The UE could report to the network the selected candidate receive timing difference value(s) for one or more RRHs in the RRH cluster.

Alternatively, the UE could report to the network the index(es) of the selected candidate receive timing difference value(s) for one or more RRHs in the RRH cluster in the set/codebook of all candidate receive timing difference values (denoted by differential RTI(s)–dRTI(s)). If the codebook for receive timing difference V contains only absolute-valued codewords/entries, the UE could also report a sign indicator along with the report of the selected candidate receive timing difference value or the dRTI. The UE could also report to the network the RRH ID along with the report of the selected candidate receive timing difference value (or the dRTI) for the RRH.

As discussed above, the UE could be indicated by the network the reference RRH(s) in the RRH cluster. The UE could also autonomously determine the reference receive timing(s), and therefore the corresponding reference RRH(s). In this case, the UE would need to report to the network which RRH(s) (e.g., in form of the RRH ID(s)) is regarded as the reference RRH(s).

In one example of Option-2.DB, the UE could first scale the receive timing difference(s) by a known factor. For instance, the UE could normalize the receive timing difference for RRH_j by the CP length T, and obtain the scaled version as $\Delta t_j/T$. The UE could be configured by the network a set of candidate values of scaled receive timing difference (codebook for scaled receive timing difference). For a scaled receive timing difference, the UE could select one candidate scaled receive timing difference value from the set/codebook of all candidate scaled receive timing difference values that best characterizes the scaled receive timing difference.

For instance, the selected candidate scaled receive timing difference value could have the smallest/least Euclidean distance with the actual scaled receive timing difference than the other candidate scaled receive timing difference values in the set/codebook of all candidate scaled receive timing difference values. The UE could report to the network the selected candidate scaled receive timing difference values for one or more RRHs in the RRH cluster.

Alternatively, the UE could report to the network the index(es) of the selected candidate scaled receive timing difference(s) for one or more RRHs in the RRH cluster in the set/codebook of all candidate scaled receive timing difference values. If the codebook for scaled receive timing difference contains only absolute-valued codewords/entries, the UE could also report a sign indicator along with the report of the selected candidate scaled receive timing difference value or the index of the selected candidate scaled receive timing difference value in the set/codebook of all candidate scaled receive timing difference values. Under certain settings, the UE may need to indicate to the network the applied scaling factor.

The UE could report to the network the selected candidate scaled receive timing difference value or an index of the selected candidate scaled receive timing difference value in the codebook for scaled receive timing difference through the designated resource(s) for the corresponding RRH. The UE could also report to the network the RRH ID along with the report of the selected candidate scaled receive timing difference value or an index of the selected candidate scaled receive timing difference value in the codebook for scaled receive timing difference for the corresponding RRH. As discussed above, the UE could be indicated by the network the reference RRH(s) in the RRH cluster. The UE could also autonomously determine the reference receive timing(s), and therefore the corresponding reference RRH(s). In this case, the UE would need to report to the network which RRH(s) (e.g., in form of the RRH ID(s)) is regarded as the reference RRH(s).

In one example of Option-2.EB, the UE could report to the network a vector of receive timing differences, with each entry in the vector corresponding to a RRH in the RRH cluster and calculated with respect to a reference receive timing. For instance, assuming that $M_{RRH}$ RRHs in the RRH cluster are associated with the receive timing differences ("differential" RRHs), the UE could form the vector of receive timing differences as $\Delta t=[\Delta t_1, \Delta t_2, \ldots, \Delta t_j, \ldots, \Delta_{M_{RRH}}]$. The association rule(s)/mapping relationship(s) between the entries in the vector of receive timing differences and the "differential" RRHs could be predefined, and known to both the network and the UE.

For example, the first entry in the vector corresponds to the RRH with the lowest RRH ID among the "differential" RRHs (or the first RRH in the list of "differential" RRHs configured to the UE), the second entry in the vector corresponds to the RRH with the second lowest RRH ID among the "differential" RRHs (or the second RRH in the list of "differential" RRHs configured to the UE), and so on, and the last entry in the vector corresponds to the RRH with the highest RRH ID among the "differential" RRHs (or the last RRH in the list of "differential" RRHs configured to the UE). Note that other association rule(s)/mapping relationship(s) between the entries in the vector of receive timing differences and the "differential" RRHs in the RRH cluster are also possible.

Alternatively, the UE could be indicated by the network the explicit association rule(s)/mapping relationship(s) between the entries in the vector of receive timing differences and the "differential" RRHs in the RRH cluster. Furthermore, the UE could autonomously determine how the entries in the vector of receive timing differences would map to the "differential" RRHs in the RRH cluster, and indicate to the network their determined association rule(s)/mapping relationship(s) between the entries in the vector of receive timing differences and the "differential" RRHs in the RRH cluster.

The vector of receive timing differences could be in other forms as well such as: (1) a vector of scaled receive timing differences (e.g., scaled by 1/T) (similar to those obtained under Option-2.BB), with each entry in the vector corresponding to a RRH in the RRH cluster; (2) a vector of selected candidate receive timing differences from a codebook for receive timing difference (similar to those obtained under Option-2.CB), with each entry in the vector corresponding to a RRH in the RRH cluster; (3) a vector of indices of the selected candidate receive timing differences in the codebook for receive timing difference (similar to those obtained under Option-2.CB), with each entry in the vector corresponding to a RRH in the RRH cluster; (4) a vector of selected candidate scaled receive timing differences from a codebook for scaled receive timing difference (similar to those obtained under Option-2.DB), with each entry in the vector corresponding to a RRH in the RRH cluster; and/or (5) a vector of indices of the selected candidate scaled receive timing differences in the codebook for scaled receive timing difference (similar to those obtained under Option-2.DB), with each entry in the vector corresponding to a RRH in the RRH cluster.

The UE could report to the network the vector of receive timing differences to one or more RRHs in the RRH cluster through their designated resource(s) configured/indicated to the UE. As discussed above, the UE could be indicated by the network the reference RRH(s) in the RRH cluster. The UE could also autonomously determine the reference receive timing(s), and therefore the corresponding reference RRH(s). In this case, the UE would need to report to the network which RRH(s) (e.g., in form of the RRH ID(s)) is regarded as the reference RRH(s).

The UE could report to the network the receive timing difference(s) for one or more RRHs in the RRH cluster following the strategies provided under Option-2.AB, Option-2.BB, Option-2.CB, Option-2.DB, and/or Option-2.EB. Furthermore, the UE could report to the network the receive timing(s) for one or more reference RRHs in the RRH cluster following the strategies discussed in Option-2.1B, Option-2.2B, Option-2.3B, Option-2.4B, and/or Option-2.5B. Hence, there are many combinations of different reporting methods to report the receive timing(s)/receive timing difference(s).

For instance, the UE could report to the network the receive timing(s) for the reference RRH(s) in the RRH cluster following Option-2.2B, while report to the network the receive timing difference(s) for the "differential" RRH(s) in the RRH cluster following Option-2.AB. The UE could be indicated by the network to follow one or more combinations of the reporting methods to report to the network the receive timing(s)/receive timing difference(s) for the RRHs in the RRH cluster for the UE.

In the above described design options, the UE would report to the network the receive timings/receive timing differences for all the RRHs in the RRH cluster for the UE. The UE could report to the network the receive timings/receive timing differences for a subset of RRHs in the RRH cluster for the UE. The UE could be indicated by the network the subset of RRHs through higher layer RRC signaling, MAC CE activation command (e.g., by activating the subset of RRHs from a list/pool of all RRHs in the RRH cluster) or DCI signaling. Alternatively, the UE could autonomously determine the subset of RRHs in the RRH cluster, and indicate to the network the selected RRHs (e.g., in form of their RRH IDs).

The UE could be configured by the network one or more thresholds for determining receive timing/receive timing difference report(s).

For Option-2.1B, Option-2.3B, and Option-2.5B, the UE could be configured by the network a threshold (denoted by Th_3) for comparing with the (relative) receive timing. For instance, if a (relative) receive timing is below the threshold, the UE would not report to the network the (relative) receive timing for the corresponding RRH or report to the network a zero (relative) receive timing for the corresponding RRH.

For Option-2.2B, Option-2.4B, and Option-2.5B, the UE could be configured by the network a threshold (denoted by Th_4) for comparing with the scaled (relative) receive timing. For instance, if a scaled (relative) receive timing is below the threshold, the UE would not report to the network the scaled (relative) receive timing for the corresponding RRH or report to the network a zero scaled (relative) receive timing for the corresponding RRH.

For Option-2.AB, Option-2.CB, and Option-2.EB, the UE could be configured by the network a threshold (denoted by Th_C) for comparing with the receive timing difference. For instance, if a receive timing difference is below the threshold, the UE would not report to the network the receive timing difference for the corresponding RRH or report to the network a zero receive timing difference for the corresponding RRH. For example, Th_C could correspond to the CP length.

For Option-2.BB, Option-2.DB, and Option-2.EB, the UE could be configured by the network a threshold (denoted by Th_D) for comparing with the scaled receive timing difference. For instance, if a scaled receive timing difference is below the threshold, the UE would not report to the network the scaled receive timing difference for the corresponding RRH or report to the network a zero scaled receive timing difference for the corresponding RRH.

Alternatively, the UE could autonomously determine/select the thresholds such as Th_3, Th_4, Th_C and/or Th_D discussed above for determining the receive timing/receive timing difference report(s). For this case, the UE could send to the network their determined threshold(s).

The UE could compute the receive timing(s)/receive timing difference(s) by accounting for various multi-path timing/delay components.

For instance: (1) Case-1: the UE could compute the receive timing(s)/receive timing difference(s) based on the average delay of the multi-path components; (2) Case-2: the UE could compute the receive timing(s)/receive timing difference(s) based on the delay spread of the multi-path components; (3) Case-3: the UE could compute the receive timing(s)/receive timing difference(s) based on the arrival time of the first path; (4) Case-4: the UE could compute the receive timing(s)/receive timing difference(s) based on the arrival time of the last path; and/or (5) Case-5: the UE could compute the receive timing(s)/receive timing difference(s) based on the arrival time of the strongest path.

Note that there could be other cases/possibilities to account for various multi-path timing/delay components in determining the receive timing(s)/receive timing difference(s). The UE could be indicated/configured by the network to follow one or more cases (e.g., from Case-1, Case-2, Case-3, Case-4 and Case-5) to determine the receive timing(s)/receive timing difference(s).

Alternatively, the UE could autonomously decide one or more cases (e.g., from Case-1, Case-2, Case-3, Case-4 and Case-5) to follow to determine the receive timing(s)/receive timing difference(s). The UE could incorporate the estimated multi-path timing/delay components such as the average delay of the multi-path components, the delay spread of the multi-path component, the arrival time of the first path, the arrival time of the last path, the arrival time of the strongest path, and/or etc. into the report(s) of the receive timing(s)/receive timing difference(s).

In the above descried design options, the UE could be configured/indicated by the network to measure the RRH-specific RSs for receive timing estimation/tracking. Alternatively, the UE could be configured/indicated by the network to measure a common RS transmitted from one or more RRHs in the RRH cluster for receive timing estimation/tracking. The UE could be configured by the network to measure the RRH-specific RSs or the common RS for receive timing estimation/tracking in a periodic/semi-persistent manner, and report to the network the corresponding measurement results. Alternatively, the UE could be triggered by the network to measure the RRH-specific RSs or the common RS for receive timing estimation/tracking in an aperiodic manner. The UE could also trigger the network to send the RRH-specific RSs or the common RS for receive timing estimation/tracking.

In the present disclosure, a receive timing reporting is defined, which includes at least one of the following cases: (1) Case-a: One or more receive timings for one or more RRHs in the RRH cluster; (2) Case-b: One or more scaled receive timings for one or more RRHs in the RRH cluster; (3) Case-c: One or more selected candidate receive timings from a codebook for receive timing for one or more RRHs in the RRH cluster; (4) Case-d: One or more indices of the selected candidate receive timings in the codebook for receive timing for one or more RRHs in the RRH cluster; (5) Case-e: One or more selected candidate scaled receive timings from a codebook for scaled receive timing for one or more RRHs in the RRH cluster; (6) Case-f: One or more indices of the selected candidate scaled receive timings in the codebook for scaled receive timing for one or more RRHs in the RRH cluster; (7) Case-g: One or more receive timing differences for one or more RRHs in the RRH cluster; (8) Case-h: One or more scaled receive timing differences for one or more RRHs in the RRH cluster; (9) Case-i: One or more selected candidate receive timing differences from a codebook for receive timing difference for one or more RRHs in the RRH cluster; (10) Case-j: One or more indices of the selected candidate receive timing differences in the codebook for receive timing difference for one or more RRHs in the RRH cluster; (11) Case-k: One or more selected candidate scaled receive timing differences from a codebook for scaled receive timing difference for one or more RRHs in the RRH cluster; and/or (12) Case-l: One or more indices of the selected candidate scaled receive timing differences in the codebook for scaled receive timing difference for one or more RRHs in the RRH cluster.

Furthermore, the receive timing reporting can be multiplexed only with a WB CSI report, where the CSI report is periodic or semi-persistent. The receive timing reporting can be reported only via PUCCH. Alternatively, the receive timing reporting can be reported only when rank 1 is reported via RI, but the max allowed rank value can be more than 1.

A UE is configured with the receive timing reporting that can be transmitted, for example, as part of the CSI report (hence multiplexed with other CSI parameters), and/or by multiplexing the receive timing reporting with HARQ-ACK transmission and/or Scheduling Request (SR). In one example, the receive timing reporting can be transmitted via SR if it's payload (number of bits) is less or equal to B1 (e.g., B1=1). In one example, the receive timing reporting can be transmitted via HARQ-ACK if it's payload (number of bits) is less or equal to B1 (e.g., B1=1). In one example, the receive timing reporting can be transmitted via SR or HARQ-ACK if the number of RRHs=2 (i.e., number of receive timing reporting is 1).

When multiplexed with other CSI parameters, at least one of the following examples can be used.

In one example, the receive timing reporting is via a separate (new) CSI parameter, e.g., a receive timing indicator (RTI).

In one example, the receive timing reporting is joint with an existing CSI parameter (p), and the parameter (p) when reported indicates both a value for the CSI existing parameter and the receive timing reporting. At least one of the following examples can be used for the existing CSI parameter (p).

In one sub-example, the parameter (p) is a rank indicator (RI). When reported, RI indicates both a value for the rank and the receive timing reporting.

In one sub-example, the parameter (p) is a CSI-RS resource indicator (CRI). When reported, CRI indicates both a CSI-RS resource and the receive timing reporting.

In one sub-example, the parameter (p) is a layer indicator (LI). When reported, LI indicates both a layer and the receive timing reporting.

In one sub-example, the parameter (p) is a precoding matrix indicator (PMI) for a 2 port CSI-RS resource. When reported, PMI indicates both a precoding matrix and the receive timing reporting.

In one sub-example, the parameter (p) is a first precoding matrix indicator (PMI1) for a X>2 port CSI-RS resource. When reported, PMI1 indicates both first components of a precoding matrix and the receive timing reporting.

In one sub-example, the parameter (p) is a second precoding matrix indicator (PMI2) for a X>2 port CSI-RS resource. When reported, PMI2 indicates both second components of a precoding matrix and the receive timing reporting.

In one sub-example, the parameter (p) is a channel quality indicator (CQI). When reported, CQI indicates both a CQI value and receive timing reporting.

In one sub-example, the parameter (p) is a layer 1 RSRP (L1-RSRP). When reported, L1-RSRP indicates both a RSRP value and the receive timing reporting.

In one sub-example, the parameter (p) is a layer 1 SINR (L1-SINR). When reported, L1-SINR indicates both a SINR value and the receive timing reporting.

In one example, the receive timing reporting is using reserved or unused code points of an existing CSI parameter (p) to indicate the receive timing reporting. At least one of the following examples can be used for the existing CSI parameter (p).

In one sub-example, the parameter (p) is a rank indicator (RI).

In one sub-example, the parameter (p) is a CSI-RS resource indicator (CRI).

In one sub-example, the parameter (p) is a layer indicator (LI).

In one sub-example, the parameter (p) is a precoding matrix indicator (PMI) for a 2 port CSI-RS resource.

In one sub-example, the parameter (p) is a first precoding matrix indicator (PMI1) for a X>2 port CSI-RS resource.

In one sub-example, the parameter (p) is a second precoding matrix indicator (PMI2) for a X>2 port CSI-RS resource.

In one sub-example, the parameter (p) is a channel quality indicator (CQI).

In one sub-example, the parameter (p) is a layer 1 RSRP (L1-RSRP).

In one sub-example, the parameter (p) is a layer 1 SINR (L1-SINR).

In one example, the usage of an existing CSI parameter (p) can be configured (e.g., RRC) as either as a CSI parameter or as a parameter for the receive timing reporting. A code point of the parameter (p) indicates the CSI parameter of the receive timing reporting depending on the configured usage.

The receive timing reporting can be multiplexed with a periodic or semi-persistent (P/SP) CSI with wideband (WB) reporting. For such WB CSI reporting, the CSI payload (number of bits) can be fixed regardless of the value of the reported CSI parameters such as RI (although the CSI payload can vary for different rank values). In order to ensure fixed CSI payload, a number of zero-padding bits can be appended with the CSI bits (see FIG. 22). At least one of the following examples can be used for multiplexing the receive timing reporting with the WB CSI.

In one example, a portion or all of the zero padding bits appended in the WB CSI report is used to report the receive timing reporting. The least significant bits (LSBs) of the zero padding bits can be used for the receive timing reporting. Or the most significant bits (MSBs) of the zero padding bits can be used for the receive timing reporting.

In one example, the receive timing reporting is multiplexed with the WB CSI parameters, wherein the multiplexing method is according to one of the examples described above.

The receive timing reporting can be multiplexed with an aperiodic (AP) CSI with subband (SB) reporting. For such SB reporting, the CSI can be partitioned into two parts, CSI part 1 and CSI part 2. The CSI part 1 includes RI and CQI (for the first codeword), and is multiplexed with UCI part 1. The CSI report includes LI, PMI, and CQI (for the second codeword when rank>4 is reported), and is multiplexed with UCI part 2. Here, UCI part 1 and UCI part 2 are parts of a two-part UCI (see FIG. 23). At least one of the following examples can be used for multiplexing the receive timing reporting with the SB CSI.

In one example, the receive timing reporting is multiplexed with a CSI parameter in CSI part 1. For example, the receive timing reporting is multiplexed with CQI (for the first code word) or RI, wherein the multiplexing method is according to one of the examples described above.

In one example, the receive timing reporting is multiplexed with a CSI parameter in CSI part 2. For example, the receive timing reporting is multiplexed with CQI (for the second code word when rank>4 is reported) or PMI or LI, wherein the multiplexing method is according to one of the examples described above.

In one example, the CSI part 2 is partitioned into three groups G0, G1, and G2 (as in Rel. 15/16 SB CSI reporting) and the UE reports either G0 or (G0, G1) or (G0, G1, G2) depending on the resource allocation for the CSI reporting and the total CSI part 2 payload (as described in UCI omission in Rel. 15/16 NR specification).

In one example, the receive timing reporting is multiplexed with a CSI parameter in G0, wherein the multiplexing method is according to one of the examples described above.

In one example, the receive timing reporting is multiplexed with a CSI parameter in G0 if only G0 is transmitted (reported) in UCI part 2 (i.e. G1 and G2 are omitted or not reported); the receive timing reporting is multiplexed with a CSI parameter in G1 if only (G0, G1) is transmitted (reported) in UCI part 2 (i.e. G2 is omitted or not reported); and the receive timing reporting is multiplexed with a CSI parameter in G2 if (G0, G1, G2) is transmitted (reported) in UCI part 2.

As described in U.S. provisional patent application 63/150,391, which is incorporated by reference herein, the UE could measure and report the following metrics for each RRH in the RRH cluster: (1) Metric-1: frequency offset/phase shift related metric(s) for each RRH in the RRH cluster; and (2) Metric-2: array phase/amplitude offset related metric(s) for each RRH in the RRH cluster.

As illustrated in this disclosure, the UE could also measure and report the following metrics for each RRH in the RRH cluster: (1) Metric-3: Doppler shift related metric(s) for each RRH in the RRH cluster; and (2) Metric-4: receive timing related metric(s) for each RRH in the RRH cluster.

The UE could be indicated/configured by the network to measure and report one or more of the above metrics (e.g., from Metric-1, Metric-2, Metric-3, and Metric-4). Alternatively, the UE could autonomously determine to measure and report one or more of the above metrics (e.g., from Metric-1, Metric-2, Metric-3, and Metric-4). In this case, the UE could indicate to the network their selection(s) of the metric(s) to measure and report.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
a transceiver configured to receive:
    a first configuration for measuring a channel difference between a target cell and a reference cell in a cell group; and
    a second configuration for reporting the channel difference between the target cell and the reference cell in the cell group; and
a processor operably coupled to the transceiver, the processor configured to:
    determine, based on the first configuration, the channel difference between the target cell and the reference cell in the cell group,
wherein the transceiver is further configured to transmit, based on the second configuration, a channel difference report associated with the determined channel difference, and
wherein:
    the channel difference report is (i) multiplexed in a channel state information (CSI) report or (ii) reported as a standalone CSI parameter in the CSI report, and
    one of:
        the CSI report is a wideband (WB) CSI report and the channel difference report is multiplexed at least with one or more CSI parameters in the WB CSI report; and
        the CSI report is a narrowband (NB) CSI report and the channel difference report is multiplexed at least with one or more CSI parameters including a channel quality indicator (CQI), a rank indicator (RI) a precoding matrix indicator (PMI), or a layer indicator (LI) of the NB CSI report.

2. The UE of claim 1, wherein the first configuration includes at least one of:
a number of cells in the cell group;
an entity identifier (ID) of the target cell in the cell group;
an entity ID of the reference cell in the cell group; and
a cell group ID associated with the cell group, and
wherein the entity ID of the target cell or the reference cell corresponds to at least one of: a physical cell ID (PCI), a CORESETPoolIndex value, a PCI index pointing to a PCI in a list of PCIs that are higher layer configured to the UE, and a cell index pointing to a cell in the cell group.

3. The UE of claim 1, wherein:
the channel difference corresponds to at least one of:
    a frequency shift difference between the target cell and the reference cell in the cell group;
    a Doppler shift difference between the target cell and the reference cell in the cell group; and
    a downlink (DL) timing difference between the target cell and the reference cell in the cell group.

4. The UE of claim 1, wherein:
the second configuration includes time and frequency resource configurations in a channel state information (CSI) reporting setting for reporting the channel difference, and
the channel difference is configured as a report quantity in addition to a channel quality indicator (CQI), a precoding matrix indicator (PMI), a rank indicator (RI), and a layer indicator (LI).

5. The UE of claim 1, wherein:
the channel difference report includes at least one of:
    a frequency shift of the reference cell;
    a frequency shift difference between the target and reference cells;
    a Doppler shift of the reference cell;
    a Doppler shift difference between the target and reference cells;
    a downlink (DL) timing of the reference cell;
    a DL timing difference between the target and reference cells;
    a sign indicator for the frequency shift difference;
    a sign indicator for the Doppler shift difference; and
    a sign indicator for the DL timing difference, and
the channel difference report is part of a channel state information (CSI) report, multiplexed with hybrid automatic repeat request acknowledgement (HARQ-ACK) information, or multiplexed with a scheduling request (SR).

6. The UE of claim 1, wherein:
the transceiver is further configured to receive an uplink (UL) timing advance (TA) command for the cell group; and
the UL TA command (i) is received via a random access response (RAR) or an absolute TA medium access control (MAC) control element (CE) and (ii) includes a TA group identifier (ID),
where the TA group ID corresponds to at least one of:
    a cell group ID;
    a physical cell ID (PCI);
    a CORESETPoolIndex value;
    a PCI index pointing to a PCI in a list of PCIs higher layer configured to the UE; and
    a cell index pointing to a cell in the cell group.

7. A base station (BS), comprising:
a transceiver configured to:
    transmit a first configuration to indicate measurement of a channel difference between a target cell and a reference cell in a cell group;
    transmit a second configuration for reporting the channel difference between the target cell and the reference cell in the cell group; and
    receive, based on the second configuration, a channel difference report associated with the channel difference,
wherein:
    the channel difference report is (i) multiplexed in a channel state information (CSI) report or (ii) reported as a standalone CSI parameter in the CSI report, and one of:
- the CSI report is a wideband (WB) CSI report and the channel difference report is multiplexed at least with one or more CSI parameters in the WB CSI report; and
- the CSI report is a narrowband (NB) CSI report and the channel difference report is multiplexed at least with one or more CSI parameters including a channel quality indicator (CQI), a rank indicator (RI) a precoding matrix indicator (PMI), or a layer indicator (LI) of the NB CSI report.

8. The BS of claim 7, wherein the first configuration includes at least one of:
- a number of cells in the cell group;
- an entity identifier (ID) of the target cell in the cell group;
- an entity ID of the reference cell in the cell group; and
- a cell group ID associated with the cell group, and
- wherein the entity ID of the target cell or the reference cell corresponds to at least one of: a physical cell ID (PCI), a CORESETPoolIndex value, a PCI index pointing to a PCI in a list of PCIs that are higher layer configured, and a cell index pointing to a cell in the cell group.

9. The BS of claim 7, wherein:
the channel difference corresponds to at least one of:
- a frequency shift difference between the target cell and the reference cell in the cell group;
- a Doppler shift difference between the target cell and the reference cell in the cell group; and
- a downlink (DL) timing difference between the target cell and the reference cell in the cell group.

10. The BS of claim 7, wherein:
the second configuration includes time and frequency resource configurations in a channel state information (CSI) reporting setting for reporting the channel difference, and
the channel difference is configured as a report quantity in addition to a channel quality indicator (CQI), a precoding matrix indicator (PMI), a rank indicator (RI), and a layer indicator (LI).

11. The BS of claim 7, wherein:
the channel difference report includes at least one of:
- a frequency shift of the reference cell;
- a frequency shift difference between the target and reference cells;
- a Doppler shift of the reference cell;
- a Doppler shift difference between the target and reference cells;
- a downlink (DL) timing of the reference cell;
- a DL timing difference between the target and reference cells;
- a sign indicator for the frequency shift difference;
- a sign indicator for the Doppler shift difference; and
- a sign indicator for the DL timing difference, and
the channel difference report is part of a channel state information (CSI) report, multiplexed with hybrid automatic repeat request acknowledgement (HARQ-ACK) information, or multiplexed with a scheduling request (SR).

12. The BS of claim 7, wherein:
the transceiver is further configured to transmit an uplink (UL) timing advance (TA) command for the cell group; and
the UL TA command (i) is transmitted via a random access response (RAR) or an absolute TA medium access control (MAC) control element (CE) and (ii) includes a TA group identifier (ID),
where the TA group ID corresponds to at least one of:
- a cell group ID;
- a physical cell ID (PCI);
- a CORESETPoolIndex value;
- a PCI index pointing to a PCI in a list of PCIs higher layer configured; and
- a cell index pointing to a cell in the cell group.

13. A method for operating a user equipment (UE), the method comprising:
- receiving a first configuration for measuring a channel difference between a target cell and a reference cell in a cell group;
- receiving a second configuration for reporting the channel difference between the target cell and the reference cell in the cell group;
- determining, based on the first configuration, the channel difference between the target cell and the reference cell in the cell group; and
- transmitting, based on the second configuration, a channel difference report associated with the determined channel difference, wherein:
the channel difference report is (i) multiplexed in a channel state information (CSI) report or (ii) reported as a standalone CSI parameter in the CSI report, and
one of:
- the CSI report is a wideband (WB) CSI report and the channel difference report is multiplexed at least with one or more CSI parameters in the WB CSI report; and
- the CSI report is a narrowband (NB) CSI report and the channel difference report is multiplexed at least with one or more CSI parameters including a channel quality indicator (CQI), a rank indicator (RI) a precoding matrix indicator (PMI), or a layer indicator (LI) of the NB CSI report.

14. The method of claim 13, wherein the first configuration includes at least one of:
- a number of cells in the cell group;
- an entity identifier (ID) of the target cell in the cell group;
- an entity ID of the reference cell in the cell group; and
- a cell group ID associated with the cell group, and
- wherein the entity ID of the target cell or the reference cell corresponds to at least one of: a physical cell ID (PCI), a CORESETPoolIndex value, a PCI index pointing to a PCI in a list of PCIs that are higher layer configured to the UE, and a cell index pointing to a cell in the cell group.

15. The method of claim 13, wherein:
the channel difference corresponds to at least one of:
- a frequency shift difference between the target cell and the reference cell in the cell group;
- a Doppler shift difference between the target cell and the reference cell in the cell group; and
- a downlink (DL) timing difference between the target cell and the reference cell in the cell group.

16. The method of claim 13, wherein:
the second configuration includes time and frequency resource configurations in a channel state information (CSI) reporting setting for reporting the channel difference, and
the channel difference is configured as a report quantity in addition to a channel quality indicator (CQI), a precoding matrix indicator (PMI), a rank indicator (RI), and a layer indicator (LI).

17. The method of claim 13, wherein:
the channel difference report includes at least one of:
- a frequency shift of the reference cell;
- a frequency shift difference between the target and reference cells;
- a Doppler shift of the reference cell;
- a Doppler shift difference between the target and reference cells;
- a downlink (DL) timing of the reference cell;
- a DL timing difference between the target and reference cells;
- a sign indicator for the frequency shift difference;
- a sign indicator for the Doppler shift difference; and
- a sign indicator for the DL timing difference, and the channel difference report is part of a channel state information (CSI) report, multiplexed with hybrid automatic repeat request acknowledgement (HARQ-ACK) information, or multiplexed with a scheduling request (SR).

\* \* \* \* \*